(12) United States Patent
Shinkai et al.

(10) Patent No.: US 7,636,721 B2
(45) Date of Patent: Dec. 22, 2009

(54) PICTURE PROGRAM PRODUCTION ASSISTANCE SYSTEM

(75) Inventors: Mitsutoshi Shinkai, Kanagawa (JP);
Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 904 days.

(21) Appl. No.: 10/718,247

(22) Filed: Nov. 20, 2003

(65) Prior Publication Data
US 2004/0103233 A1    May 27, 2004

(30) Foreign Application Priority Data
Nov. 22, 2002    (JP) ............................ P2002-339591

(51) Int. Cl.
G06F 7/00 (2006.01)
G06F 17/00 (2006.01)
(52) U.S. Cl. .................................... 707/100; 707/200
(58) Field of Classification Search ............... 707/1–10, 707/100–104.1, 200–206; 715/514, 713, 715/853; 386/46; 271/3.12, 3.13, 9.02, 9.05, 271/92, 93, 100, 102, 103–105, 110, 113, 271/121, 123, 129, 133, 135, 137, 142; 345/427, 345/428, 440
See application file for complete search history.

(56) References Cited

U.S. PATENT DOCUMENTS

2001/0049691 A1   12/2001  Asazu

2002/0159752 A1   10/2002  David
2004/0218902 A1*  11/2004  Yanagita .................. 386/52

FOREIGN PATENT DOCUMENTS

| JP | 10-174040 | 6/1998 |
| JP | 2000 92419 | 3/2000 |
| JP | 2001-290731 | 10/2001 |

OTHER PUBLICATIONS

Michelle Baldonado et al., Metadata for digital libraries: architecture and design rationale, Jul. 1997, ACM, 47-56.*
Vijay Kumar et al., Metadata visualization for digital libraries: interactive timeline editing and review, May 1998, ACM, 126-133.*
Wilkinson J H et al: "Tools and Techniques for Globally Unique Content Identification" SMPTE Journal, SMPTE Inc. Scarsdale, N. Y, US, vol. 109, No. 10, Oct. 2000, pp. 795-799, XP000969315 ISSN: 0036-1682.
Bob Edge: "Attributes of file formats for broadcast operations and archives" Grass Valley Group,—2001 pp. 1-5, XP002276737 Retrieved from the Internet: URL:http://www.broadcastpapers.com/asset/GVGFileFormatsForBroadcast.pdf>.

* cited by examiner

*Primary Examiner*—Jean B Fleurantin
(74) *Attorney, Agent, or Firm*—Frommer Lawrence & Haug LLP; William S. Frommer; Ellen Marcie Emas

(57) ABSTRACT

A picture program production assistance system comprises a project-making device for creating program meta data, and a processing device for obtaining the program meta data created by the project-making device, creating take meta data for each take, and correlating content data relating to the take and the take meta data with the cut within the program meta data.

29 Claims, 29 Drawing Sheets

FIG. 2

PROGRAM META DATA FILE (PM)

| PROGRAM IDENTIFICATION HIERARCHICAL LEVEL | HIERARCHICAL LEVEL OF REPORTING | | HIERARCHICAL LEVEL OF SCENE | | | HIERARCHICAL LEVEL OF CUT | | | TAKE CORRELATION INFORMATION | | | | |
|---|---|---|---|---|---|---|---|---|---|---|---|---|---|
| | REPORTING INSTRUCTIONS | REPORTING MEMO | SCENE INSTRUCTIONS | SCENE MEMO | | CUT INSTRUCTIONS | CUT MEMO | TAKE DATA | OK/NG | VIDEO FILE NAME | LOW-RES FILE NAME | TAKE META DATA FILE NAME | |
| [ID]P2002-10 [Ti]EAST-WEST BOUNDARY LINE FOR NOODLE SOUP | [ID]A2002-10 [Ti]SOUP OF NAGOYA [Cam]KOIZUMI [Rep]FUKUDA [Pic]NAGOYA SO-AND-SO SOBA NOODLE SHOP [Tim]9:00-10:00 [Dsc]EXPLAIN THAT NOODLE SOUP IN NAGOYA IS BROTH-BASED | [Dsc]MANY SHOPS IN NAGOYA SERVE RED MISO BASED SOUP. ORIGINALLY UNRELATED, BUT IT MIGHT BE BETTER TO INTRODUCE | [No.]1 [Ti]OUTSIDE SHOT OF SHOP | [Dsc]DOWNTOWN. THE NAGOYA CASTLE CAN BE SEEN BEHIND SHOP | | [No.]1 [Ti]ENTIRE SHOP | [Dsc]SHOT TWICE | [No.]1 [In]xx:xx:xx.xx [Out]xx:xx:xx.xx | OK | VIDEO-1 .mxf | LORES-1 .mpg | TAKE-METADATA-1.xml | |
| | | | | | | | | [No.]2 | OK | VIDEO-2 .mxf | LORES-2 .mpg | TAKE-METADATA-2.xml | |
| | | | | | | [No.]2 [Ti]SHOP ENTRANCE | | [No.]3 [In]xx:xx:xx.xx [Out]xx:xx:xx.xx | NG | VIDEO-3 .mxf | LORES-3 .mpg | TAKE-METADATA-3.xml | |
| | | | [No.]2 [Ti]INSIDE SHOP [Dsc]SHOW THAT THE COLOR OF NOODLE BROTH IN NAGOYA IS LIGHT | | | [No.]1 [Ti]ASK SHOP OWNER ABOUT NOODLE BROTH COLOR | [Dsc]GOOD FACIAL EXPRESSION | [No.]4 [In]xx:xx:xx.xx [Out]xx:xx:xx.xx | OK | VIDEO-4 .mxf | LORES-4 .mpg | TAKE-METADATA-4.xml | |
| | | | | | | [No.]2 [Ti]NOODLE BROTH COLOR IS LIGHT | | [No.]5 [In]xx:xx:xx.xx [Out]xx:xx:xx.xx | OK | VIDEO-5 .mxf | LORES-5 .mpg | TAKE-METADATA-5.xml | |
| | | | | | | [No.]3 [Ti]REPOPTER EATS UDON NOODLES | | [No.]6 [In]xx:xx:xx.xx [Out]xx:xx:xx.xx | OK | VIDEO-6 .mxf | LORES-6 .mpg | TAKE-METADATA-6.xml | |
| | [ID]A2002-1002 [Ti]SOUP OF MIKAWA-ANJO [Cam]KOIZUMI [Rep]FUKUDA [Pic]MIKAWA-ANJO SO-AND-SO SOBA NOODLE SHOP [Tim]12:00-13:00 [Dsc]CONCLUDE THAT MIKAWA-ANJO IS THE BORDER FOR THE COLOR OF NOODLE SOUP | [Dsc]IN MIKAWA-ANJO THERE ARE PLACES LESS THAN 100 METERS FROM EACH OTHER WITH DIFFERENT COLOR SOUP | [No.]1 [Ti]OUTSIDE SHOT OF SHOP | [Dsc]OLD TOWN AREA MARKES GOOD IMPRESSION | | [No.]1 [Ti]ENTIRE SHOP | | [No.]7 [In]xx:xx:xx.xx [Out]xx:xx:xx.xx | NG | VIDEO-7 .mxf | LORES-7 .mpg | TAKE-METADATA-7.xml | |
| | | | | | | | | [No.]8 [In]xx:xx:xx.xx [Out]xx:xx:xx.xx | OK | VIDEO-8 .mxf | LORES-8 .mpg | TAKE-METADATA-8.xml | |
| | | | | | | [No.]2 [Ti]SHOP ENTRANCE | | [No.]9 [In]xx:xx:xx.xx [Out]xx:xx:xx.xx | OK | VIDEO-9 .mxf | LORES-9 .mpg | TAKE-METADATA-9.xml | |
| | | | [No.]2 [Ti]INSIDE SHOP [Dsc]SHOP OWNER STATES THAT THERE ARE VARIOUS LEVELS OF HOW DARK THE SOUP IS IN THIS AREA, AND REPORTER STATES THAT THIS WILL BE VERIFIED | | | [No.]1 [Ti]ASK SHOP OWNER ABOUT NOODLE BROTH COLOR | | [No.]10 [In]xx:xx:xx.xx [Out]xx:xx:xx.xx | OK | VIDEO-10 .mxf | LORES-10 .mpg | TAKE-METADATA-10.xml | |
| | | | | | | [No.]2 [Ti]INTERMEDIATE NOODLE BROTH COLOR | | [No.]11 [In]xx:xx:xx.xx [Out]xx:xx:xx.xx | OK | VIDEO-11 .mxf | LORES-11 .mpg | TAKE-METADATA-11.xml | |
| | | | | | | [No.]3 [Ti]SHOP OWNER TESTIFIES | | [No.]12 [In]xx:xx:xx.xx [Out]xx:xx:xx.xx | OK | VIDEO-12 .mxf | LORES-12 .mpg | TAKE-METADATA-12.xml | |
| | | | [No.]3 [Ti]OUTSIDE SHOT OF SHOP [Dsc]COMPARE THE BROTH FROM SEVERAL SOBA NOODLE SHOPS IN THIS AREA, AND STATE THAT THIS IS THE BOUNDARY | | | [No.]1 [Ti]PEOPLE TAKING HOME-DELIVERY FOOD FROM EACH SHOP | | [No.]13 [In]xx:xx:xx.xx [Out]xx:xx:xx.xx | OK | VIDEO-13 .mxf | LORES-13 .mpg | TAKE-METADATA-13.xml | |
| | | | | | | [No.]2 [Ti]LINE UP THE UDON, AND COMPARE COLOR | [Dsc]COLOR CLEARLY DIFFERENT | [No.]14 [In]xx:xx:xx.xx [Out]xx:xx:xx.xx | OK | VIDEO-14 .mxf | LORES-14 .mpg | TAKE-METADATA-14.xml | |
| | | | | | | [No.]3 [Ti]DECLARE BOUNDARY | | [No.]15 [In]xx:xx:xx.xx [Out]xx:xx:xx.xx | OK | VIDEO-15 .mxf | LORES-15 .mpg | TAKE-METADATA-15.xml | |

TAKE META DATA FILE

| FILE NAME | TAKE META DATA | |
|---|---|---|
| TAKE-METADATA-1.xml | [Date]2002/4/15 [Time]12:35:14 | TM1 |
| TAKE-METADATA-2.xml | [Date]2002/4/15 [Time]12:37:40 | TM2 |
| TAKE-METADATA-3.xml | [Date]2002/4/15 [Time]12:45:15 | TM3 |
| TAKE-METADATA-4.xml | [Date]2002/4/15 [Time]12:47:41 | TM4 |
| TAKE-METADATA-5.xml | [Date]2002/4/15 [Time]12:50:16 | TM5 |
| TAKE-METADATA-6.xml | [Date]2002/4/15 [Time]13:10:42 | TM6 |
| TAKE-METADATA-7.xml | [Date]2002/4/15 [Time]14:15:17 | TM7 |
| TAKE-METADATA-8.xml | [Date]2002/4/15 [Time]14:16:43 | TM8 |
| TAKE-METADATA-9.xml | [Date]2002/4/15 [Time]14:18:44 | TM9 |
| TAKE-METADATA-10.xml | [Date]2002/4/15 [Time]14:25:45 | TM10 |
| TAKE-METADATA-11.xml | [Date]2002/4/15 [Time]14:17:46 | TM11 |
| TAKE-METADATA-12.xml | [Date]2002/4/15 [Time]14:18:47 | TM12 |
| TAKE-METADATA-13.xml | [Date]2002/4/15 [Time]14:30:48 | TM13 |
| TAKE-METADATA-14.xml | [Date]2002/4/15 [Time]14:35:49 | TM14 |
| TAKE-METADATA-15.xml | [Date]2002/4/15 [Time]14:40:50 | TM15 |

FIG. 3

PROGRAM META DATA FILE / PM

| PROGRAM IDENTIFICATION HIERARCHICAL LEVEL | HIERARCHICAL LEVEL OF REPORTING | | HIERARCHICAL LEVEL OF SCENE | |
|---|---|---|---|---|
| | REPORTING INSTRUCTIONS | REPORTING MEMO | SCENE INSTRUCTIONS | SCENE MEMO |
| [ID]P2002-10 [Ttl]EAST-WEST BOUNDARY LINE FOR NOODLE SOUP | [ID]A2002-10 [Ttl]SOUP OF NAGOYA [Cam]KOIZUMI [Rep]FUKUDA [Plc]NAGOYA SO-AND-SO SOBA NOODLE SHOP [Tim]9:00-10:00 [Dsc]EXPLAIN THAT NOODLE SOUP IN NAGOYA IS BROTH-BASED | [Dsc]MANY SHOPS IN NAGOYA SERVE RED MISO BASED SOUP. ORIGINALLY UNRELATED, BUT IT MIGHT BE BETTER TO INTRODUCE | [No.]1 [Ttl]OUTSIDE SHOT OF SHOP | [Dsc] DOWNTOWN. THE NAGOYA CASTLE CAN BE SEEN BEHIND SHOP |
| | | | [No.]2 [Ttl]INSIDE SHOP [Dsc]SHOW THAT THE COLOR OF NOODLE BROTH IN NAGOYA IS LIGHT | |

FIG. 9

| ID/TITLE | PROGRAM | REPORTING | SCENE | CUT | TAKE |
|---|---|---|---|---|---|
| | P2002-10 EAST-WEST BOUNDARY LINE FOR NOODLE SOUP | A2002-1001 SOUP IN NAGOYA | 1 | 1 | 1/OK |
| | | | | | 2/NG |
| | | | | 2 | |
| | | | 2 | 1 | |
| | | | | 2 | |
| | | | | 3 | |
| | | A2002-1002 SOUP IN MIKAWA-ANJO | 1 | 1 | |
| | | | | 2 | |
| | | | 2 | 1 | |
| | | | | 2 | |
| | | | | 3 | |
| | | | 3 | 1 | |
| | | | | 2 | |
| | | | | 3 | |

TAKE META DATA FILE — TM1

| UMID | LOW-RES FILE NAME |
|---|---|
| AAAAAAAA | LORES-1.mpg |

VIDEO FILE — V1

| UMID |
|---|
| AAAAAAAA |

PROGRAM META DATA FILE — PM

| PROGRAM IDENTIFICATION HIERARCHICAL LEVEL | HIERARCHICAL LEVEL OF REPORTING | | HIERARCHICAL LEVEL OF SCENE | | HIERARCHICAL LEVEL OF CUT | | TAKE CORRELATION INFORMATION | | |
|---|---|---|---|---|---|---|---|---|---|
| | REPORTING INSTRUCTIONS | REPORTING MEMO | SCENE INSTRUCTIONS | SCENE MEMO | CUT INSTRUCTIONS | CUT MEMO | TAKE DATA | OK/NG | UMID |
| [ID]P2002-10 [Ti]EAST-WEST BOUNDARY LINE FOR NOODLE SOUP | [ID]A2002-10 [Ti]SOUP OF NAGOYA [Cam]KOIZUMI [Rep]FUKUDA [Pic]NAGOYA SO-AND-SO SOBA NOODLE SHOP [Tim]9:00-10:00 [Dsc]EXPLAIN THAT NOODLE SOUP IN NAGOYA IS BROTH-BASED | | [No.]1 [Ti]OUTSIDE SHOT OF SHOP | | [No.]1 [Ti]ENTIRE SHOP | | | | |
| | | | | | [No.]2 [Ti]SHOP ENTRANCE | | | | |
| | | | [No.]2 [Ti]INSIDE SHOP [Dsc]SHOW THAT THE COLOR OF NOODLE BROTH IN NAGOYA IS LIGHT | | [No.]1 [Ti]ASK SHOP OWNER ABOUT NOODLE BROTH COLOR | | | | |
| | | | | | [No.]2 [Ti]NOODLE BROTH COLOR IS LIGHT | | | | |
| | | | | | [No.]3 [Ti]REPOPTER EATS UDON NOODLES | | | | |
| | [ID]A2002-1002 [Ti]SOUP OF MIKAWA-ANJO [Cam]KOIZUMI [Pic]MIKAWA-ANJO SO-AND-SO SOBA NOODLE SHOP [Tim]12:00-13:00 [Dsc]CONCLUDE THAT MIKAWA-ANJO IS THE BORDER FOR THE COLOR OF NOODLE SOUP | | [No.]1 [Ti]OUTSIDE SHOT OF SHOP | | [No.]1 [Ti]ENTIRE SHOP | | | | |
| | | | | | [No.]2 [Ti]SHOP ENTRANCE | | | | |
| | | | [No.]2 [Ti]INSIDE SHOP [Dsc]SHOP OWNER STATES THAT THERE ARE VARIOUS LEVELS OF HOW DARK THE SOUP IS IN THIS AREA, AND REPORTER STATES THAT THIS WILL BE VERIFIED | | [No.]1 [Ti]ASK SHOP OWNER ABOUT NOODLE BROTH COLOR | | | | |
| | | | | | [No.]2 [Ti]INTERMEDIATE NOODLE BROTH COLOR | | | | |
| | | | | | [No.]3 [Ti]SHOP OWNER TESTIFIES | | | | |
| | | | [No.]3 [Ti]OUTSIDE SHOT OF SHOP [Dsc]COMPARE THE BROTH FROM SEVERAL SOBA NOODLE SHOPS IN THIS AREA, AND STATE THAT THIS IS THE BOUNDARY | | [No.]1 [Ti]PEOPLE TAKING HOME-DELIVERY FOOD FROM EACH SHOP | | | | |
| | | | | | [No.]2 [Ti]LINE UP THE UDON, AND COMPARE COLOR | | | | |
| | | | | | [No.]3 [Ti]DECLARE BOUNDARY | | | | |

| PROGRAM | REPORTING | SCENE | CUT | TAKE | TAKE FILE |
|---|---|---|---|---|---|
| | REPORTING INSTRUCTIONS | SCENE INSTRUCTIONS | CUT INSTRUCTIONS | THUMBNAIL | THUMBNAIL |
| [ID]P2002-10 [Tti]EAST-WEST BOUNDARY LINE FOR NOODLE SOUP | [ID]A2002-1001 [Tti]SOUP OF NAGOYA [Cam]KOIZUMI [Rep]FUKUDA [Plc]NAGOYA SO-AND-SO SOBA NOODLE SHOP [Tim]9:00-10:00 [Dsc]EXPLAIN THAT NOODLE SOUP IN NAGOYA IS BROTH-BASED | [No.]1 [Tti]OUTSIDE SHOT OF SHOP | [No.]1 [Tti]ENTIRE SHOP | (house) (house) | (UDON) T1 (face) T2 (bowl) T3 (face) T4 (house) T5 (house) T6 |
| | | | [No.]2 [Tti]SHOP ENTRANCE | (UDON) | |
| | | [No.]2 [Tti]INSIDE SHOP [Dsc]SHOW THAT THE COLOR OF NOODLE BROTH IN NAGOYA IS LIGHT | [No.]1 [Tti]ASK SHOP OWNER ABOUT NOODLE BROTH COLOR | (face) | |
| | | | [No.]2 [Tti]NOODLE BROTH COLOR IS LIGHT | | |
| | | | [No.]3 [Tti]REPOPTER EATS UDON NOODLES | | |
| | [ID]A2002-1002 [Tti]SOUP OF MIKAWA-ANJO [Cam]KOIZUMI [Rep]FUKUDA [Plc]MIKAWA-ANJO SO-AND-SO SOBA NOODLE SHOP [Tim]12:00-13:00 [Dsc]CONCLUDE THAT MIKAWA-ANJO IS THE BORDER FOR THE COLOR OF NOODLE SOUP | [No.]1 [Tti]OUTSIDE SHOT OF SHOP | [No.]1 [Tti]ENTIRE SHOP | | |
| | | | [No.]2 [Tti]SHOP ENTRANCE | | |
| | | [No.]2 [Tti]INSIDE SHOP [Dsc]SHOP OWNER STATES THAT THERE ARE VARIOUS LEVELS OF HOW DARK THE SOUP IS IN THIS AREA, AND REPORTER STATES THAT THIS WILL BE VERIFIED | [No.]1 [Tti]ASK SHOP OWNER ABOUT NOODLE BROTH COLOR | | |
| | | | [No.]2 [Tti]INTERMEDIATE NOODLE BROTH COLOR | | |
| | | | [No.]3 [Tti]SHOP OWNER TESTIFIES | | |
| | | [No.]3 [Tti]OUTSIDE SHOT OF SHOP [Dsc]COMPARE THE BROTH FROM SEVERAL SOBA NOODLE SHOPS IN THIS AREA, AND STATE THAT THIS IS THE BOUNDARY | [No.]1 [Tti]PEOPLE TAKING HOME-DELIVERY FOOD FROM EACH SHOP | | |
| | | | [No.]2 [Tti]LINE UP THE UDON, AND COMPARE COLOR | | |
| | | | [No.]3 [Tti]DECLARE BOUNDARY | | |

PM' 429

PICTURE PROGRAM PRODUCTION ASSISTANCE SYSTEM

BACKGROUND OF THE INVENTION

1. Field of the Invention

The present invention relates to a picture program production assistance system.

2. Description of the Related Art

The following flow is common for broadcasting stations and program production companies to produce picture works such as TV programs or video content (hereafter referred to as "picture programs"). First, a project-making and planning team makes a project for a picture program, and writes a scenario (script). Next, a reporting team carries out reporting (shooting) on-site based on the scenario, and records content data including the picture material that has been shot. Further, an editing team edits the content data based on the scenario, information gathered at the time of reporting, and so forth, thereby completing the picture program.

In a production flow such as described above, various types of information such as the scenario, information for correlating the scenario and the picture material, information obtained on-site, and so forth, have been written down on a paper medium and kept, and exchanged piece by piece between the teams. Note that Japanese Unexamined Patent Application Publication No. 2001-290731 discloses a technique for sharing roughly edited picture material or the like between multiple people on a network.

However, with the method wherein the various types of information are exchanged using paper media as described above, unified information management cannot be carried out between all of the teams involved, besides the accuracy and speed of information communication being insufficient. Not only has this led to difficulty in cooperation or specific instructions or requests between the teams, but also this system does not readily lend itself to corrections or changes in the scenario, so consequently, the production efficiency could not be improved.

Also, a technique is being tested wherein a scenario is created in an electronic file format, and shot picture material is appropriated to the scenario. However, this technique only effectively uses the electronic file following shooting, and shooting still depends on paper media. In other words, the electronic file format scenario is not used at the time at shooting, so the shot picture material could not be correlated with the electronic file format scenario. Accordingly, the electronic file format scenario could not be used consistently throughout the project-making and planning, shooting, and editing stages.

SUMMARY OF THE INVENTION

The present invention has been made in light of the above problems, and accordingly, it is an object thereof to provide a new and improved picture program production assistance system capable of correlating shot picture material with an electronic file format scenario, and consistently using this electronic file format scenario from the project-making and planning stage to the editing stage, and so forth.

To achieve the above object, according to a first aspect of the present invention, a picture program production assistance system for producing picture programs using planning sheet meta data is provided. In the picture program production assistance system, the planning sheet meta data includes program meta data and take meta data. The program meta data includes a program identification hierarchical level which is a highest hierarchical level made up of meta data relating to the picture program, and a hierarchical structure including at least a cut hierarchical level made up of meta data relating to cuts which are the smallest increment making up the picture program at the time of project-making, and is managed in increment files for each of the picture programs. This program meta data serves as the electronic file format scenario of the picture program. Also, the take meta data includes meta data relating to takes which are consecutive shooting processing from the start to the end of one recording, and is managed in increments of increment files for each take. Note that the characteristics of such program meta data and take meta data also are the same with the following program meta data and take meta data. Further, the picture program production assistance system comprises a project-making device for creating the program meta data, and a processing device for obtaining the program meta data created by the project-making device, creating the take meta data for each the take, and correlating content data relating to the take and the take meta data with the cut within the program meta data.

Also, in order to achieve the above object, according to another aspect of the present invention, a project-making device using in the picture program production assistance system for producing picture programs is provided. This project-making device comprises a program meta data creating unit for creating the program meta data.

Also, in order to achieve the above object, according to another aspect of the present invention, a computer-controllable program, which comprises steps for creating the program meta data, is provided.

Also, in order to achieve the above object, according to another aspect of the present invention, a picture program processing method, which comprises steps for creating the program meta data, is provided.

Also, in order to achieve the above object, according to another aspect of the present invention, a processing device used in the picture program production assistance system for producing picture programs is provided. The processing device comprises a program meta data obtaining unit for obtaining the program meta data for each take, a take meta data creating unit for creating the take meta data, and a take correlating unit for correlating content data relating to the take and the take meta data with the cut within the program meta data.

Also, in order to achieve the above object, according to another aspect of the present invention, a computer-controllable program is provided which comprises a step for obtaining the program meta data, a step for creating the take meta data for each take, and a step for correlating content data relating to the take and the take meta data with the cut within the program meta data.

Also, in order to achieve the above object, according to another aspect of the present invention, a picture program processing method is provided which comprises a step for obtaining the program meta data, a step for creating the take meta data for each take, and a step for correlating content data relating to the take and the take meta data with the cut within the program meta data.

Also, in order to achieve the above object, according to another aspect of the present invention, a data structure of planning sheet meta data, used in the picture program production assistance system for producing picture programs, is provided. The planning sheet meta data comprises the program meta data and the take meta data.

BRIEF DESCRIPTION OF THE DRAWINGS

FIG. 2 is an explanatory diagram illustrating an example of the entire configuration of planning sheet meta data according to-the first embodiment;

FIG. 3 is an explanatory diagram with a part of the planning sheet meta data shown in FIG. 2 enlarged;

FIG. 9 is an explanatory diagram illustrating an example of program meta data displayed in the viewfinder of the picture-taking device according to the first embodiment;

FIG. 20 is an explanatory diagram illustrating an example of the configuration of the planning sheet meta data of the production flow at the stage that all picture-taking steps of the picture program production assistance method according to the first embodiment have been completed;

FIG. 23 is an explanatory diagram illustrating an example of the configuration of the planning sheet meta data at the stage the first take has been shot in the picture-taking step according to the modification of the first embodiment;

FIG. 24 is an explanatory diagram illustrating an example of the configuration of the planning sheet meta data at the stage that all cuts in the first report have been shot in the picture-taking step according to the modification of the first embodiment;

FIG. 28 is an explanatory diagram illustrating an example of program meta data PM' and the like displayed on an LCD display unit 429 of an picture-taking device 40 according to the first embodiment.

DESCRIPTION OF THE PREFERRED EMBODIMENTS

Figure 1:
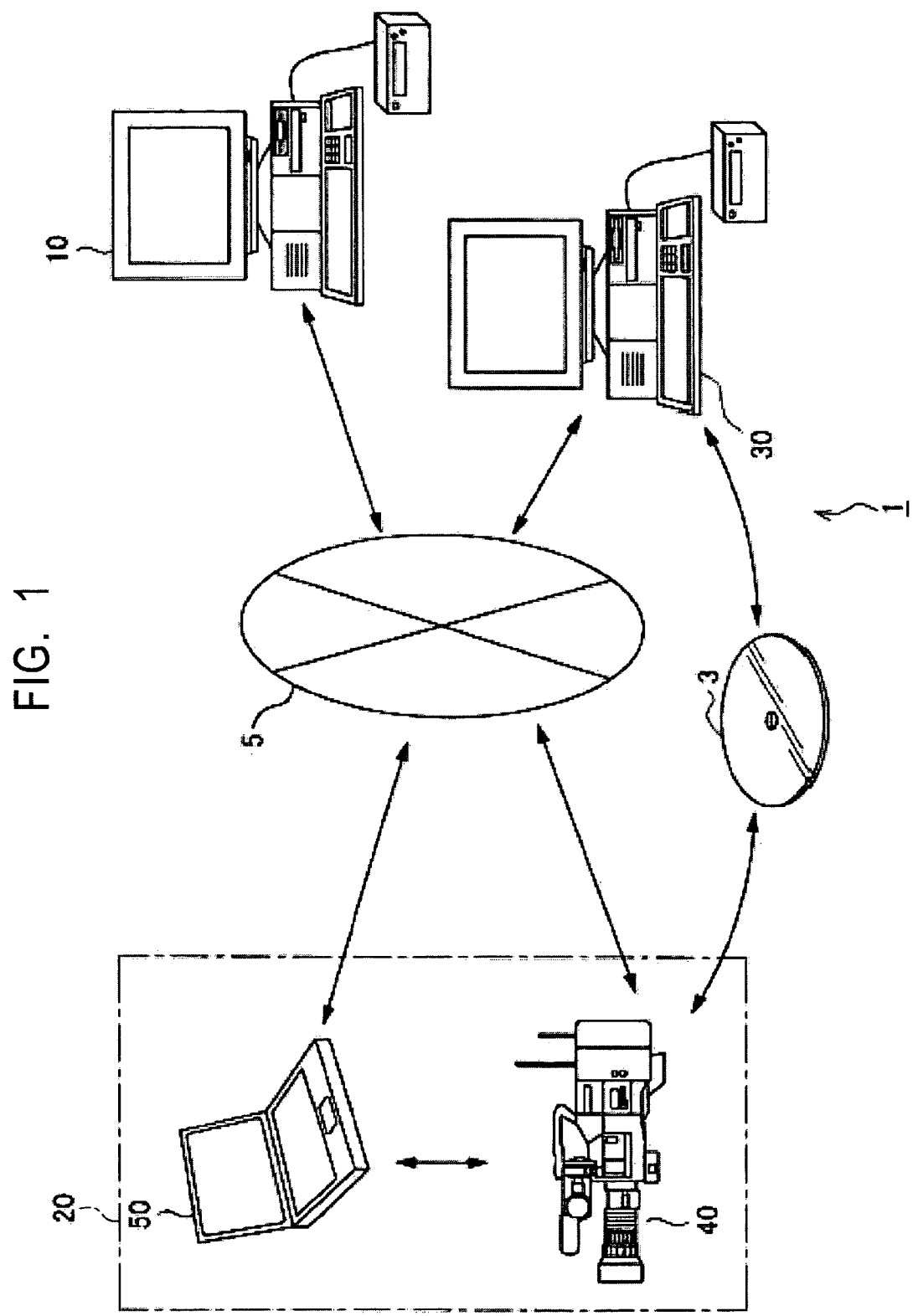
FIG. 1 is a block diagram illustrating the schematic configuration of a picture program production assistance system according to a first embodiment.

Preferred embodiments of the present invention will now be described in detail with reference to the attached drawings. Note that in the present specification and in the drawings, components having essentially the same functional configuration will be denoted with the same reference numerals, so as to avoid redundant description.

First Embodiment

The following is a description of a first embodiment according to the present invention.

<1. Picture Program Production Assistance System>

First, the picture program production assistance system according to the first embodiment of the present invention will be described. The picture program production assistance system is a system installed in television broadcasting stations or companies producing video content or movies or the like, for producing picture programs such as TV programs, video content, movies, and the like. The picture program production assistance system according to the present embodiment is unique in that planning sheet meta data (described later in detail) in electronic file format can be consistently used between multiple teams handling different functions in producing picture programs, thereby enabling picture programs to be efficiently created.

Now, the configuration of the picture program production assistance system according to the present embodiment will be described with reference to FIG. 1. FIG. 1 is a block diagram illustrating the schematic configuration of the picture program production assistance system according to the present embodiment.

As shown in FIG. 1, the picture program production assistance system 1 according to the present embodiment is primarily made up of, for example, a network 5, a project-making terminal 10, a reporting terminal comprising an picture-taking device 40 and a field PD/PDA (hereafter referred to as "field PC") 50 and the like, and an editing terminal 30.

The network 5 is an electric communication line network for connecting, for example, the project-making terminal 10, picture-taking device 40, field PC 50, and editing terminal 30, so as to allow mutually interactive communication therebetween. With the present embodiment, the network 5 is configured of cable communication lines such as RS-422 or RS-232C lines, and wireless communication lines such as IEEE 802.11a, and so forth. However, it should be noted that the network 5 is by no means restricted to such examples, and may be configured with, for example, an optical fiber network such as FDDI (Fiber Distributed Data Interface), satellite communication networks, Ethernet, LANs, the Internet, or other such various private or public line networks.

The network 5 is capable of sending planning sheet meta data created by the project-making terminal 10 for example, to the picture-taking device 40 and the field PC 50 (i.e., the reporting terminal 20), and so forth. Also, the network 5 is capable of sending content data which the picture-taking device 40 has recorded, or planning sheet meta data edited by the picture-taking device 40 and the field PC, for example, to the editing terminal 30.

Also, the project-making terminal 10, the reporting terminal 20, and the editing terminal 30, are terminal devices used by the multiple teams each taking on functions in producing the picture program. For example, the project-making terminal 10 is used by a project-making and planning team, the reporting terminal 20 is used by a reporting team, the editing terminal 30 is used by an editing team, and so forth. Note that the project-making terminal 10 is configured as a project-making device relating to the present embodiment, and the reporting terminal 20 and the editing terminal 30 are configured as processing devices according to the present embodiment.

The project-making terminal 10 is configured of an information processing device such as a personal computer or the like, and peripheral devices thereof, for example, and is provided to the project-making and planning team. This project-making and planning team is a team which supervises the entire production of the picture program, and instructs the other teams such as the reporting team and the editing team and so forth regarding the work to be performed for production, as well as creating and planning the picture program to be produced so as to create a scenario (script).

The project-making terminal 10 has functions for creating planning sheet meta data in electronic file format for each picture program, for example, i.e., creating the later-described program meta data. Also, for example, the project-making terminal 10 is capable of generating production instruction information based on input by a staff member in the project-making and planning team, and writing the production instruction information in an appropriate space in the aforementioned planning sheet meta data that has been created. This production instruction information is information for instructing the other teams regarding the contents to produce for the picture program, and are created corresponding to the scenario of the picture program planned as described above. Further, the project-making terminal 10 is capable of transmitting the planning sheet meta data including the production instruction information, for example, to the reporting terminal 20 and the like, via the network 5. Thus, the project-making and planning team can instruct the other teams such as the reporting team regarding the places and contents to be reported and shot, by the project-making terminal 10 providing the planning sheet meta data including the production instruction information to the reporting terminal 20 and the like.

Also, the reporting terminal 20 is a terminal device group used by the reporting team, and is configured from the picture-taking device 40 and field PC 50, for example. The reporting team is a team which, for example, actually gathers reports on-site, according to the production instructions from the project-making and planning team, and acts to shoot pictures of each scene making up the picture program, and also report on the state of shooting.

The picture-taking device 40 is a device used for, for example, taking picture content such as reports for broadcast news programs, covering sports events, taking movies, and so forth.

The picture-taking device 40 obtains the planning sheet meta data from the project-making terminal 10, for example, via the network 5. The picture-taking device 40 is capable of, for example, enabling the staff to shoot pictures, such as the cameraman and the like, to understand the picture program scenario and what is to be shot by displaying the production instruction information included in the obtained planning sheet meta data on a display unit.

Further, the picture-taking device 40 can shoot each scene making of the picture program, based on the production instruction information of the planning sheet meta data. The picture-taking processing proceeds by repeating multiple takes, for example. For example, the picture-taking device 40 shoots one or multiple takes of a certain scene, and then shoots one or multiple takes of a different scene. Note here that a "take" is picture-taking processing from the start of one recording with the picture-taking device 40 to the end thereof.

Further, the picture-taking device 40 can record the content data obtained by the picture-taking processing in a recording medium such as an optical disk 3 or the like. Note that "content data" refers to at least one of picture data and audio data. Specifically, the content data is moving picture data such as of TV programs, movies, or the like, still image data such as photographs or drawings, and audio data such as of radio programs or the like, or data made up by combining two or more of these. Further, the picture-taking device 40 is capable of recording the content data in increments of aforementioned takes. That is to say, in the event that the picture-taking device 40 shoots two takes, two content data files are recorded.

Also, the optical disk 3 where the content data is to be recorded may be made of any of the various types of optical disks available, such as a DVD-R, DVD-RAM, or CD-R, an MO (magneto-optical) disk, write-once or phase change types, or the like. Further, the recording medium to which the picture-taking device 40 records the content data is not restricted to the example of using the optical disk 3, rather, magnetic disks such as flexible disks or the like, digital VTR format magnetic tape, any of the various types of RAM, or the like, may be used.

Further, the picture-taking device 40 is capable of recording low-resolution pictures for example, in the optical disk 3, besides the original pictures. Here, "original pictures" refers to the unprocessed content data taken by the picture-taking device 40. The original pictures are large-size/high-quality pictures, and accordingly are used in the finished product of the picture program. On the other hand, low-resolution pictures (hereafter may be abbreviated to "low-res pictures", particularly in the drawings) consist of content data obtained by compressing the original picture. The low-resolution pictures are relatively low-quality but small in size, and are used primarily in the stage of rough editing, taking advantage of the ease and speed in transmission.

Thus, the optical disk 3 with the content data recorded by the picture-taking device 40 as described above, is transported to the later-described editing team, and used for editing the content data. However, this transporting requires a certain amount of time. Accordingly, the preset embodiment is configured as described below such that the picture-taking device 40 can speedily provide the content data via the network 5.

That is to say, the picture-taking device 40 can transmit the low-resolution pictures, for example, to the editing terminal 30, project-making terminal 10, field PC 50, and so forth, via the network 5. Transmission of the low-resolution pictures may be performed generally simultaneous with the shooting with the picture-taking device 40, or may be performed in a batch following shooting. Thus, the editing team can perform the editing work at a relatively early stage (e.g., approximately alongside the shooting work) even though the transported optical disk 3 has not reached the editing team, thereby improving picture program production efficiency. Note that in the event that the low-resolution pictures are sent over the network 5, the picture-taking device 40 only needs to record the original pictures in the optical disk 3.

On the other hand, the field PC 50 is configured of a portable computer such as a laptop personal computer or PDA (personal digital assistant) or the like and the peripheral devices thereof, for example. The field PC is connected to the picture-taking device 40 through various cables or wireless lines or the like, and is capable of sharing the planning sheet meta data and recorded content data and the like therewith, for example.

The field PC 50 can obtain the planning sheet meta data, for example, from the project-making terminal 10 via the network 5. Also, the field PC 50 can obtain the planning sheet meta data from the picture-taking device 40, for example, as well. The field PC 50 can also display the obtained planning sheet meta data, for example, on a predetermined display unit, such that the reporting team staff can understand what is to be reported and shot.

Further, the field PC 50 is capable of generating shooting state information which is information relating to the state of reporting and shooting, based on input of a reporting team staff member, so that the shooting state information can be added to the appropriate space within the planning sheet meta data. The shooting state information is, for example, text data describing each take or reporting site from various perspectives, and is information which will be useful in the later editing stage. In this way, the field PC 50 can edit the planning sheet meta data by writing the shooting state information.

The reporting terminal 20 configured of such as an picture-taking device 40 and field PC 50 is further capable of creating take meta data as a part of the planning sheet meta data, which is meta data relating to the shooting state at the time of shooting the above take, for example. This take meta data will be described later in detail.

The reporting terminal 20 is capable for example, of generating take correlation information (described later) in increments of takes which is information for correlating the content data and the take meta data with the scenario, and adding the take correlation information to the planning sheet meta data. Accordingly, the reporting terminal 20 is capable of appropriating, for example, the picture material which is the results of actual shooting (i.e., the content data) and the like to the scenario which is the project planned by the project-making and planning team using the planning sheet meta data.

In this way, the reporting terminal 20 can edit the planning sheet meta data by writing various types of information corresponding to the state of reporting or shooting, for example.

The editing terminal 30 is configured of, for example, an information processing device such as a personal computer or the like, and the peripheral devices thereof, and is provided to the editing team. The editing team is a team for editing the content data recorded by the picture-taking device 40, based on production instructions from the project-making and planning team, or the planning sheet meta data reflecting the reporting state provided from the reporting team, for example, so as to complete the picture program.

The editing terminal 30 obtains the planning sheet meta data and the low-resolution pictures from the reporting terminal 20 via the network 5, for example, and obtains the original pictures from the optical disk 3. Also, the editing terminal 30 can also receive production instruction information directly from the project-making terminal 10 via the network 5, for example.

Also, the editing terminal 30 is capable of suitably playing the content data based on the aforementioned planning sheet meta data. For example, the editing terminal 30 is capable of displaying the low-resolution pictures received via the network or the original pictures recorded in the optical disk 3, in a continuous manner following the order described in the scenario, or displaying only the content data of a certain take. Note that at the time of playing the original pictures, a disk device serving as a recording/playing device capable of reading from and writing to the optical disk 3, is used, for example.

Further, the editing terminal 30 is capable of displaying necessary content data in a desired order, based on the aforementioned planning sheet meta data for example, and also assisting in the editing processing for editing the content data. This editing processing is made up of rough editing and main editing, for example.

The rough editing is processing carried out as follows. First, the content data to be used in the main editing is collected from the multiple sets of content data recorded in increments of takes. Further, picture portions which are necessary are selected (logged) from the collected content data. Next, an editing start position (in point) or editing finishing position (out point) corresponding to the selected picture portion is set by a time code or the like, so that the necessary portion is extracted (ingested) from the content data.

The main editing processing is processing for extracting the original data of the roughly edited content data for example, subjecting this to final image quality adjustment and the like, and creating complete package data to be broadcast as a program or the like.

While the picture program production assistance system 1 and the components thereof has been schematically described, it should be noted that the picture program production assistance system 1 is by no means restricted to the above-described example.

For example, the devices such as the project-making terminal 10, the picture-taking device 40, the field PC 50, the editing terminal 30, and so forth, need not be one apiece, rather, multiple devices may be provided and used as suitable. For example, an arrangement may be made wherein content data shot by multiple picture-taking devices 40 is provided to a single editing terminal 30 by the optical disk 3 or the network 5.

Also, the project-making terminal 10, the picture-taking device 40, the field PC 50, and the editing terminal 30 do not necessarily need to be formed as separate hardware entities. For example, the project-making terminal 10 and the editing terminal 30 may be a single hardware entity having the functions of both. Or, the functions of the reporting terminal 20 and the editing terminal 30 may be combined so as to form a processing device having a single hardware configuration. Also, the picture-taking device 40 and the field PC 50 may be formed as an integral hardware entity having the functions of both, by providing an input device such as a keyboard on the picture-taking device 40, or the like. Further, the reporting terminal 20 does not necessarily need to have the picture-taking device 40.

Also, the picture program production assistance system 1 may have a client/server network system, configured by providing a center server (not shown in the drawings) between the project-making terminal 10, reporting terminal 20, and the editing terminal 30, for example, such that the project-making terminal 10, reporting terminal 20, and editing terminal 30 act as clients.

<2. Planning Sheet Meta Data>

Next, the planning sheet meta data according to the present embodiment will be described. The following is a definition of the vocabulary used with regard to the present embodiment, after which the configuration of the planning sheet meta data will be described in detail, with reference to specific examples of planning sheet meta data.

<2.1 Definition of Terms>

First, the terms used with the present embodiment will be defined.

"Meta data" is data accessory to certain data, and is data which functions as an index (or bookmark) to represent the contents of various types of data. Specific examples of this meta data include production instruction information, shooing state information, and take correlation information, relating to the picture program, shooting conditions information and electronic mark data relating to the content data, and so forth.

"Planning sheet meta data" is table data wherein the various types of meta data necessary for producing the picture program have been structured in a table format. Specifically, the contents of one picture program are divided into the components thereof, for example, and formed into a hierarchical structure, in the order of a program identification hierarchical level, reporting hierarchical level, scene hierarchical level, cut hierarchical level, and take hierarchical level, from the top down. Meta data regarding information such as, for example, the configuration of each (i.e., the number and order of each), title, description, and other accessory information, are described for each hierarchical level. Note that the planning sheet meta data is made up of program meta data managed in increments of increment files for each picture program, and take meta data manage in increments of increment files for each take, for example.

"Program meta data" is meta data wherein, the meta data of hierarchical levels of the cut hierarchical level or higher in the above-described "planning sheet meta data" is managed in a single meta data file (increment file) for a single picture program. The program meta data has a hierarchical structure of the program identification hierarchical level, reporting hierarchical level, scene hierarchical level, and cut hierarchical level, in that order. The program meta data contains meta data regarding production instruction information created corresponding to the scenario, program shooting state information, take correlation information, and so forth, for example. The program meta data can function as the electronic file format scenario shared between the teams since it contains the production instruction information corresponding to the scenario.

"Take meta data" is made up of the meta data regarding the takes described above, and is meta data which is managed as a single meta data file (increment file) for a single take in the "planning sheet meta data" described above. Accordingly, there may be multiple files of take meta data created for a single picture program (with regard to a single program meta data PM). The take meta data is correlated to the cut hierarchical level of the program meta data, and belongs to a lower hierarchical level under the cut hierarchical level. The take meta data contains meta data such as the later-described take shooting state information, or the like, for example.

"Take" refers to the picture-taking or shooting processing continuing from the point of starting one recording with the image taking device to the end of this recording, as described above. In other words, a take is the smallest unit of picture-taking processing in the picture-taking stage of the picture program. It should be particularly noted that while in the picture production industry, this "take" is also referred to as "clip", "shot", "cut", or the like, in the present specification, "cut" has a definition given below which is distinctively different from that of "take" as defined here. Also, in the picture production industry, "take" also has a definition meaning a consecutive picture section from the beginning of starting one recording with the image taking device to the end of this recording, but the term "take" as used in the present specification does not refer to such a consecutive picture section, but rather means consecutive picture-taking processing, as mentioned above. Further, it should be understood that the terms "picture-taking" or "shooting" as used liberally throughout the present specification have nothing to do with the terms "take" or "shot" mentioned here. The terms "picture-taking" or "shooting" are used interchangeably to mean any act of recording pictures on-site, and accordingly should be understood to be completely unrelated to the precise definitions being addressed here.

"Take hierarchical level" means a hierarchical level consisting of meta data relating to takes in the above-described "take meta data".

"Cut" refers to the smallest increment making up the picture program in the project-making stage (i.e., at the point of creating the scenario). A cut is a part of the scenario only as viewed from the perspective of the project-making and planning team (i.e., an envisioned shooting situation), and is different from a take, which is the smallest increment of actual shooting processing performed by the reporting team on-site. Necessary portions are extracted from the content data of the above-described "take", and assigned to the cut.

"Cut hierarchical level" is a hierarchical level of meta data relating to the above-described "cut" in the above-described "program meta data".

"Scene" is an increment of intermediate size making of the picture program in the project-making stage (i.e., at the point of creating the scenario), and is configured of at least one above-described "cut". That is, it can be said that a scene is a shooting situation compiled of one or more cuts. For example, separate scenes can be made of different shooting positions even within the same reporting settings.

"Scene hierarchical level" is a hierarchical level made of meta data relating to the above-described "scene" in the above-described "program meta data".

A "Report" is the largest increment making of the picture program in the project-making stage (i.e., at the point of creating the scenario), and is configured of at least one above-described "scene". That is, it can be said that a report is a shooting situation compiled of one or more scenes. For example, separate reports can be made if the reporting sites are different. The picture program is made up of at least one report.

"Report hierarchical level" is a hierarchical level of meta data relating to reports in the above-described "program meta data".

"Program identification hierarchical level" is a hierarchical level of meta data for identifying the picture program corresponding to the program meta data, in the above-described "program meta data".

This completes definition of the vocabulary used with the present embodiment.

<2.2 Overall Configuration of Planning Sheet Meta Data>

Next, the overall configuration of the planning sheet meta data according to the present embodiment will be described with reference to FIG. 2. FIG. 2 is an explanatory diagram illustrating an example of the overall configuration of the planning sheet meta data according to the present embodiment. Note that in FIG. 2, only a part of the content of the take meta data is shown, due to limitations in space.

In FIG. 2, the planning sheet meta data relating to the picture program, which is "Finding The East-West Boundary Line For Noodle Soup", is shown as an example of planning sheet meta data. In this way, the planning sheet meta data is a data table created for each picture program, for example. The planning sheet meta data is created in electronic file format by the project-making terminal 10, for example.

As shown in FIG. 2, the planning sheet meta data relating to one picture program is made up of, for example, one set of program meta data PM, and multiple sets of take meta data TM1, TM2, and so forth through TM15 (note that the individual sets of take meta data may be collectively referred to as "take meta data TM" below). That is to say, the planning sheet meta data has, with regard to one picture program, for example, an electronic file for one set of program meta data PM, electronic files of a number corresponding to the number of takes shot (fifteens in FIG. 2) for the take meta data TM. Furthermore, in FIG. 2, while the multiple sets of take meta data TM are linked vertically as if they were a table, so as to facilitate understanding of which set of take meta-data TM is correlated with which cut in the program meta data PM, in reality, each set of take meta data TM is managed as an independent file for each take.

<2.3 Program Meta Data>

Figure 4:
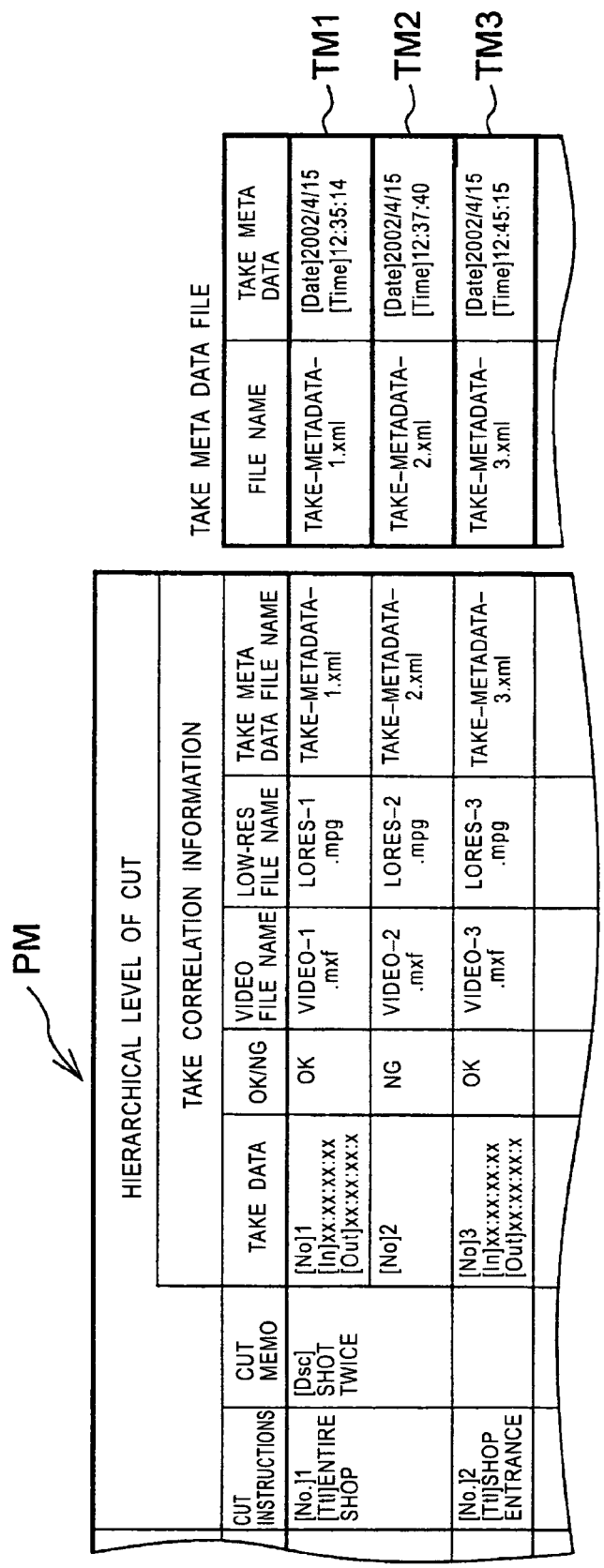
FIG. 4 is an explanatory diagram with a part of the planning sheet meta data shown in FIG. 2 enlarged.

Next, the program meta data PM will be described in detail, with reference to FIGS. 2 through 4. FIGS. 3 and 4 are explanatory diagrams wherein a part of the planning sheet meta data shown in FIG. 2 has been enlarged. Note that only a part of the contents of the take meta data is shown in FIG. 4, due to restrictions in space.

As shown in FIG. 2, the program meta data PM has a hierarchical structure formed of a program identification hierarchical level, reporting hierarchical level, scene hierarchical level, and cut hierarchical level, for example. Of these hierarchical levels, the program identification hierarchical level is the highest hierarchical level for example, the reporting hierarchical level is the hierarchical level below the program identification hierarchical level, and further, the scene hierarchical level is the hierarchical level below the reporting hierarchical level, and the cut hierarchical level is the lowest hierarchical level.

Specifically, in the program meta data PM shown in FIG. 2, the program identification hierarchical level has meta data for identifying the program. The reporting hierarchical level has meta data relating to two reports. Further, the scene hierarchical level has meta data relating to five scenes. Finally, the cut hierarchical level has meta data relating to thirteen cuts. In other words, the picture program in the planning sheet meta data shown in FIG. 2 is made up of two reports, or of five scenes, or of thirteen cuts.

In this way, the program meta data PM has a tree structure wherein the program identification hierarchical level is the apex, divided down into the reporting hierarchical level, scene hierarchical level, and finally the cut hierarchical level. Note that the hierarchical structure of the program meta data PM is by no means restricted to the above-described example. For example, the hierarchical structure of the program meta data PM may contain other new hierarchical levels as well. On the other hand, the hierarchical structure of the program meta data PM only needs to have the program identification hierarchical level and the cut hierarchical level, and the reporting hierarchical level and scene hierarchical level are not absolutely necessary. In this case, for example, an arrangement may be made wherein the data in the reporting hierarchical level is all managed as a single reporting data file, or multiple separate reporting data files created for each report, which are mutually linked with the program meta data PM using reference information such are reference Nos. or IDs or the like. This would allow the amount of data of the program meta data PM to be reduced while enabling the data of the reporting hierarchical level based on the program meta data PM to be referred to easily and speedily. Also, in the same way, the data in the scene hierarchical level may be managed as a separate file by creating a scene data file or the like.

Also, in each hierarchical level in the program meta data PM, the higher the position of a description is, the earlier in the scenario that related report or scene or cut is. For example, of the five scenes making of the picture program shown in FIG. 2, the scene at the topmost space is the first scene, and the scene at the bottom space is the last scene in the scenario.

Next, the contents of the meta data which the program meta data PM configured thus will be described.

First, in general, the program meta data PM has for example, production instruction information, program shooting state information, take correlation information, and so forth. Of these, the production instruction information and program shooting state information are formed into a hierarchical structure, while the take correlation information is contained only in the cut hierarchical level. The following is a description of the production instruction information, program shooting state information, and take correlation information.

The production instruction information is meta data which the project-making and planning team uses to instruct the contents of production of the picture program to the reporting team or editing team or the like. The production instruction information is generated by the project-making terminal 10, based on the input by a staff member in the project-making and planning team, and is written to appropriate spaces in the program meta data PM. The project-making and planning team instructs production following the scenario of the picture program, as a matter of course, so the production instruction information is configured so as to correspond to the scenario. Accordingly, the heads of each team undertaking specific functions in producing the picture program can understand not only the production instructions given to them, but also the scenario of the picture program, by viewing this production instruction information.

The production instruction information is filled in the spaces in the program meta data PM, of the entire program identification hierarchical level, the "reporting instructions" of the reporting hierarchical level, the "scene instructions" of the hierarchical level, and the "cut instructions" of the cut hierarchical level, as text data, for example. As a result, the production instruction information has an overall hierarchical structure. Forming the production instruction information into a hierarchical structure means that the contents of production instructions and the scenario from the project-making and planning team can be accurately and concisely expressed.

The program shooting state information is meta data relating to the shooting state corresponding to hierarchical levels of the cut hierarchical level and above (e.g., the cut hierarchical level, scene hierarchical level, reporting hierarchical level, and so forth). More specifically, the program shooting state information is messages or points of notice regarding the reporting or pictures shot, proposals, features or impressions regarding a shot scene, or incidents occurring during the reporting and shooting. The program shooting state information is generated by the field PC 50 based on input by a staff member of the reporting team, for example, and is written to the appropriate space in the program meta data PM. Each team handling a function of the picture program production can understand the state of shooting at the time of shooting pictures, by viewing this program shooting state information.

The program shooting state information is listed as text data for example, in the spaces of "reporting memo" in the reporting hierarchical level, "scene memo" in the scene hierarchical level, and "cut memo" in the cut hierarchical level, of the program meta data PM. Consequently, the program shooting state information is also formed as a whole into a hierarchical structure. Forming the program shooting state information into a hierarchical structure means that the shooting state can be accurately and concisely expressed. Note that while the program meta data PM according to the present embodiment does not include the above-described program shooting state information in the program identification hierarchical level, the present invention is by no means restricted to this example, and for example, an arrangement may be made wherein the program shooting state information can be listed in the program identification hierarchical level.

Take correlation information is meta data for correlating the content data of the take and the take meta data TM with the cut. More specifically, the take correlation information is made up of, for example, "take data" information, "OK/NG" information (NG being an abbreviation of No Good, indicating that the take was unsatisfactory), "video file name" information, "low-res file name" information, and "take meta data file name" information and so forth, which will be described in detail later. This take correlation information is generated by the reporting terminal 20 or the editing terminal 30 based on input by a reporting team or editing team staff member, for example, and is written in an appropriate space in the cut hierarchical level within the program meta data PM. Each team handling a function for producing the picture program can understand which takes are assigned to each cut, by viewing the take correlation information. Further, the editing terminal 30 and the like can also automatically determine the correlation between cuts and takes, based on this take correlation information.

Next, specific examples of meta data items in the program meta data PM will be described in increments of each hierarchical level in detail, with reference to FIGS. 3 and 4.

(Program Identification Hierarchical Level)

First, the program identification hierarchical level has items such as, for example, "program ID: [ID]", "program title: [Ttl]", and so forth, as shown in FIG. 3.

Program ID

A unique ID assigned to each picture program is filled in for the "program ID". With the picture program in the example shown in FIG. 3, a program ID of "P2002-10", for example, is assigned thereto. The program ID allows identification of which picture program the program meta data PM relates to.

Program Title

The title of the picture program is filled in the "program title" space. In the example shown in FIG. 3, the title "East-West Boundary Line For Noodle Soup" is filled in here.

(Reporting Hierarchical Level)

Next, as shown in FIG. 3, the reporting hierarchical level is sectioned into the "reporting instructions" space and the "reporting memo" space.

The "reporting instructions" space is a space for staff in the project-making and planning team to fill in the above-described production instruction information for the reporting hierarchical level. The "reporting instructions" space has items such as, for example, "reporting ID: [ID:]", "reporting title: [Ttl]", "cameraman: [Cam]", "reporter: [Rep]", "place: [Pcl]", "specified time: [Tim]", "description of reporting instructions: [Dsc]", and so forth.

Reporting ID

A unique ID is filled in to the "reporting ID" place each time a report is made. For example, the reporting ID of, for example, "A2002-1001" is filled in for the report shown in FIG. 3. This reporting ID allows identification of which picture program the report belongs to, and the number therein, for example.

Reporting Title

The title of the report is filled in the place for the "reporting title". In the example shown in FIG. 3, this is "Soup of Nagoya".

Cameraman

The name or ID of the cameraman instructed to handle the report is given here.

Reporter

The name or ID of the reporter instructed to handle the report is given here.

Place

Instructions regarding the place for reporting are given here.

Specified time

Instructions regarding the time for starting and the time for ending reporting are given here.

Description of Reporting Instructions

Instructions regarding reporting are filled in here. Instructions regarding reporting are the object of reporting, the overview, and so forth, for example.

Also, the space for "reporting memo" is a space for a staff member in the reporting team to fill in the above-described program shooting state information for the reporting hierarchical level. Items such as "reporting memo contents: [Dsc]" and the like are provided for the "reporting memo" space.

Reporting Memo Contents

Memos relating to the reporting and shooting state for the reporting hierarchical level are filled in here. Specifically, messages, warnings, or proposals, which a staff member is making based on things noticed through the overall reporting, characteristics and impressions of the site, incidents occurring throughout the overall reporting task, and so forth, are primarily what is filled in here.

(Scene Hierarchical Level)

Next, the scene hierarchical level is divided in to the "scene instructions" space and the "scene memo" space, as shown in FIG. 3.

The "scene instructions" space is a space for staff in the project-making and planning team to fill in the above-described production instruction information for the scene hierarchical level. The "scene instructions" space has items such as, for example, "scene No.: [NO]", "scene title: [Ttl]", "description of scene instructions: [Dsc]", and so forth.

Scene No.

The unique number assigned to at least one scene making up one report is filled in here. The scene No. is a serial No. assigned in the order of scenes within one report, for example, so the same scene No. is not used twice in the same report. For example, the report shown in FIG. 3 (the report on "Soup of Nagoya") is made up of two scenes, with the scene No. "1" assigned to the first scene in the order of scenes, and the scene No. "2" assigned to the second scene in the order of scenes. Thus, it can be said that the scene No. is information instructing the order of scenes.

Scene Title

This is the title of the scene. In the example in FIG. 3, the titles "Outside Shot of Shop" and "Inside Shop" are used.

Description of Scene Instructions

The instructions regarding the scene are given here. The instructions regarding the scene which are instruction regarding a scene configuration to be shot may be, for example, the overview of the scene or how the scene develops. The description regarding the "Scene Title" and "Description of Scene Instructions" corresponds to the scene configuration in the scenario.

Also, the "scene memo" space is a space for a staff member in the reporting team to fill in the above-described program shooting state information for the scene hierarchical level. Items such as "scene memo contents: [Dsc]" and the like are provided for the "scene memo" space.

Scene Memo Contents

Memos relating to the reporting and shooting state for the scene hierarchical level are filled in here. Specifically, messages, warnings, or proposals, which a staff member is making based on things noticed in increments of scenes, characteristics and impressions of the shot scene, incidents occurring during taking the scene, and so forth, are primarily what is filled in here.

(Cut Hierarchical Level)

Next, the cut hierarchical level is divided in to the "cut instructions" space, the "cut memo" space, and "take correlation information" space, as shown in FIG. 4.

The "cut instructions" space is a space for staff in the project-making and planning team to fill in the above-described production instruction information for the cut hierarchical level. The "cut instructions" space has items such as, for example, "cut No.: [NO]", "cut title: [Ttl]", and so forth.

Cut No.

The unique number assigned to at least one cut making up one scene is filled in here. The cut No. is a serial No. assigned in the order of cuts within one report, for example, so the same cut No. is not used twice in the same scene. For example, the scene to which the scene No. 1 is assigned, shown in FIG. 4 (the scene on "Outside Shot of Shop"), is made up of two cuts, with the cut No. "1" assigned to the first cut in the order of cuts, and the cut No. "2" assigned to the second cut in the order of cuts. Thus, it can be said that the cut No. is information instructing the order of cuts.

Cut Title

This is the title of the cut. In the example in FIG. 3, the titles "Entire Shop" and "Shop Entrance" are filled in here. The contents of the cut title correspond to the cut configuration in the scenario, and function as the information for instructing the cut contents to be shot, and accordingly should be filled in specifically enough that the cameraman can tell what to shoot. Further, an arrangement may be made wherein the space for "cut instructions" further includes an item "cut instruction contents" for describing the contents of the cut in a more detailed manner.

Also, the space "cut memo" is a space for the reporting teams staff to fill in program shooting state information of the cut hierarchical level. Items such as "cut memo contents: [Dsc]" are provided to the "cut memo" space.

Cut Memo Contents

Memos relating to the reporting and shooting state for the cut hierarchical level are filled in here. Specifically, messages, warnings, or proposals, which a staff member is making based on things noticed in increments of cuts, characteristics and impressions of the cut, incidents occurring during taking the cut, and so forth, are primarily what is filled in here.

Also, the "take correlation information" space is a space for the reporting terminal 20 or the editing terminal 30, for example, to input the above-described take correlation information. The "take correlation information" has items such as "take data" which includes "take No.", "in point" and "out point", "OK/NG", "video file name", "low-res file name", "take meta data file name", and so forth.

Take Data

The "take data" includes items such as "take No.", "in point", and "out point".

Take No.

An identifier such as a unique number assigned each take is filled in here. The take No. is a No. sequentially assigned in the order that takes are made by the reporting team, for example, and are assigned unrelated to the scenario intended by the project-making and planning team. Accordingly, as a rule, the same take No. is not used for different takes.

Also, the take No. may be a UMID (Unique Material IDentifier), for example. A UMID is an identifier which can globally uniquely determine picture material such as content data or the like, and has been standardized in SMPTE 330M (Society of Motion Picture and Television Engineers 330M). The UMID in the present embodiment is a basic UMID including at least the device No. of the picture-taking device 40 and time information, for example. This UMID is assigned to, for example, the content data in increments of takes (increments of video files), so takes can be determined by the UMID.

Thus, assigning take Nos. unrelated to the scenario to the picture material allows the scenario and the picture material to be separated. Also, due to using the UMID as the take No., for example, the same take No. can be kept from being assigned to different takes, whereby the scenario and the picture material can be separated in a more perfect way. Note that the take No. is automatically created by the picture-taking device 40 and input, for example.

In Point and Out Point

The time code of an editing start position (in point) and the time code of an editing end position (out point), which are determined at an editing stage, are input to the "in point" and "out point". In the event that the time code has been input as "09:43:52:01" for example, this means "the No. 1 frame at 43 minutes and 52 seconds past 9 o'clock". The in point and out point information is an example of information representing the range of the necessary picture portion extracted from the content data of this take, i.e., information representing the valid range used in the picture program. Note that the time code may be arranged so as to include date information as well, in addition to the above time information and frame information.

OK/NG

"OK" or "NG" is input here. In the event that OK is input, this means that the content data of the take is to be used. On the other hand, in the event that NG is input, this means that the content data of the take is not to be used. In the event that multiple takes are correlated to one cut, as a rule, only one take is assigned OK, and the rest are NG. In this way, the OK/NG information serves as information for selecting the one take to be used from the takes correlated to the cut. Note that the OK/NG information is input from the picture-taking device 40 or field PC 50, either manually or automatically.

Video File Name

The file name where the content data of the original picture of this take is recorded is input here. The video file name has a file name unique for each picture material, unrelated to the scenario, as with the take No. Accordingly, the content data of the original picture can be determined by the video file name. Note that the video file name may be manually input by the cameraman or the like, or may be automatically created by assigning a sequential No. in the order of taking takes, by the picture-taking device 40 or the field PC 50, for example. Note that the extension .mfx on the video file name means that the file is "material exchange format" content data.

Low-Res File Name

The file name of the file where the low-resolution picture and the low-resolution audio of the take is stored, is input here. The low-res file name has a file name unique for each picture material, unrelated to the scenario, as with the take No. Accordingly, the content data of the original picture can be determined by the low-res file name. Note that the low-res file name may be manually or automatically input by the picture-taking device 40 or the field PC 50, for example. Recording the low-resolution pictures and the low-resolution audio along with the original pictures and audio allows the low-resolution pictures and the low-resolution audio, which are small in file size, to be transmitted from the site to the broadcasting station or the like beforehand, whereby rough editing and the like can proceed before the original pictures and audio arrive.

Take Meta Data File Name

The file name of the take meta data corresponding to the take is input here. The take meta data file name functions as information correlating the cut hierarchical level of the program meta data PM with the take meta data TM. The take meta data file may be manually or automatically input by the picture-taking device 40 or the field PC 50, for example.

This take correlation information, which is made of the sort of items described above, allows takes to become subordinate to cuts within the program meta data PM. For example, in the example shown in FIG. 2, two takes identified by take Nos. "1" and "12" are linked to the cut (the cut in the top space) identified by program ID "P2002-10", report ID "A20002-1001", scene No. "1", and cut No. "1". In this way, the take correlation information functions to connect cuts which the project-making and planning team intend with the actual picture material obtained by the reporting team.

Thus, the terms within the program meta data PM, and the contents of the meta data, have been described in detail. It should be noted that neither the items of the program meta data nor the contents thereof are restricted to the above-described example, and that a wide variety of various types information relating to picture program production information, such as instructions regarding reporting equipment, production schedules, status of progress of work, captured still shots, memos regarding work proceeding at other teams, and so forth, may be input.

<2.4 Take Meta Data>

Figure 5:
FIG. 5 is an explanatory diagram illustrating in detail an example of the contents of one set of take meta data according to the first embodiment.

Next, the take meta data TM will be described in detail with reference to FIGS. 2, 4, and 5. FIG. 5 is an explanatory diagram illustrating in detail the contents of one set of take meta data TM according to the present embodiment.

First, the relation between the configuration of the take meta data TM and the program meta data PM will be described. Upon content data of a certain take being recorded by the picture-taking device 40, take meta data TM is created on a one-to-one basis corresponding to the content data of the take, for example. That is to say, each time a take is shot, new take meta data TM is created. Accordingly, the greater the number of takes shot, the greater the number of files of the take meta data TM created. For example, with the example in FIG. 2, fifteen takes have been shot for the thirteen cuts, so the number of files of the take meta data TM created is also fifteen.

In this way, the take meta data TM files are created as files independent from the program meta data PM file, and are created for each take.

Moreover, the take meta data TM is correlated with a cut in the cut hierarchical level along with the content data, by the take correlation information (the item "take meta data file name") within the above-described program meta data PM. For example, the take meta data TM1 is correlated with the cut identified by program ID "P20002-10", report ID "A20002-1001", scene No. "1", and cut No. "1". Here, the take meta data TM is correlated with this cut along with the video file 1 and the low-res file 1 as well. Further, the take meta data TM2 is also correlated with this cut. In this way, multiple sets of take meta data TM can be correlated to a single cut. Conversely, one set of the take meta data TM can be correlated to multiple cuts.

Next, the contents of the take meta data TM will be described. The contents of the take meta data TM are, for example, take shooting conditions information and take shooting state information, and so forth. The take shooting conditions information is meta data representing the shooting conditions of the picture-taking device 40 or the like at the time of shooting each take. The take shooting conditions information is automatically generated in increments of takes by the picture-taking device 40 or the like, for example, and is written to the take meta data TM. Also, the take shooting state information is meta data relating to the shooting state of the take, for example. The take shooting state information is generated in increments of takes by the field PC 50 or the like, based on input by a reporting team staff member, for example, and is written in the take meta data TM.

As a specific example, as shown in FIG. 5, the take meta data TM has the take shooting state information item "take memo contents: [Dsc]", and take shooting conditions information items such as "date: [Date]", "time: [Time]", "latitude-and-longitude information: [Pos]", "device No.: [Machine]", and "device settings information: [Setup]".

Take Memo Contents"

Memos relating to the shooting state for each take are filled in here. Specifically, messages, warnings, or proposals, which a staff member is making based on things noticed in increments of takes, characteristics and impressions of the take, incidents occurring during taking the take, matters relating to the content data of the take, and so forth, are primarily what is filled in here.

Date

The date when the take was shot is input here.

Time

The time when the take was shot is input here.

Latitude-and-Longitude Information

GPS information relating to the latitude and longitude of the location where the take was shot is input here.

Device No.

The device No. of the picture-taking device 40 which shot the take is input here.

Device Settings Information

Settings (or setup) information of the picture-taking device 40 which shot the take is input here. The device settings information includes types of camera filters, the state (on, off, or level) of the white balance switch, gain switch, DCC (dynamic contrast control) switch, shutter switch, lens extender switch, and so forth.

As described above, the take meta data TM is meta data relating to only takes, and takes are the actual shooting work. Thus, the take meta data includes no meta data whatsoever that relates to the project or plan, such as the scenario. Each team having a part in producing the picture program can understand for example what is in the content data corresponding to the take meta data TM, the shooting conditions, the state of the equipment, as so forth, by making reference to the take meta data TM arranged thus. Particularly, the take meta data TM is useful for the editing team editing the content data.

<2.5 Directory Configuration of the Planning Sheet Meta Data>

Figure 6:
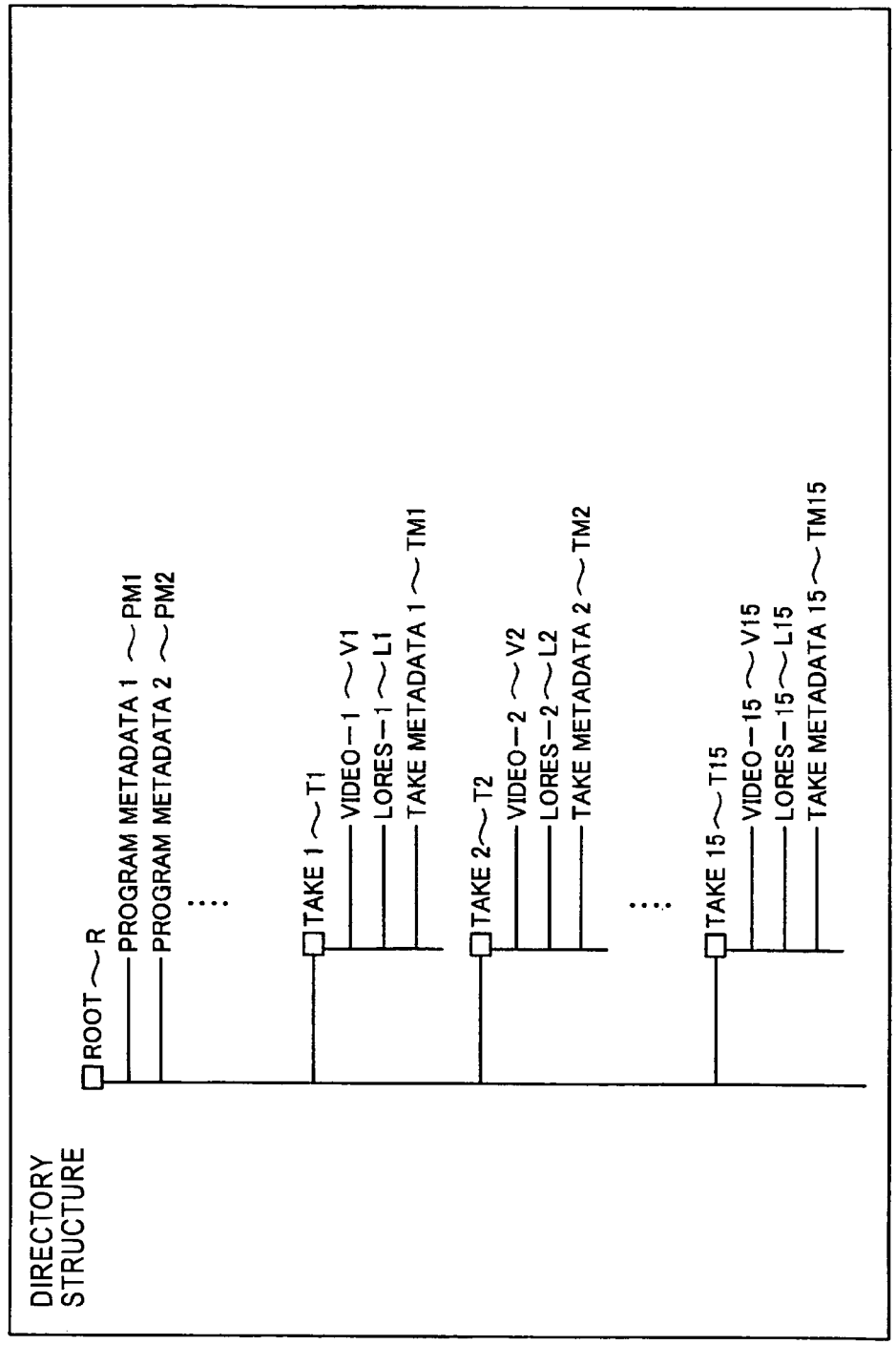
FIG. 6 is an explanatory diagram illustrating an example of directory configuration of the planning sheet meta data according to the first embodiment.

Next, the directory configuration of the planning sheet meta data according to the present embodiment will be described in detail with reference to FIG. 6. FIG. 6 is an explanatory diagram illustrating an example of the directory configuration of the planning sheet meta data according to the present embodiment.

As shown in FIG. 6, with the directory configuration according to the present embodiment, multiple program meta data files PM1, PM2, and so forth, and multiple take folders T1, T2, and so forth, are positioned in parallel with regard to a root directory R, for example. Each take folder Tn contains, for example, a video file Vn of original pictures, a low-res file Ln of the low-res pictures, a take meta data file TMn, and so forth, each relating to the same take. Note that this directory configuration is applied to storing the planning sheet meta data and the content data in the recording media such as the optical disk 3, and in recording devices of the terminals 10, 20, and 30, and so forth.

In this way, positioning the program meta data file PM corresponding to the scenario or the like, and the file group relating to takes, in a parallel manner, allows both file contents to be processed independently. Further, multiple sets of picture material and the meta data thereof (i.e., multiple sets of content data and the take meta data TM), and multiple sets of scenario meta data (i.e., multiple sets of program meta data PM), can be freely linked.

<2.6 Characteristics of the Planning Sheet Meta Data>

The prominent characteristics of the planning sheet meta data configured as described above are as follows, for example.

(1) The planning sheet meta data is created as a file, in an electronic file format which can be read by the picture-taking device 40 and the like as well as by computers. Thus, the project-making and planning team, reporting team, and editing team can be consistently provided with electronic file format planning sheet meta data, thereby improving the accuracy and speed of production.

(2) The program meta data PM is formed of a hierarchical structure. And each picture program is managed as a single file. Further, not only production instruction information, but also program shooting state information is included in the production meta data PM in a hierarchically-organized manner, so the entire contents of the picture program can be readily understood by all involved. Further, the picture-taking staff can not only easily understand what is to be shot based on the production instruction information in the cut hierarchical level, but also can avoid forgetting to shoot certain cuts, since shooting is repeated for each cut. Moreover, the order in which the cuts are shot may be entirely arbitrary, and re-takes are also allowable.

(3) The program meta data PM and the take meta data TM are created as separated files. Accordingly, the meta data contained in the program meta data PM can be restricted to meta data relating to the scenario and the like, thereby suppressing the amount of data of the program meta data PM shared between the teams. Further, the meta data relating to the intent of the project-making and planning side, such as the scenario, and the meta data relating to the picture material actually shot, can be managed separately. Accordingly, the program meta data PM and the take meta data TM can be processed independent of each other.

(4) The take meta data TM has a separate file created for each take. Thus, the content data and take meta data TM can be combined for each take. Here, the take meta data TM functions as index information for the corresponding content data.

(5) The take correlation information for correlating the content data and take meta data TM of the same take with a cut is contained on the program meta data PM. Accordingly, the picture material (content data in increments of takes) can be flexibly correlated to each cut at the program meta data PM side. For example, multiple sets of picture material may be correlated with a single cut, or the same picture material may be correlated with multiple cuts. Further, the same picture material may be correlated to cuts belonging to different sets of program meta data PM.

In this way, the planning sheet meta data according to the present embodiment is capable of improving production efficiency of picture programs, due to the above-described characteristics thereof.

<3. Project-Making Terminal>

Figure 7:
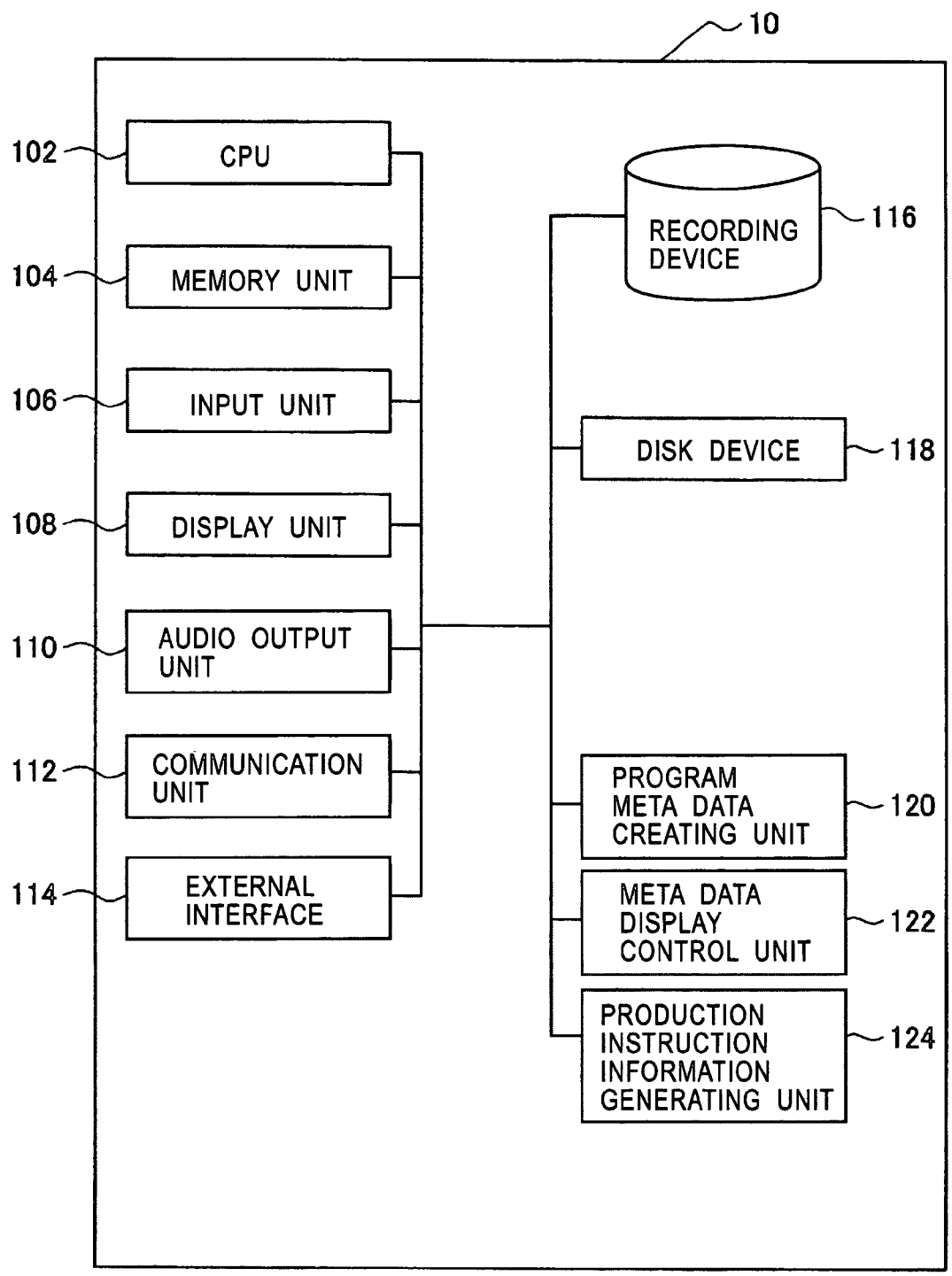
FIG. 7 is a block diagram illustrating the schematic configuration of a project-making terminal according to the first embodiment.

Next, the project-making terminal 10 according to the present embodiment will be described in detail with reference to FIG. 7. FIG. 7 is a block diagram illustrating the schematic configuration of the project-making terminal 10 according to the present embodiment.

As shown in FIG. 7, the project-making terminal 10 comprises a CPU 102, memory unit 104, input unit 106, display unit 108, audio output unit 110, communication unit 112, external interface 114, recording device 116, disk device 118, program meta data creating unit 120, meta data display control unit 122, and production instruction information generating unit 124.

The CPU 102 functions as a computation processing device and control device, whereby the processing of each component of the project-making terminal 10 can be controlled. Also, the memory unit 104 is configured of RAM, ROM, flash memory, or the like for example, and functions to store various types of data relating to processing by the CPU 102, and operating programs and the like for the CPU 102.

The input unit 106 is configured of an input device such as a mouse, keyboard, touch panel, and so forth. A project-making and planning team staff member can use this input unit 106 to input the contents of production instruction information and so forth, to the program meta data PM, for example.

The display unit 108 is configured of a CRT monitor or liquid crystal monitor, for example. The display unit 108 can display the planning sheet meta data and the picture data contained in the content data, and so forth. For example, the display unit 108 can display low-res pictures to be transmitted by the later-described picture taking device 40 in real-time while shooting, for example. Also, the audio output unit 110 is configured of a sounding device such as a speaker or the like, and an audio data processing device or the like, and can output audio data contained in the content data.

The communication unit 112 can exchange various types of data, such as the planning sheet meta data like the program meta data PM or the like, and content data such as the low-res pictures, for example, between the reporting terminal 20 and the editing terminal 30 and the like, via the network 5. Also, the communication unit 112 is capable of coding processing such as KLV (Key Length Value) coding or the like in the event of transmitting the data over the network 5 using SDIs (Serial Digital Interface), for example. Also, with the present embodiment, the communication unit 112 functions as a program meta data providing unit for providing at least the program meta data PM to the reporting terminal 20 or the editing terminal 30 over the network 5.

The external interface 114 is a member for communication of data between peripheral devices connected to the project-making terminal 10 by USB (Universal Serial Bus) or SCSI (Small Computer System Interface) or the like. The peripheral devices here are, for example, read/write devices such as disk devices, examples thereof including optical disk drives or hard disk drives or the like, printers, scanners, and so forth.

The recording device 116 is a storage device configured of a hard disk drive or the like, for example, and is capable of storing various types of data, such as various types of programs, planning sheet meta data, content data such as original pictures or low-res pictures, and so forth.

The disk device 118 is a device for writing and reading content data, planning sheet meta data, various types of application programs, and so forth, to and from recording media, examples thereof including various types of optical disks 3 such as, for example, DVD-Rs, DVD-RAMs, CD-Rs, magneto-optical disks, magnetic disks such as flexible disks and hard disks and the like, and semiconductor memory and the like. The disk device 118 may be built into the project-making terminal 10, for example, or may be externally attached to the project-making terminal 10.

The program meta data creating unit 120 functions to create new electronic file format program meta data PM. More specifically, upon the input unit 106 being operated by a staff member of the project-making and planning team, to instruct creation of new planning sheet meta data, the program meta data creating unit 120 automatically creates the framework for a new program meta data PM set, for example. The term "framework" as used here means the layout for the spaces and items in the program meta data PM, such as shown in FIG. 2, for example. This program meta data PM is created by being described in a tag language such as XML (extensible Markup Language), for example.

Further, the program meta data creating unit 120 can assign a new file name which has been created either automatically or manually, to the program meta data PM newly created as described above, and save the file of the program meta data PM in the recording device 116 or the like.

Also, the meta data display control unit 122 can interpret the program meta data PM newly created by the program meta data creating unit 120, for example, and convert each data set into a table format which is easy to handle, as shown in FIG. 2. Further, the meta data display control unit 122 can effect control so as to display the program meta data PM converted into table format on the display unit 108. This allows the staff member of the project-making and planning team to view the program meta data PM arranged in table format.

The production instruction information generating unit 124 can generated the production instruction information as the program meta data PM. More specifically, the production instruction information generating unit 124 generates production instruction information, which is text data of the like, based on the input of a staff member on the project-making and planning team, for example. Further, the production instruction information generating unit 124 can sequentially write the generated production instruction information to the predetermined items of the predetermined spaces in the newly created program meta data PM by the program meta data creating unit 120.

Due to the processing performed by the production instruction information generating unit 124, the staff of the project-making and planning team can sequentially input the production instruction information corresponding to the planned scenario to each item in the program meta data PM, by operating the input unit 106 while making reference to the displayed framework of the program meta data PM.

The program meta data PM created thus is saved in the recording device 116, for example, and also is provided to the reporting terminal 20 or editing terminal 30 or the like through the network 5 for example, by the communication unit 112.

Note that the program meta data creating unit 120, the meta data display control unit 122, and the production instruction information generating unit 124 may be configured as a dedicated device (hardware), for example, or as an application program to be installed in the project-making terminal 10 which is a computer or the like, to execute the above-described processing, as long as the above-described processing functions can be realized. Further, in the case of the latter, the application program may be provided to the project-making terminal 10 in the form of a recording medium such as a CD-ROM or the like, or may be provided by externally downloading through the communication unit 112. Also, the application program maybe stored beforehand in the memory unit 104 or recording device 116 of the project-making terminal 10, or in a peripheral device or the like connected to the external interface 114.

<4. Reporting Device>

Next, the picture-taking device 40 and the field PC 50 making up the reporting terminal 20 according to the present embodiment will be described.

<4.1 Picture-Taking Device>

First, the picture-taking device 40 according to the present embodiment will be described with reference to FIG. 8. Note that FIG. 8 is a block diagram illustrating a schematic configuration of the picture-taking device 40 according to the present embodiment.

Figure 8:
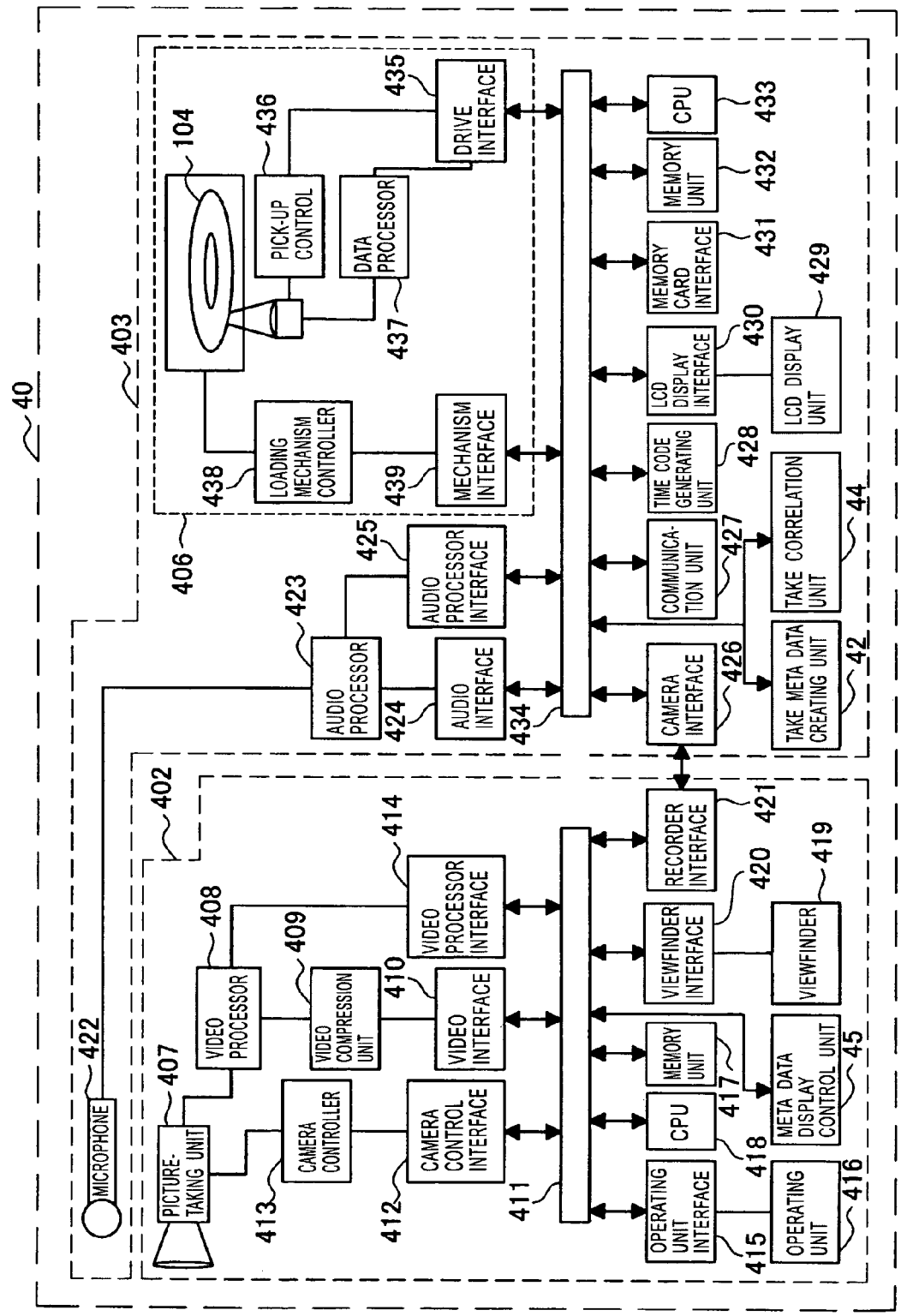
FIG. 8 is a block diagram illustrating the schematic configuration of an picture-taking device according to the first embodiment.

As shown in FIG. 8, the picture-taking device 40 has, for example, a camera block 402 for controlling various types of picture taking processing and for generating picture data, and a recorder block 403 for generating audio data and meta data and also performing communication of the content audio data and meta data and recording and reproducing these to and from the optical disk 3.

First, the configuration of the camera block 402 will be described in detail. As shown in FIG. 8, the camera block 402 is made up of a picture-taking unit 407, video processor 408, video compression unit 409, video interface 410, data bus 411, camera control interface 412, camera controller 413, video processor interface 414, operating unit interface 415, operating unit 416, memory unit 417, CPU 418, viewfinder 419, viewfinder interface 420, recorder interface 421, and meta data display control unit 45.

The picture-taking unit 407 comprises, for example, an optical system block, a driving system block, an imaging device such as a CCD (Charge-Coupled Device) or the like, and is capable of taking pictures of a subject and outputting the picture data. The optical system block is made up of a lens, diaphragm, filter, and so forth, and casts optical images of subjects on to the imaging device. The driving block can adjust the lens diaphragm, zoom, exposure, focus, and so forth. The imaging device can perform photoelectric conversion of the optical image and output electrical picture data, using multiple pixels formed of two-dimensionally arrayed photoelectric converters provided on the light-receiving face thereof.

The video processor 408 performs A/D conversion processing, white balance processing, gamma correction processing, aperture processing for outline correction, CDS (correlated double sampling) processing for reducing noise, and so forth, with regard to the picture data generated by the picture-taking unit 407. The video processor 408 is controlled by the CPU 418 via the video processor interface 414.

The video compression unit 409 compresses (encodes) the picture data from the video processor 408, using MPEG1 (Moving Pictures Experts Group 1), MPEG2-TS, MPEG2-PS, or the like, so as to generate the low-res pictures. Or, the video compression unit 409 may output the unprocessed picture data(the original pictures) without compression, for example. Also, the video interface 410 functions as a medium for transferring the picture data (the original pictures and low-res pictures) from the video compression unit 409 to the data bus 411.

The camera controller 413 controls the picture-taking unit 407 so as to suitably adjust the lens diaphragm, zoom, exposure, focus, and so forth, based on instruction signals from the CPU 418, for example. Also, the camera controller 413 has a timing generator, for example, capable of generating timing signals. Also, the camera controller interface 412 functions as a medium for transferring instruction signals from the CPU 418 or the like for example, to the camera controller 413.

The operating unit 416 is made up of various buttons, levers, dials, and so forth, for example. The cameraman can, for example, turn the electric power source one and off, perform picture taking operations, reproduction operations, zoom operations, mode changing operations, editing operations of the pictures and meta data, and so forth, by manually operating the operating unit 416. The CPU 418 generates instruction signals for executing various types of processing at each component of the camera block 402, such as, for example adjusting the lens diaphragm or adjusting the zoom, starting and ending recording, and so forth, based on operations made on the operating unit 416. Also, the operating unit interface 415 functions as a medium for transferring operating signals relating to operation of the operating unit 416 to the data bus 411.

The CPU 418 has functions for controlling the components within the camera block 402. Also, the memory unit 417 is made up of, for example, RAM, ROM, and so forth, for recording or temporarily storing various types of data relating to picture-taking processing such as picture-taking conditions and the like, control software programs and the like for the CPU 418, and so forth.

The viewfinder 419 is a display unit for the picture-taking device, configured of a small-size LCD monitor or the like, for example. The viewfinder 419 allows the operator to view picture data being shot or picture data being reproduced. The cameraman can thus view the subject to be shot, monitor the subject while shooting, check the picture data in the content data recorded in the disk 3, and further perform simple editing tasks of the content data, all while viewing the viewfinder. Further, the viewfinder 419 is capable of superimposing the program meta data PM or the take meta data TM alone or superimposed on the picture data, for example. Also, the viewfinder interface 420 functions as a medium for transferring the picture data or planning sheet meta data transferred from the device 411 to the viewfinder 419.

The recorder interface 421 functions as a medium for transferring data between the camera block 402 and the recorder block 403. The meta data display control unit 45 will be described later.

Next, the configuration of the recorder block 403 will be described in detail. As shown in FIG. 8, the recorder block 403 comprises a microphone 422, audio processor 423, audio interface 424, audio processor interface 425, camera interface 426, communication unit 427, time code generating unit 428, LCD display unit 429, LCD display interface 430, memory card interface 431, memory unit 432, CPU 433, recording/reproducing unit 406, take meta data creating unit 42, and take correlation unit 44.

The camera interface 426 functions as a medium for transferring data between the camera block 402 and the recorder block 403.

The microphone 422 collects sound in the shooting environment, and generates audio data. The audio processor 423 performs A/D conversion processing, audio adjustment processing, and the like, with regard to the audio data input from the microphone 422. The audio processor 423 is capable of compressing the audio data subjected to A/C conversion, if necessary. The audio processor 423 is controlled by the CPU 433 through the audio processor interface 425. Also, the audio interface 424 serves as a medium for transferring audio data to the data bus 434.

The communication unit 427 can communicate various types of data, such as planning sheet meta data and content data, between the project-making terminal 10, field PC 50, editing terminal 30, and so forth, via the network 5, for example. Specifically, the communication unit 427 can obtain the program meta data PM created by the project-making terminal 10, for example, by reception through the network 5. Thus, the communication unit 427 is configured as a program meta data obtaining unit which the picture-taking device 40 according to the present embodiment is provided with. Also, the communication unit 427 is capable of transmitting the take meta data TM which the later-described take meta data generating unit 42 has created or the program meta data PM which the later-described take correlation unit 44 has edited, to the field PC 50, editing terminal 30, project-making terminal 10, and so forth, via the network 5. Further, the communication unit 427 can transmit content data such as the low-res pictures generated by the camera block 402 for example, to the field PC 50, editing terminal 30, project-making terminal 10, and so forth through the network 5, either simultaneously while shooting, or following shooting. Also, the communication unit 427 can perform coding such as KLV coding or the like, in the event that the data is to be transmitted through the network 5 by SDI, for example.

The time code generating unit 428 performs time counting of a time code at the time of shooting, for example, and attaches the time code generated thus to each frame of the content data. Note that arrangements may be made wherein, instead of the time code, date-and-time information code including date information and time code is attached, or wherein frame Nos. are attached to each frame making up the content data, for example.

The LCD display unit 429 can display, for example, the picture data contained in the content data, the time code, audio output level, program meta data PM, take meta data TM, and so forth. Also, the LCD display interface 430 functions as a medium for transferring the above-described various types of data from the data bus 434 to the LCD display unit 429.

The memory card interface 431 can read and write various types of data such as the planning sheet meta data to recording media such as, for example semiconductor memory and the like. Note that with the preset embodiment, the planning sheet meta data can be communicated through the network 5, so the memory card interface 431 is not indispensable.

The CPU 433 functions to control the processing of each unit in the recorder block 403. Also, the memory unit 432 is made up of, for example, RAM, ROM, and so forth, for recording or temporarily storing various types of data such as the planning sheet meta data and the like, control software programs and the like for the CPU 433, and so forth.

As shown in FIG. 8, the recording/reproducing unit 406 comprises, for example, a drive interface 435, pick-up control 436, data processor 437, loading mechanism controller 438, and mechanism interface 439.

The data processor 437 can convert the content data into a data format which can be recorded on and reproduced from the optical disk 3. Also, the pick-up control 436 can control the position of a laser generator and photo-receptor (not shown) to record and reproduce content data to and from the optical disk 3. Also, the mechanism interface 439 functions as a medium for transferring control signals and the like from the data bus 434 to the data processor 437 and the pick-up control 436.

The loading mechanism controller 438 can control a mechanism for mounting/dismounting the optical disk 3 on the drive (hereafter referred to as a "loading mechanism", not shown in the drawings). Also, the mechanism interface 439 functions as a medium for transferring control signals and the like from the data bus 434 to the loading mechanism controller 438.

The recording/reproducing unit 406 configured thus can record content data including the picture data taken as described above and the audio data that has been collected, for example, on the optical disk 3. At this time, the recording/reproducing unit 406 can record, for example, content data as files in increments of takes. Also, the recording/reproducing unit 406 can record not only content data of original pictures, for example, but also content data of low-resolution pictures. Also, the recording/reproducing unit 406 is capable of recording not only the above-described content data, for example but also, the edited planning sheet meta data, on the optical disk 3. Further, the recording/reproducing unit 406 can also reproduce the content data and the planning sheet meta data stored in the optical disk 3. Accordingly, the recording/reproducing unit 406 also serves as a program meta data obtaining unit for obtaining program meta data PM from the project-making terminal 10 through a recording medium such as the optical disk 3 or the like.

The take meta data creating unit 42 creates new take meta data TM for each take, and can input the take shooting conditions information as the content of the created take meta data TM.

More specifically, each time a take is shot by the camera block 402, the take meta data creating unit 42 can automatically newly create a file for the take meta data TM relating to the take. Further, the timing for newly creating a file for the take meta data TM may be an arbitrary timing, such as simultaneously with the start of shooting the take, an arbitrary point during shooting the take, immediately after shooting the take or after a predetermined amount of time has elapsed following shooting the take, and so forth.

Also, the take meta data creating unit 42 can collect information such as shooting conditions information and the like relating to the take for example (information relating to the various items of the take meta data TM shown in FIG. 5 for example) from the components of the picture-taking device 40, and automatically generate the take shooting conditions information. For example, the take meta data creating unit 42 can collect information regarding the date and time when the shooting processing of the take was started from the time code generating unit 428, obtain settings information regarding the picture-taking device 40 such as the level of AGC gain, the state of the while balance switch, whether the DCC switch is on or off, and so forth, from the memory unit 417 of the camera block 402, the camera controller 413, the video processor 408, and so forth. The timing at which the take meta data creating unit 42 automatically generates the take shooting conditions information may be an arbitrary time within the period from the start to the end of the take shooting processing, for example.

Further, the take meta data creating unit 42 can input the take shooting conditions information generated in this way into the newly-created take meta data TM file, for example, as content of the take meta data TM. The take meta data TM created as described above is recorded in the memory unit 432, optical disk 3, or the like, for example.

The take correlation unit 44 generates the take correlation information, and can additionally input this take correlation information to the take correlation information space in the cut hierarchical level of the program meta data PM obtained from the project-making terminal 10. Thus, the take correlation unit 44 can correlate the content data recorded for each take and the take meta data TM for the take to a cut within the program meta data PM.

More specifically, first, the take correlation unit 44 selects, for example, a cut with which the content data of the take and the take meta data TM of the take is to be correlated, based on cut selecting operations by the cameraman (details described later). Next, upon the shooting of the take ending, for example, the take correlation unit 44 automatically generates the take correlation information. Further, the take correlation unit 44 inputs the generated take correlation information to the space corresponding to the selected cut, from the cuts within the program meta data PM.

Thus, the take correlation information written thereto is, for example, the take No., OK/NG information, video file name, low-res file name, and take meta data file name, and so forth, as shown in FIG. 2. The following is a description of how the take correlation unit 44 generates and inputs this take correlation information.

First, the take No. will be described. In the event that there are no take Nos. already appropriated to cuts, the take correlation unit 44 sets the take No. to "1". On the other hand, in the event that take Nos. have already been assigned to cuts, the take correlation unit 44 increments the greatest already-assigned take No. by 1, and uses this as the take No. Note that this take No. may be the above-described UMID, for example.

Next, the OK/NG information will be described. The take correlation unit 44 generates OK/NG information based on OK/NG selecting operations (described later in detail) by the cameraman, for example, and inputs "OK" or "NG" to the appropriate space.

Next, the video file name, low-res file name, and take meta data file name will be described. The take correlation unit 44 obtains the file name of the original picture and low-res picture recorded in the optical disk 3 for example, and input this to the appropriate space. Also, the take correlation unit 44 obtains the file name of the take meta data TM generated by the above-described take meta data creating unit 42, and inputs this to the appropriate space.

Thus, the take correlation unit 44 can generate take correlation information and additionally input this to the program meta data PM. Accordingly, the take correlation unit 44 functions as a reporting terminal meta data editing unit for editing at least program meta data PM, for example.

Also, the meta data display control unit 45 of the camera block 402 can execute conversion processing of the planning sheet meta data, for example, as well as executing display control processing for displaying the planning sheet meta data subjected to the conversion processing, on the view finder 419.

More specifically, the meta data display control unit 45 is capable of, for example, interpreting the program meta data PM obtained by the communication unit 427 via the network 5, and converting the items of the program meta data PM into a table format (see FIG. 2) which can be easily handled. Also, the meta data display control unit 45 can, for example, execute processing for narrowing down the items of the program meta data PM converted into the table format as described above. Further, the meta data display control unit 45 can effect control such that the program meta data PM in the table format wherein the items have been narrowed down, as described above, is displayed on the viewfinder 419 (see the later-described FIG. 9). Accordingly, the cameraman can view the program meta data PM in the table format that has been narrowed down to the necessary items, and easily understand the number, configuration, etc., of the scenes and cuts to be shot.

Note that the take meta data creating unit 42, take correlation unit 44, and meta data display control unit 45, such as described above, may be configured as a dedicated device (hardware), for example, or as an application program to be installed in the picture-taking device 40, to execute the above-described processing, as long as the above-described processing functions can be realized. Further, in the case of the latter, the application program may be provided to the picture-taking device 40 in the form of a recording medium such as a CD-ROM or the like, or may be provided by externally downloading through the communication unit 427. Also, the application program may be stored beforehand in the memory units 418 or 432 within the picture-taking device 40, or the like.

Also, the take meta data creating unit 42, and/or the take correlation unit 44 as described above may be provided in the field PC 50 or the like. Further, the take correlation unit 44 may be provided to the editing terminal 30 or the like, for example.

Now, a specific example of the program meta data PM displayed on the viewfinder 419 of the picture-taking device 40 according to the present embodiment, and the cut selecting operation and OK/NG selecting operations, will be described, with reference to FIG. 9. Note that FIG. 9 is an explanatory diagram illustrating an example of the program meta data displayed on the viewfinder 419 of the picture-taking device 40, according to the present embodiment.

As shown in FIG. 9, the viewfinder 419 displays the program meta data PM' wherein the items have been narrowed down. Examples of the narrowed-down items include, for example, program ID, program title, reporting ID, reporting title, scene No., cut No., and so forth.

Further, the view finder 419 also displays the shooting cut selecting portion 46, corresponding to the reporting hierarchical level, scene hierarchical level, and cut hierarchical level, of the program meta data PM', for example. The shooting cut selecting portion 46 is for selecting from the multiple cuts a cut corresponding to the take to be shot, and is configured of touch-screen buttons, for example. The touch screen buttons are a report selecting button 462, scene selecting button 464, cut selecting button 466, and so forth, for example.

The cameraman can operate these selecting buttons 462, 464, and 466, so as to select a desired cut (cut selection operations) before shooting, for example. That is to say, the cameraman can select the cut to which the take which is to be shot now is to be assigned, for example, by touching the selecting buttons 462, 464, and 466 within the displayed program meta data PM'.

For example, in the example shown in FIG. 9, as indicated by the heavy border lines, the report wherein the report ID is "A20002-1001" is selected, the scene wherein the scene No. is "1" is selected, and the cut wherein the cut No. is "1" is selected. Also, in the example shown in FIG. 9, the No. 1 take and the No. 2 take are assigned to this cut, for example.

In the event that the cameraman does not perform such cut selection operations such as described above, a cut which is in the No. 1 place in the program meta data PM', or a cut selected in the past, is automatically selected. Subsequently, each take is assigned to the same cut unless cut selection operations are performed, i.e., each time the take shooting processing is repeated, and the take Nos. are incremented automatically.

Further, cut selection operations such as describe above may be performed following shooting. That is to say, instead of assigning the take to a cut before shooting one take, an arrangement may be made wherein the take is assigned to a desired cut immediately following shooting one take, or, wherein multiple takes are assigned to desired cuts all at once following shooting multiple takes, for example, in this case, at the time of shooting for example, an arrangement may be made wherein the scene No. is "0", and the shot takes are sequentially temporarily correlated to imaginary cuts set such that the cut No. is incremented from "1" each time a take is shot.

Also, the view finder 419 also displays an OK/NG button 48, for example. This OK/NG button 48 is for selecting whether the content data of the shot take is "OK (satisfactory)" or "NG (unsatisfactory)", and is configured of a touch screen button, for example. The cameraman operates this OK/NG button 48 following shooting a take, for example, and thus can select whether or not the take is OK (OK/NG selection operations). For example, in the example shown in FIG. 9, the take with the take No. 1 is "OK", and the take with the take No. 2 is "NG".

In the event that the cameraman do not perform such OK/NG selection operations, the take correlation unit 44 may be arranged to automatically input "OK" to the OK/NG space, or to leave that space blank, for example. Also, in the event that there is only one take assigned to the cut, the take correlation unit 44 may be arranged to automatically set that take to "OK".

Now, specific examples of the program meta data PM displayed on the viewfinder 419 and the cut selection operations and OK/NG selection operations have been described. While the cut selection operations and OK/NG selection operations have been described with reference to an example of being carried out using touch screen buttons on the viewfinder 419, the present invention is by no means restricted to this arrangement, and for example, selection buttons may be provided on the operating unit 416 of the picture-taking device 40 to carry out the operations. Further, the operations may be made from a GUI (Graphical User Interface) on the picture-taking device 40 or the field PC 50, for example.

Thus, the picture-taking device 40 according to the present embodiment has been described. The primary functions of the picture-taking device 40 can be summarized as follows, for example.

The picture-taking device 40 has functions of shooting the subject for each cut, based on the program meta data PM. Also, the picture-taking device 40 has functions for recording the shot content data on the optical disk 3 or the like, for each take, and functions for reproducing the content data recorded on the optical disk 3. In this way, the picture-taking device 40 is a combination of a video camera and a recording/reproducing device.

Also, the picture-taking device 40 functions as a program meta data obtaining unit for obtaining the program meta data PM from the project-making terminal 10 via the network 5 or the like, for example. Further, the picture-taking device 40 functions to, for example, interpret the obtained program meta data PM, and convert the data such as shown in FIG. 2 into a table format which can be easily handled by the user. Also, the picture-taking device 40 has functions of displaying the program meta data PM which has been converted into the table format on a display unit (viewfinder 419 or the like).

Further, the picture-taking device 40 has functions for automatically creating the take meta data TM corresponding to the shot content data, for example, for each take. Also, the picture-taking device 40 has functions for editing the program meta data PM by generating the take correlation information and attaching this to the program meta data, or the like. Moreover, the picture-taking device 40 also has functions for recording the planning sheet meta data made up of the created take meta data TM and the edited program meta data PM and the like in the optical disk 3 or the like, or transmitting this over the network 5.

<4.2 Field PC>

Next, the field PC 50 according to the present embodiment will be described with reference to FIG. 10. Note that FIG. 10 is a block diagram illustrating the schematic configuration of the field PC 50 according to the present embodiment.

Figure 10:
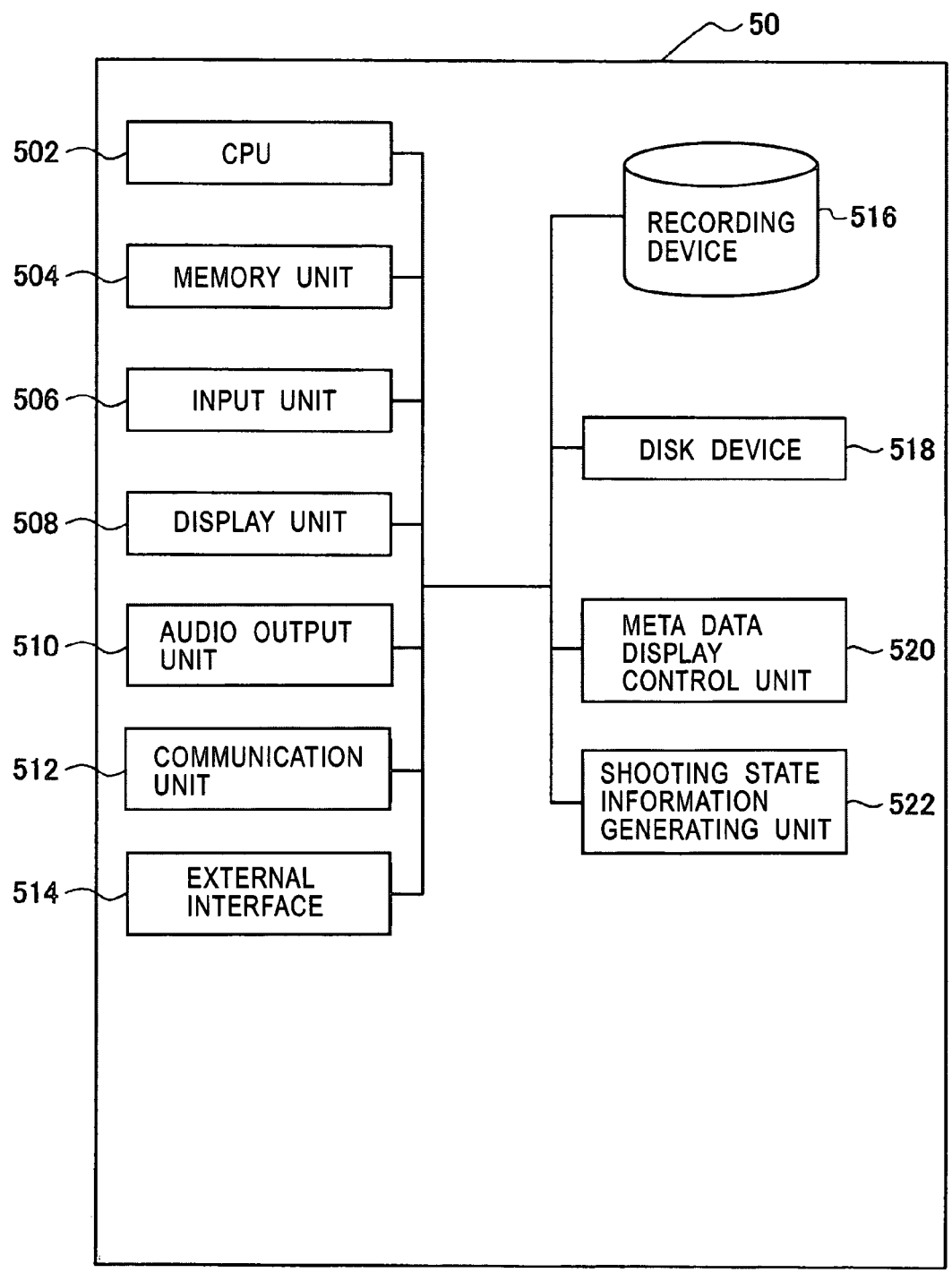
FIG. 10 is a block diagram illustrating the schematic configuration of a field PC according to the first embodiment.

As shown in FIG. 10, the field PC 50 comprises a CPU 502, memory unit 504, input unit 506, display unit 508, audio output unit 510, communication unit 512, external interface 514, recording device 516, disk device 518, meta data display control unit 520, and shooting state information generating unit 522.

Note here that the functional configuration of the CPU 502, memory unit 504, display unit 508, audio output unit 510, external interface 514, recording device 516, and disk device 518, of the field PC 50, are the same as the functional configuration of the memory unit 104, display unit 108, audio output unit 110, external interface 114, recording device 116, and disk device 118, of the project-making terminal 10, and accordingly, description thereof will be omitted.

The input unit 506 is configured of an input device such as a mouse, keyboard, touch panel, or the like. A reporting staff member uses the input unit 506 to input the contents of program shooting state information to the program meta data PM, and input the contents of take shooting conditions information to the take meta data TM, for example.

The communication unit 512 can communicate various types of data, such as planning sheet meta data such as the program meta data PM and the take meta data TM, and low-res picture content data and the like, between the project-making terminal 10, picture-taking device 40, editing terminal 30, and so forth, via the network 5, for example. In this way, the communication unit 512 is configured as a program meta data obtaining unit which the field PC 50 according to the present embodiment has. Also, the communication unit 512 can perform coding such as KLV coding or the like, in the event that the data is to be transmitted through the network 5 by SDI, for example.

The disk device 518 can read out the program meta data PM and take meta data TM and the like that is recorded in a recording medium such as the optical disk 3 or the like. Accordingly, the disk device 518 also functions as a program meta data obtaining unit for obtaining the program meta data PM from the project-making terminal 10 or picture-taking device 40 or the like through a recording medium.

Also, the meta data display control unit 520 can interpret the program meta data PM obtained from the project-making terminal 10 through the network 5, and convert this into a table format which is easy to handle, as shown in FIG. 2. Further, the meta data display control unit 520 can effect control so as to display the converted program meta data PM on the display unit 508. This allows a staff member of the reporting team to view the program meta data PM arranged in the table format.

Also, the meta data display control unit 520 can interpret the take meta data TM obtained from the picture-taking device 40 through the network 5, and convert this into a table format which is easy to handle, as shown in FIG. 5. Further, the meta data display control unit 520 can effect control so as to display the converted take meta data TM on the display unit 508. This allows a staff member of the reporting team to view the take meta data TM arranged in the table format.

The shooting state information generating unit 522 can generate the program shooting conditions information as the program meta data PM. More specifically, the shooting state information generating unit 522 generates the program shooting conditions information, which is text data, based on input from a staff member of the reporting team, for example. Further, the shooting state information generating unit 522 can sequentially write the generated program shooting conditions information, for example, to the appropriate items in the program meta data PM. Specifically, as described with reference to FIGS. 3 and 4, the program shooting conditions information is filled into items such as, for example, reporting memo contents, scene memo contents, cut memo contents, and so forth.

Further, the shooting state information generating unit 522 can generate the take shooting state information as take meta data TM. More specifically, the shooting state information generating unit 522 generates the take shooting state information, which is text data, based on input from a staff member of the reporting team, for example. Further, the shooting state information generating unit 522 can write the generated take shooting state information to the appropriate items in the take meta data TM. Specifically, as described with reference to FIG. 5, the take shooting state information is filled into items such as, for example, take cut memo contents, and so forth.

Thus, the shooting state information generating unit 522 can add program shooting state information or take shooting state information to the already-existing program meta data PM or take meta data TM. Accordingly, from this perspective, the shooting state information generating unit 522 functions as a meta data editing unit for the reporting terminal, for editing the program meta data PM and take meta data TM.

Due to the processing of the shooting state information generating unit 522 such as described above, the staff of the reporting team can input memos or the like regarding the shooting state recognized in the reporting and shooting stages, for example, in the program meta data PM and take meta data TM. That is to say, the staff of the reporting team can input program shooting state information in a desired item of the program meta data PM, while viewing the program meta data PM which has been arranged in the table format. Also, the staff of the reporting team can input take shooting state information in a desired item of the take meta data TM, while viewing the listed take meta data TM.

Note that the meta data display control unit 520 and the shooting state information generating unit 522 may be configured as a dedicated device (hardware), for example, or as an application program to be installed in the field PC 50 which is a computer or the like, to execute the above-described processing, as long as the above-described processing functions can be realized. Further, in the case of the latter, the application program may be provided to the field PC 50 in the form of a recording medium such as a CD-ROM or the like, or may be provided by externally downloading through the communication unit 512. Also, the application program maybe stored beforehand in the memory unit 504 or recording device 516 of the field PC 50, or in peripheral devices connected with the external interface 514.

The program meta data PM and take meta data TM thus edited and updated is saved in the recording device 516 for example, and is provided to the picture-taking device 40 and the like through the network 5 for example, using the communication unit 512.

Also, there are cases wherein the editing and updating processing of the planning sheet meta data by the picture-taking device 40 (e.g., processing for generating take correlation information) is performed simultaneously and in parallel with the editing and updating processing of the planning sheet meta data by the field PC 50 (e.g., processing for generating program shooting state information and take shooting state information). Accordingly, the picture-taking device 40 or the field PC 50 is configured so as to be capable of synchronization processing of the planning sheet meta data. This synchronization processing is processing wherein, in the event that the picture-taking device 40 and the field PC 50 both separately edit and change the contents of the planning sheet meta data which was the same at first, the changes made by both are reflected in both. Also, an arrangement may be made wherein, in the event that the picture-taking device 40 and the field PC 50 both separately edit and change the same item within the planning sheet meta data, for example, the reporting team staff either selects one edition, or the synchronization processing automatically lists both updated contents in parallel.

Due to this synchronization processing, even in the event that the planning sheet meta data provided from the project-making terminal 10 is edited and changed by both the picture-taking device 40 and the field PC 50, the picture-taking device 40 or the field PC 50 can output planning sheet meta data with integrated editing contents to the editing terminal 30 or the like.

<5. Editing Terminal>

Next, the editing terminal 30 according to the present embodiment will be described with reference to FIG. 11. Note that FIG. 11 is a block diagram illustrating the schematic configuration of the editing terminal 30 according to the present embodiment.

Figure 11:
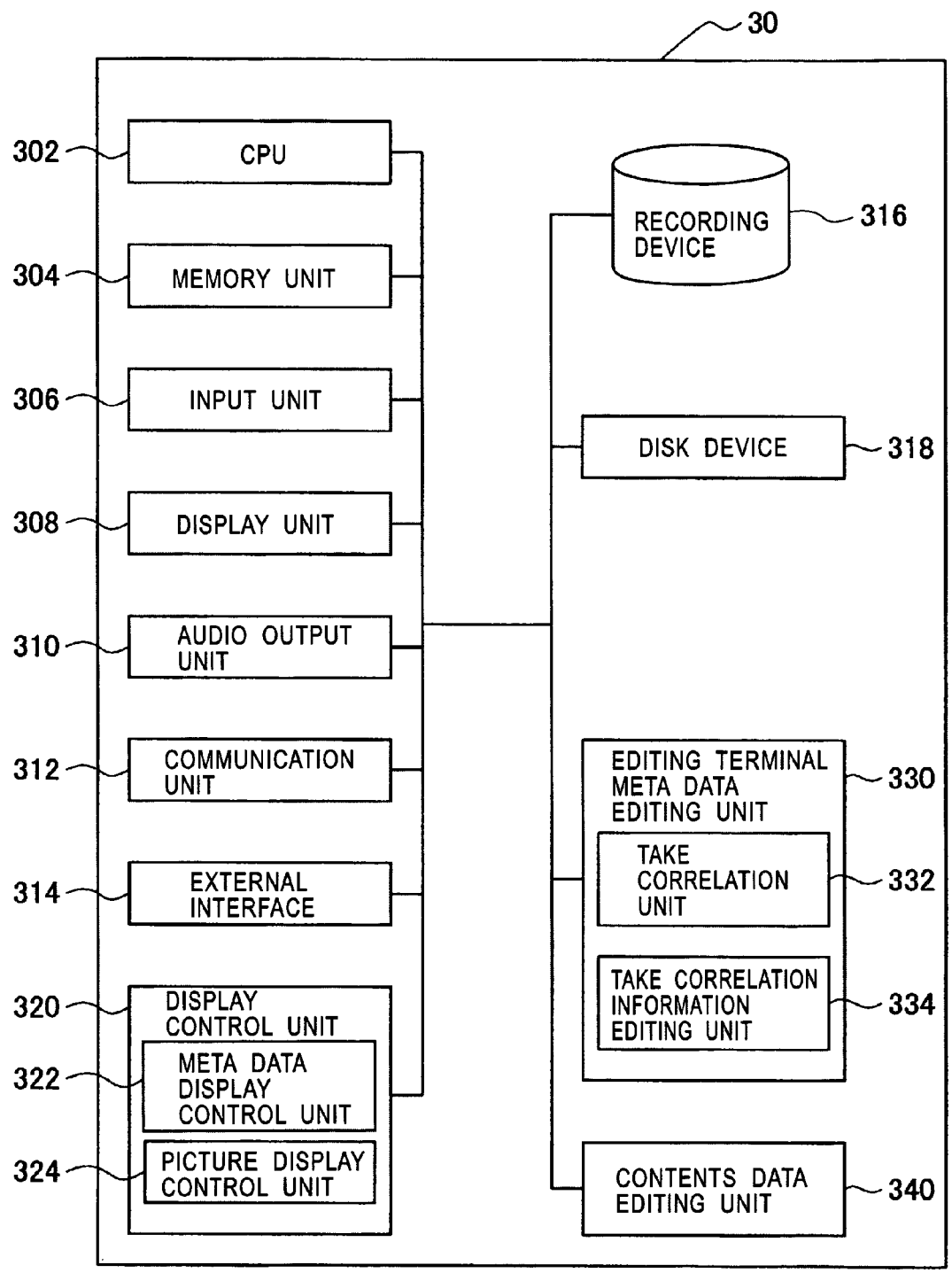
FIG. 11 is a block diagram illustrating the schematic configuration of an editing terminal according to the first embodiment.

As shown in FIG. 11, the editing terminal 30 comprises a CPU 302, memory unit 304, input unit 306, display unit 308, audio output unit 310, communication unit 312, external interface 314, recording device 316, disk device 318, display control unit 320, editing terminal meta data editing unit 330, and content data editing unit 340.

Note that the functional configurations of the CPU 302, memory unit 304, display unit 308, audio output unit 310, external interface 314, and recording device 316, of the editing terminal 30, are the same as the functional configurations of the memory unit 104, display unit 108, audio output unit 110, external interface 114, and recording device 116, of the project-making terminal 10, and accordingly, description thereof will be omitted.

The input unit 306 is configured of a commonly-used input device (not shown) such as, for example, a mouse, keyboard, touch panel, or the like, and a picture editing input device (not shown) and the like. The picture editing input device has various types of editing buttons, such as an in-point deciding butting for deciding in points, an out-point deciding butting for deciding out points, a picture playing button, a stop button and so forth, and jog dials or levers or the like for adjusting the picture playing speed, selecting content data to be played, and so forth. Staff of the editing team can play the content data in many ways (including fast-forward and rewind and the like), decide the in point and out point, and so forth, by operating the picture editing input device, for example.

The communication unit 312 can communicate various types of data, such as planning sheet meta data such as the program meta data PM and the take meta data TM, and low-res picture content data and the like, between the project-making terminal 10, reporting terminal 20, and so forth, via the network 5. In this way, the communication unit 312 is configured as a program meta data obtaining unit which the editing terminal 30 according to the present embodiment has. Also, the communication unit 312 can perform coding such as KLV coding or the like, in the event that the data is to be transmitted through the network 5 by SDI, for example. As described above, the content data such as the planning sheet meta data and low-res pictures received by the communication unit 312 are recorded in a recording device 316, for example. Note that the content data such as the planning sheet meta data and low-res pictures and the like are recorded in the optical disk 3 and the like by the disk device 318, for example.

The disk device 318 is a recording and reproducing device capable of recording to and reproducing from an optical disk 3 provided from the picture-taking device 40, for example, may have generally the same configuration as the recording/reproducing unit 406 of the picture-taking device 40 as described above with reference to FIG. 8, for example, and be built into the editing terminal 30. Also, the disk device 318 may be externally provided through the external interface 314, and configured as a recording/reproducing device configured separately from the editing terminal 30. In this case, the disk device 318 may be provided with a CPU, memory unit, editing input device, communication unit, computer interface, meta data or picture display control unit, or the like, similar to those described above.

The disk device 318 can play the content data such as the original pictures and low-res pictures recorded in the optical disk 3, for example, and display this on the display unit 308. The playing and displaying of the content data is controlled by a later-described picture display control unit 324. Also, the disk device 318 is capable of, for example, reading out the planning sheet meta data recorded in the optical disk 3, and displaying this on the display unit 308. Displaying of the planning sheet meta data is controlled by the later-described meta data display control unit 322. Accordingly, the disk device 318 also functions as a program meta data obtaining unit in the event of obtaining the program meta data PM from the project-making terminal 10 or reporting terminal 20 through a recording medium such as the optical disk 3, or the like.

Also, the disk device 318 can record content data in the optical disk 3, for example. The disk device 318 can record content data of low-res pictures transmitted via the network 5, and content data extracted in editing processing by the later-described content data editing unit 340, for example, in the optical disk 3. Also, the disk device 318 can record the planning sheet meta data, for example, in the optical disk 3. For example, the disk device 318 can record the planning sheet meta data transmitted via the network 5, or the planning sheet meta data updated in the editing processing performed by a later-described editing terminal meta data editing unit 330 in the optical disk 3.

Also, the disk device 318 may be arranged such that content data, planning sheet meta data, various types of application programs, and so forth, can be read from and written to recording media such as, for example, flexible disks, hard disks, magnetic disks, semiconductor memory, and so forth, besides the above-described optical disk 3. Thus, the editing terminal 30 is able to obtain the planning sheet meta data from memory cards, for example, as well.

The display control unit 320 is configured of, for example, a meta data display control unit 322, and a picture display control unit 324.

The meta data display control unit 322 can interpret the program meta data PM obtained from the reporting terminal 20 through the network 5 or the optical disk 3, and convert this into a table format which is easy to handle, as shown in FIG. 2. Further, the meta data display control unit 322 can effect control so as to display the converted program meta data PM on the display unit 308. This allows a staff member of the editing team to view the program meta data PM arranged in table format, and understand the scenario, state at the time of shooting, and so forth, of the picture program to be edited.

Also, the meta data display control unit 322 can interpret the take meta data TM obtained from the reporting terminal 20 through the network 5 or the optical disk 3, for example, and convert this into a table format which is easy to handle, as shown in FIG. 5. Further, the meta data display control unit 322 can effect control so as to display the converted take meta data TM on the display unit 308. This allows a staff member of the editing team to view the take meta data TM arranged in table format, or separately, for example, and understand the scenario of the content data corresponding to the take meta data TM, shooting conditions at the time of shooting, and so forth.

The picture display control unit 324 can control playing processing of the content data, based on the planning sheet meta data. The content data to be played here may be the original pictures or low-res pictures recorded in the optical disk 3, or may be low-res pictures which have been received through the network 5 and recorded in the recording device 312 or the like. Due to the control effected by this picture display control unit 324, content data can be played and displayed in a wide variety of formats.

For example, the picture display control unit 324 control the disk device 318 so as to sequentially and consecutively play (consecutively display) the content data of OK takes in the order of the reporting, scenes, and cuts, following the scenario.

Describing this consecutive playing processing in further detail, first, the picture display control unit 324 reads out and interprets the program meta data PM of the planning sheet meta data.

Next, the picture display control unit 324 determines the order of the reporting, scenes, and cuts, to be played, based on the production instruction information of the program meta data PM. Determining this order can be made by making reference to the reporting ID, scene No., and cut No., or the like, for example. That is to say, for example, scenes are sequentially played in order from scenes with small scene Nos., and cuts are sequentially played in order from cuts with small cut Nos.

Further, the picture display control unit 324 determines the takes corresponding to the cuts to be played, based on the take correlation information of the program meta data PM, and obtains the file name of the content data of the determined take. At the time of determining this take, in the event that there are two or more takes assigned to one cut, the picture display control unit 324 makes reference to the OK/NG information, and selects the OK take.

Subsequently, the picture display control unit 324 instructs the disk device 318 to play the content data with the video file name that has been obtained. Thus, the disk device 318 plays the content data of the specified take.

Next, the picture display control unit 324 determines the cut to be played next, in the same way as described above, determines the take, and gives information specifying the file of the content data (e.g., file name, UMID, and so forth). Repeating this processing enables continuous playing of the content data following the order in the scenario, to be realized.

Further, for example, allowing the meta data display control unit 322 to function while consecutively playing the picture data, enables all or part of the program meta data PM or take meta data TM to be display along with the picture (i.e., superimposed thereupon).

Also, the picture display control unit 324 can be arranged so as to play only the content data of one take selected by the editing team staff, for example (single playing).

Describing this single playing processing in further detail, first, the meta data display corneal unit 322 displays the program meta data PM on the display unit 308. Next, the staff of the editing team selects a desired take from multiple takes on the program meta data PM (this may be selected using a touch screen or GUI input, for example), upon which the picture display control unit 324 obtains the file name of the content data for that take, based on the take correlation information. Further, the picture display control unit 324 instructs the disk device 318 so as to display only the content data of the obtained video file name. Thus, the dusk device 318 is enabled to play only the content data of the specified take.

Further, in the event that the later-described content data editing processing has ended, and the in point and out point information is input to the program meta data PM, the picture display control unit 324 executes processing for extracting only the necessary portion of the content data of the take, and reproducing and displaying, based on the in point and out point information. The picture display control unit 324 can continuously play a completed movie program by combining the processing with the continuous playing processing.

In this way, the display control unit 320 can execute a wide variety of display control processing, based on the planning sheet meta data. Thus, the editing team staff can speedily view desired content data prior to editing, in a desired format. Further, the editing team staff can understand the overall makeup and image of the picture program to be edited, by viewing the consecutively-played content data of the picture program to be edited, in the order following the scenario. Accordingly, the editing processing can be made more efficient. Also, following the editing processing, the contents of the completed picture program can be readily confirmed by the editing team staff viewing the consecutively-played content data.

The editing terminal meta data editing unit 330 can edit the program meta data PM and take meta data TM, for example. The editing terminal meta data editing unit 330 comprises a take correlation unit 332, and a take correlation information editing unit 334.

The take correlation unit 332 has generally the same functional configuration as the take correlation unit 44 of the picture-taking device 40 described above for example, so detailed description thereof will be omitted. The take correlation unit 332 functions in the event that the editing team staff correlates cuts and takes using the editing terminal 30. Note that the take correlation unit 332 is not indispensable in the event that the picture-taking device 40 has the take correlation unit 44 described above, for example.

On the other hand, in the event that,the picture-taking device 40 does not have the take correlation unit 44, i.e., in the event that the cuts of the program meta data PM and the shot takes are not yet correlated, the take correlation unit 332 can generate the take correlation information in the editing stage, for example, so as to correlate the takes and cuts. At this time, which take to correlated with which cut can be judged based on information obtained from the cameraman of the reporting team via the network 5, for example. Or, the editing team staff may make this judgement by making reference to the take meta data TM of the take or playing the content data of the take.

Also, there may be cases wherein the picture-taking device 40 has the take correlation unit 44 described above, and the cuts and takes are correlated at the shooting stage, but no OK/NG information has been input yet, for example. That is to say, there may be cases wherein which take to use is left up to the judgment of the editing team by the reporting team staff. In such cases, the editing team staff sequentially plays the content data of the multiple takes correlated to the cuts, and selects which take to use, the results of which are input using the input unit 306. Next, the take correlation unit 332 generates "OK" or "NG" information based on the input of the editing team staff, for example, and enters this to the corresponding items in the program meta data PM.

The take correlation information editing unit 334 has functions for editing the take correlation information within the program meta data PM, based on the editing results of the content data. That is to say, the take correlation information editing unit 334 can generate the above-described in point information and out point information based on rough editing results of the editing staff member, and record this in point information and out point to the program meta data PM.

The rough editing processing will now be described in general, following which the functions of the take correlation information editing unit 334 will be described in fuller detail. Generally, the content data of a take is shot so as to be longer than the predetermined time of the cut in the scenario. Accordingly, there is the need to perform rough editing processing to extract the content data equivalent to the length of the cut, out of the content data of the take. In the event of performing this rough editing processing, the editing team member first plays and views the content data of the take correlated to the cut to be subjected to the rough editing, for example. Note that the playing of the content data can be performed well by the display control unit 320 as described above, so the editing team staff can performing such rough editing work quickly and easily.

Next, the editing team member extracts the necessary portion from the content data. This extracting work is performed by, for example, the editing team member pressing the in point deciding button or out point deciding button to select the respective in point and out point, on still images of the desired frames, while viewing the played picture.

The take correlation information editing unit 334 extracts the time codes for the frames selected by the editing team staff as the in point and out point, respectively. Thus, the take correlation information editing unit 334 is capable of generating the in point information and the out point information. Further, the take correlation information editing unit 334 enters the in point information and the out point information generated I this way, into the "in point" and "out point" items in the program meta data PM. Thus, take correlation information is completed, and the valid range of the content data of the take correlated to the cut is determined.

Also, such rough editing and in-point out-point information generating processing can be speedily performed using the low-res pictures. That is to say, with the present embodiment, the editing terminal 30 can obtain the planning sheet meta data and the low-res pictures from the reporting terminal 20 via the network 5, for example. Accordingly, the editing team staff can start the rough editing work at a relatively early stage, such as in parallel with the shooting work or immediately after, even though the optical disk 3 in which the original pictures have been recorded has not been transported from the reporting site to the editing team. Thus, the production efficiency of the picture program improves.

The content data editing unit 340 has functions for editing content data based on the planning sheet meta data, for example. That is to say, the content data editing unit 340 can extract the necessary portions of the content data of takes corresponding to all cuts making up the picture program by non-destructive editing, for example, thereby completing the content data making up the picture program.

More specifically, first, the content data editing unit 340 reads out and interprets the program meta data PM. Next, the content data editing unit 340 determines the first cut in the scenario, for example, based on the production instruction information of the program meta data PM. Further, the content data editing unit 340 determines which take is "OK" as to this cut, based on the take correlation information of the program meta data PM. Subsequently, the content data editing unit 340 obtains the in point information and the out point information regarding the content data relating to the determined take, from the take correlation information. Next, the content data editing unit 340 reads out the content data of the take using the disk device 318, and extracts the valid picture portion of the content data based on the in point information and the out point information. Moreover, the same processing is repeated following the order of the scenario with regard to the multiple cuts making up the picture program, thereby sequentially extracting the necessary content data. Thus, the content data editing unit 340 can complete content data for the picture program following the scenario.

Now, the above description has been made with reference to a case using non-destructive editing with the content data editing unit 340, but the present invention is by no means restricted to this arrangement. For example, the content data editing unit 340 may perform editing processing wherein the content data of the take corresponding to each cut is cut out based on the in point information and the out point information, and the cut out content data sets are joined together and recorded on a new recording medium. Also, the content data editing unit 340 may only create an EDL (Edit Decision List) and quit the editing processing. Note that this EDL is a list including the file name of the content data of the take, the UMID thereof, in point information, out point information, and other information necessary for editing.

Also, the content data editing unit 340 may also have functions for automatically or manually executing image quality adjustment processing of the content data, for example (e.g., adjustment of brightness or tone, correction of sharpness/unsharpness, reduction or removal or picture or audio noise, correlation of picture shaking, etc.). Also, the content data editing unit 340 may have functions for automatically or manually deleting abnormal picture portions within the content data (e.g., portions including excessive noise, portions with abnormal brightness or tone, etc.). Also, the content data editing unit 340 may have functions for superimposing caption data or computer graphics data, for example, on the content data, functions for synthesizing different sets of content data, functions for fading the content data in and out, and so forth. Such functions of the content data editing unit 340 are also useful in the main editing processing of the content data.

Note that the display control unit 320, the editing terminal meta data editing unit 330, and the content data editing unit 340 such as described above, may be configured as a dedicated device (hardware), for example, or as an application program to be installed in the editing terminal 30 which is a computer or the like, to execute the above-described processing, as long as the above-described processing functions can be realized. Further, in the case of the latter, the application program may be provided to the editing terminal 30 in the form of a recording medium such as a CD-ROM or the like, or may be provided by externally downloading through the communication unit 312. Also, the application program maybe stored beforehand in the memory unit 304 or recording device 316 of the editing terminal 30, or in peripheral devices connected with the external interface 314.

Now, the components of the editing terminal 30 have been described in detail. With such a editing terminal 30, necessary content data can be suitably played and displayed, based on the planning sheet meta data. Accordingly, the editing team staff can effectively decide the in point and out point, for example. Also, the editing terminal 30 can also generate in point information and out point information, and complete the program meta data PM. Further, the editing terminal 30 can edit the content data based on the planning sheet meta data, thereby completing the picture program.

6. Picture Program Production Assistance Method

Figure 12:
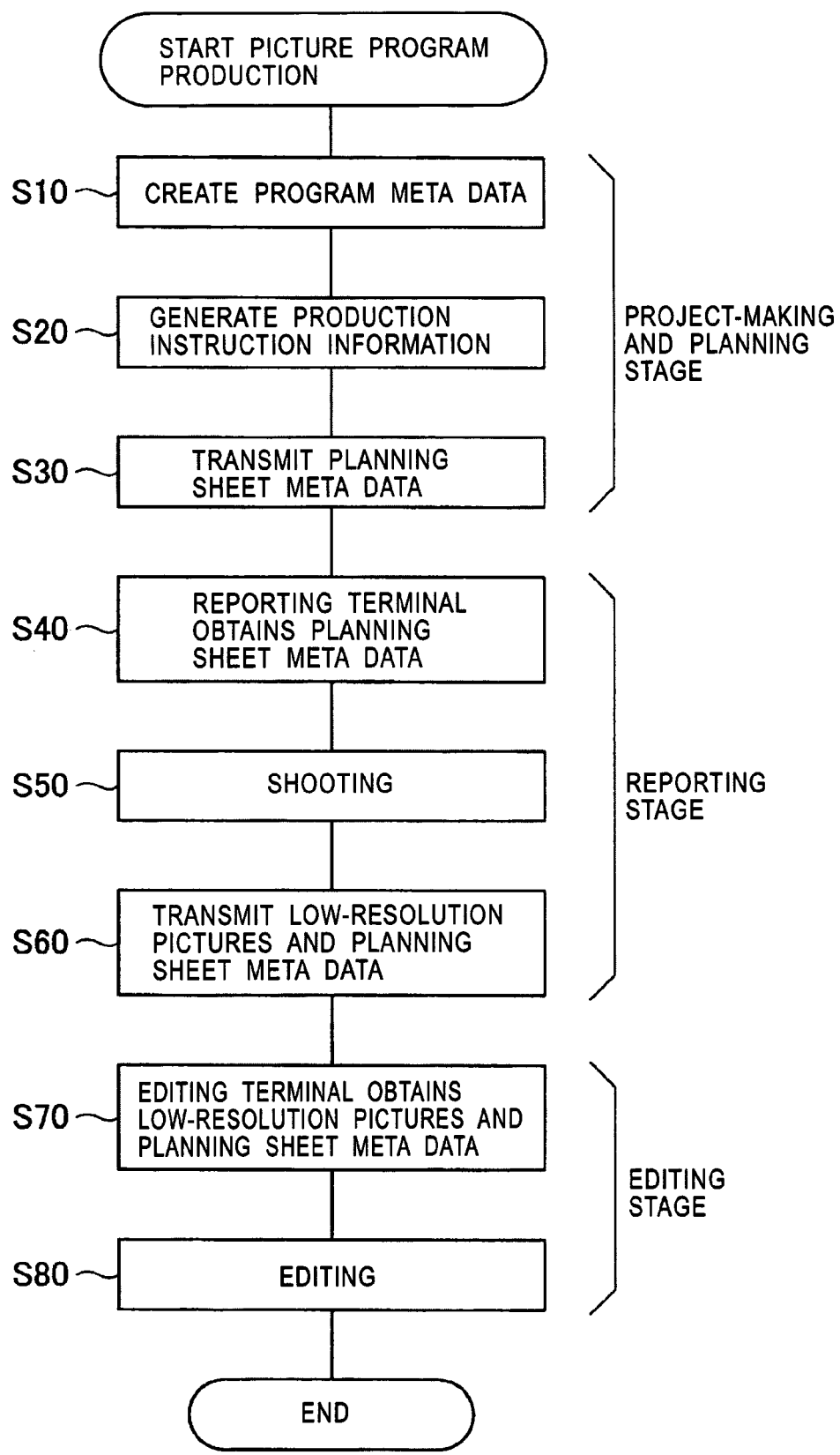
FIG. 12 is a flowchart illustrating the production flow with the picture program production assistance method according to the first embodiment.
Figure 13:
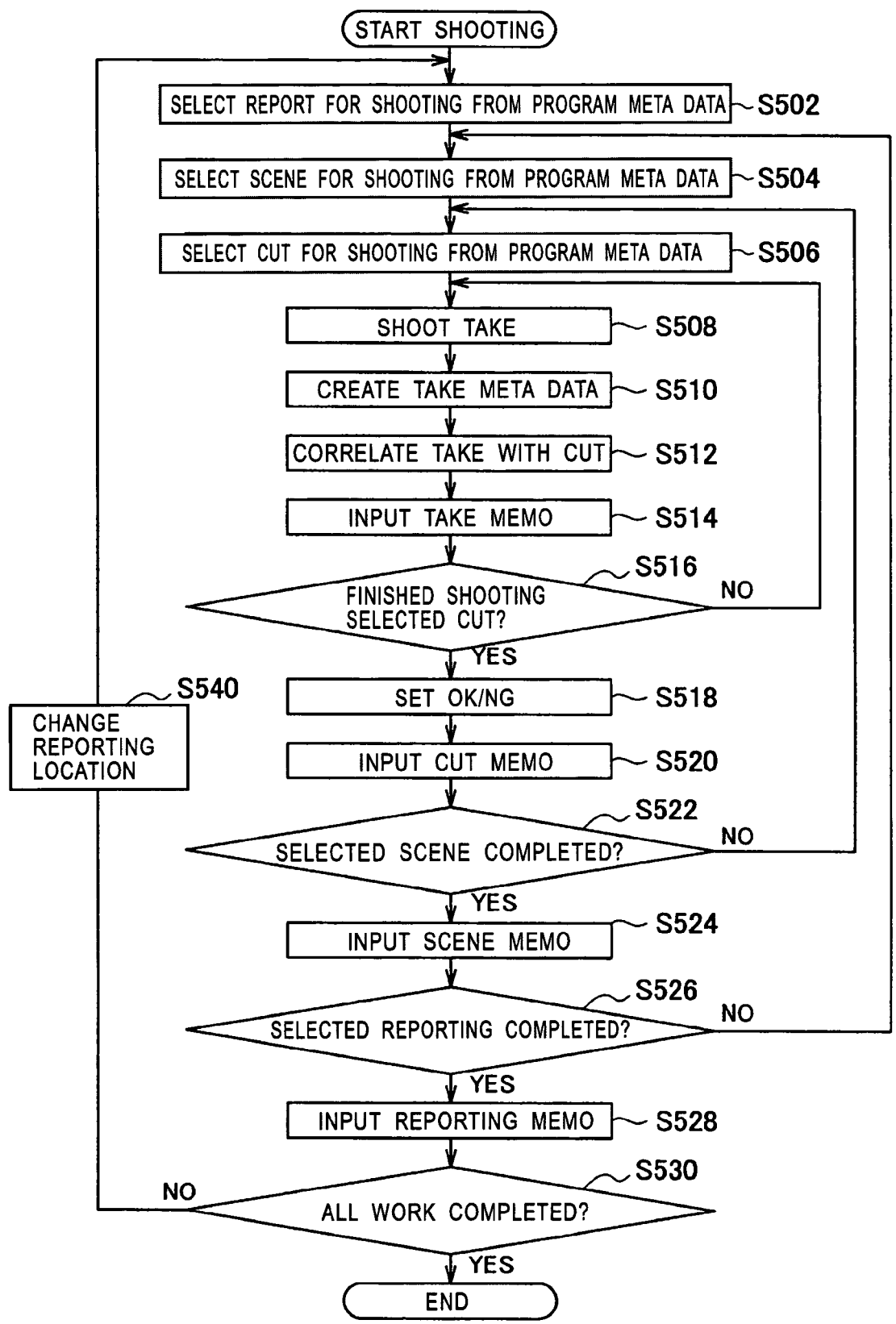
FIG. 13 is a flowchart illustrating in detail the picture-taking flow with the picture program production assistance method according to the first embodiment.
Figure 14:
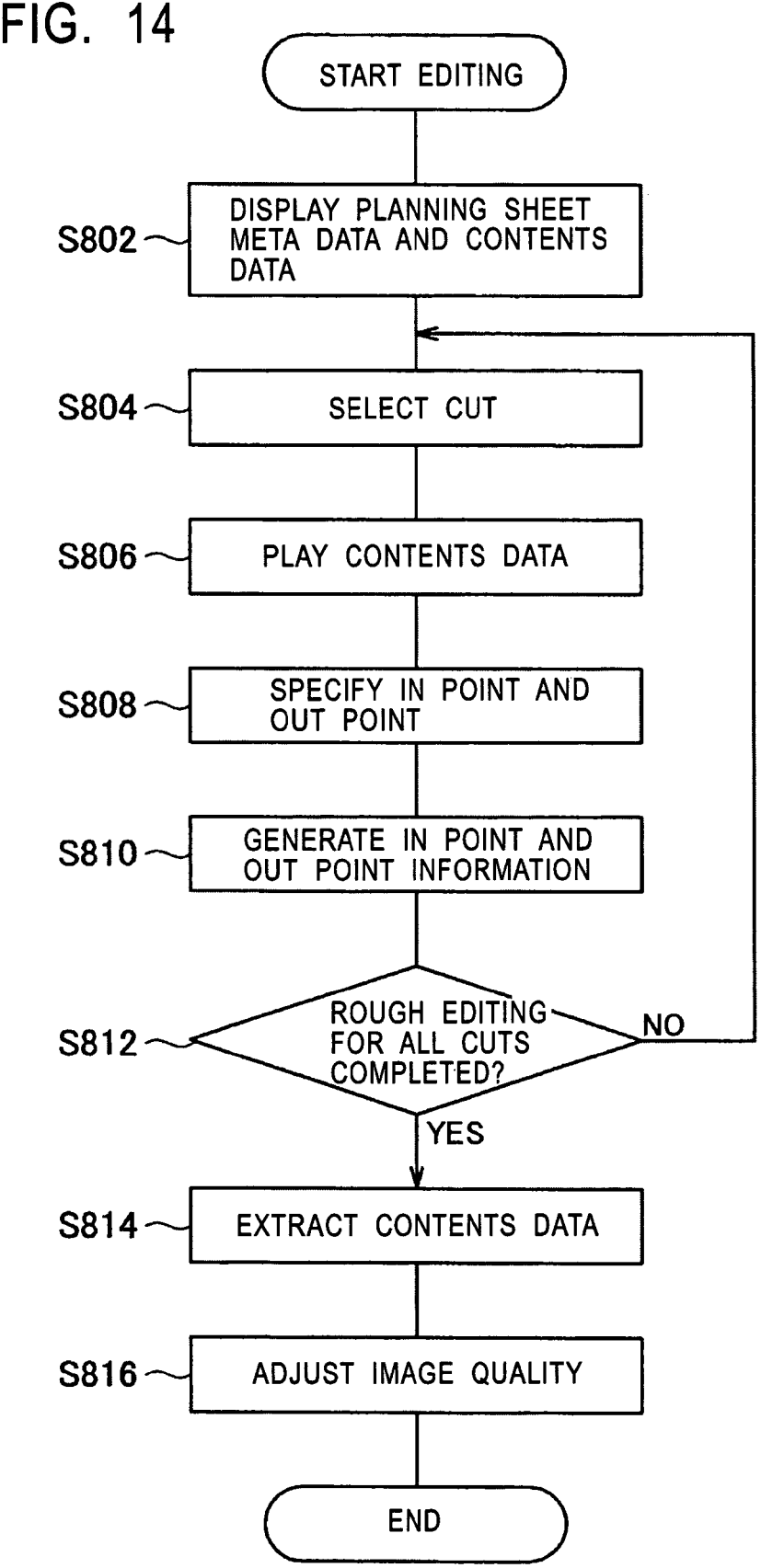
FIG. 14 is a flowchart illustrating in detail the editing flow with the picture program production assistance method according to the first embodiment.

Next, the picture program production assistance method carried out using the picture program production assistance system 1 configured as described above, will be described with reference to FIGS. 12 through 20. FIG. 12 is a flowchart illustrating the production flow with the picture program production assistance method according to the present embodiment. FIG. 13 is a flowchart illustrating in detail the picture-taking flow with the picture program production assistance method according to the present embodiment. Also, FIG. 14 is a flowchart illustrating in detail the editing flow with the picture program production assistance method according to the first embodiment. FIGS. 15 through 20 are explanatory diagrams illustrating examples of the configuration of the planning sheet meta data of the production flow with the picture program production assistance method according to the present embodiment, at the various stages.

As shown in FIG. 12, first, in step S10, the program meta data creating unit 120 of the project-making terminal 10 creates a new program meta data PM (step S10: program meta data creating step). Specifically, first, a staff member of the project-making and planning team plans and prepares a new picture program, which then needs to be created as a scenario (script) in an electronic file format. Next, the staff member of the project-making and planning team operates the input unit 106, for example, to instruct the project-making terminal 10 to create new planning sheet meta data. The program meta data creating unit 120 then newly creates one set of program meta data PM corresponding to the new picture program that has been made, in electronic file format, for example. The program meta data PM is simply the frame work of the planning sheet meta data, for example, which has been automatically created. Next, the meta data display control unit 122 displays the framework of the created program meta data PM on the display unit 108. Note that the newly-created program meta data PM may have a new file name, for example, provided thereto, and automatically be saved in the recording device 116 or the like.

Next, in step S20, the production instruction information generating unit 124 of the project-making terminal 10 generates production instruction information (step S20: production instruction information generating step). In detail, first, a project-making and planning team staff member operates the input unit 106 while viewing the framework of the program meta data PM displayed as described above, to input the production instruction contents corresponding to the scenario for each item of the program meta data PM. The production instruction information generating unit 124 generates the production instruction information which is text data or the like, for each item, based on input by the project-making team staff, and also sequentially writes the generated production instruction information to the corresponding items.

Figure 15:
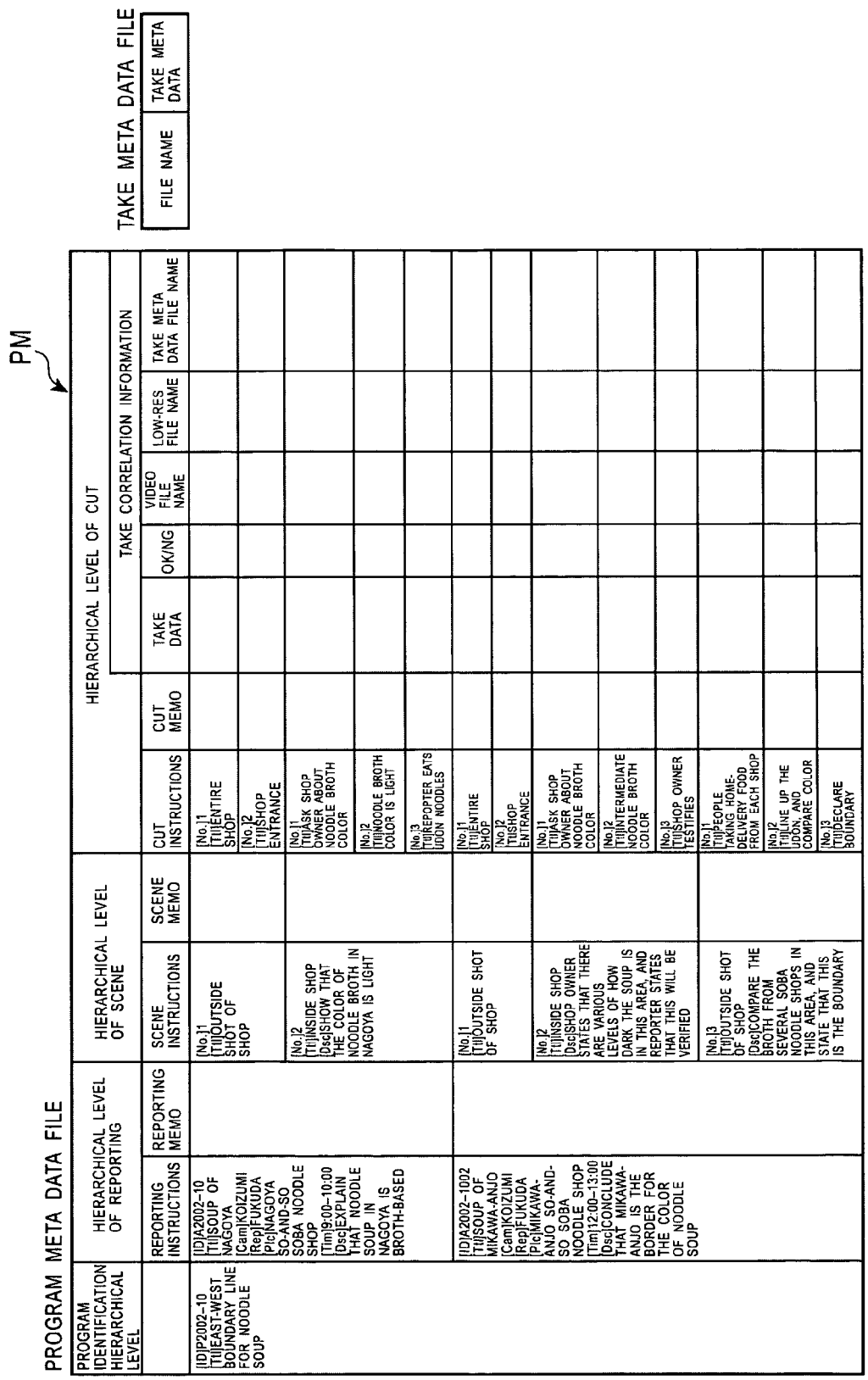
FIG. 15 is an explanatory diagram illustrating an example of a part of the configuration of the planning sheet meta data of the production flow with the picture program production assistance method according to the first embodiment, at the stage where production instruction information has been entered into the program meta data.

FIG. 15 illustrates an example of the planning sheet meta data at the stage where the production instruction information is thus input to the program meta data PM. As shown in FIG. 15, the production instruction information is input to the program meta data PM according to the items, in the spaces for the items of the program identification hierarchical level, and reporting instructions, scene instructions, and cut instructions, for example. The staff of each team can easily understand the overall makeup of the picture program by viewing this program meta data PM. Note that the take meta data TM is not yet created at this stage.

Further, in step S30, the project-making terminal 10 transmits the planning sheet meta data, for example (Step S30). In detail, the communication unit 112 of the project-making terminal 10 transmits the program meta data PM wherein the production instruction information has been input as described above, to the reporting terminal 20 or the like, via the network 5, for example. Thus, the project-making terminal 10 can provide the planning sheet meta data including at least the program met data PM, to the reporting terminal 20 and the like. Also, the project-making terminal 10 saves the transmitted program meta data PM in the recording device 116 or the like, for example. Note that providing of the planning sheet meta data as described above can be executed through recording media such as the optical disk 3 or a memory card or the like, for example.

The above steps S10 through S30 are equivalent to the project-making and planning stage, wherein the project-making and planning team uses the project-making terminal 10 to plan a picture program, and give production instructions.

Subsequently, in step S40, the reporting terminal 20 obtains the planning sheet meta data (step S40). Specifically, the picture-taking device 40 and the field PC 50 receive the program meta data PM transmitted in step S30 for example, using the communication units 427 and 512, and record the received planning sheet meta data in the memory unit 432 or recording device 516 or the like. In this way, the picture-taking device 40 and the field PC 50 obtain program meta data PM. As a result, production instructions regarding the picture program have been given from the project-making and planning team to the reporting team. Note that the picture-taking device 40 and the field PC 50 can obtain the planning sheet meta data through recording media such as the optical disk 3 or a memory card or the like, for example.

Next, in step S50, the reporting terminal 20 takes pictures based on the planning sheet meta data (step S50: shooting step). The following is a detailed description of the shooting step S50, with reference to FIG. 13. In the following description will be made following a flow wherein the pictures are shot in the order of cuts as given in the scenario, following the shooting instructions of the program meta data PM such as shown in FIG. 15 for example, but the order of the cuts to be shot is by no means restricted to that in this example.

As shown in FIG. 13, first, in step S502, the report to be shot is selected from the reporting on the program meta data PM (step S502). As shown in FIG. 9 for example, the picture-taking device 40 can narrow down the items of the program meta data PM obtained from the project-making terminal, and display these in the viewfinder 419. Accordingly, the cameraman can view the table format program meta data PM, and readily understand the report to be shot, the number and configuration of scenes and cuts, and so forth. Further, the cameraman operates the report selecting button 462 shown in FIG. 9 for example, and selects one report to be shot from the one or more reports (reporting instructions)in the displayed program meta data PM. For example in the example shown in FIG. 9, the report with the report ID "A20002-1001" is selected, as indicated by the heavy border.

Next, in step S504, the scene to be shot is selected from the scenes in the program meta data PM (step S504). The cameraman operates the scene selecting button 464 shown in FIG. 9 for example, and selects one scene to be shot from the one or more scenes (scene instructions) belonging to the report selected in the step S502. For example, in the example shown in FIG. 9, the scene with the scene No. "1" is selected, as indicated by the heavy border (hereafter referred to as "Scene 1", as with other Nos. as well).

Next, in step S506, the cut to be shot is selected from the cuts in the program meta data PM (step S506). The cameraman operates the cut selecting button 466 shown in FIG. 9 for example, and selects one cut to be shot from the one or more cuts (cut instructions) belonging to the scene selected in the step S504. For example, in the example shown in FIG. 9, the cut with the cut No. "1" is selected, as indicated by the heavy border (hereafter referred to as "Cut 1", as with other Nos. as well). In the following, the shooting processing regarding the cut "Inside Shop" is carried out first.

Note that the one take to be shot in the subsequent step S508 is assigned to the one cut selected in the steps S502 through 506.

Subsequently, in step S508, one take is shot (step S508). The picture-taking device 40 starts shooting the subject based on the operations of the cameraman to start taking pictures, and recording of the obtained content data in the optical disk 3 or the like is started. Next, the picture-taking device 40 continues the picture-taking and recording process until there is further instruction from the cameraman. Upon the cameraman performing operations to end the picture taking, the picture-taking device 40 ends shooting of the subject, and stops recording the content data. This series of picture-taking processing, from the beginning of picture-taking to the end thereof, makes up one take. The content data of the take is uninterrupted continuous picture and audio data. Note that both the original pictures and low-res pictures can be recorded at the same time in this picture-taking processing, for example.

Next, in step S510, the take meta data TM is created (step S510: take meta data creating step). The take meta data creating unit 42 of the picture-taking device 40 newly creates take meta data TM relating to the one take shot in step S508. Further, the take meta data creating unit 42 generates take shooting conditions information which is information such as the shooting conditions and the like relating to this take, for example as the content of the created take meta data TM, and inputs this to the various items in the take meta data TM.

Further, in step S512, take correlation information is generated (step S512: take correlation information generating step). The take correlation unit 44 of the picture-taking device 40 generates the take correlation information having contents correlating the one take shot in step S508 to the cut selected in step S506. Further, the take correlation unit 44 fills in the generated take correlation information to the corresponding space in the cut hierarchical level of the program meta data PM. Accordingly, the content data and the take meta data TN and the like of the take is assigned to this cut.

Now, the example of the planning sheet meta data, at the stage wherein the take correlation information has been input to the program meta data PM in step S512, will be described with reference to FIG. 16.

Figure 16:
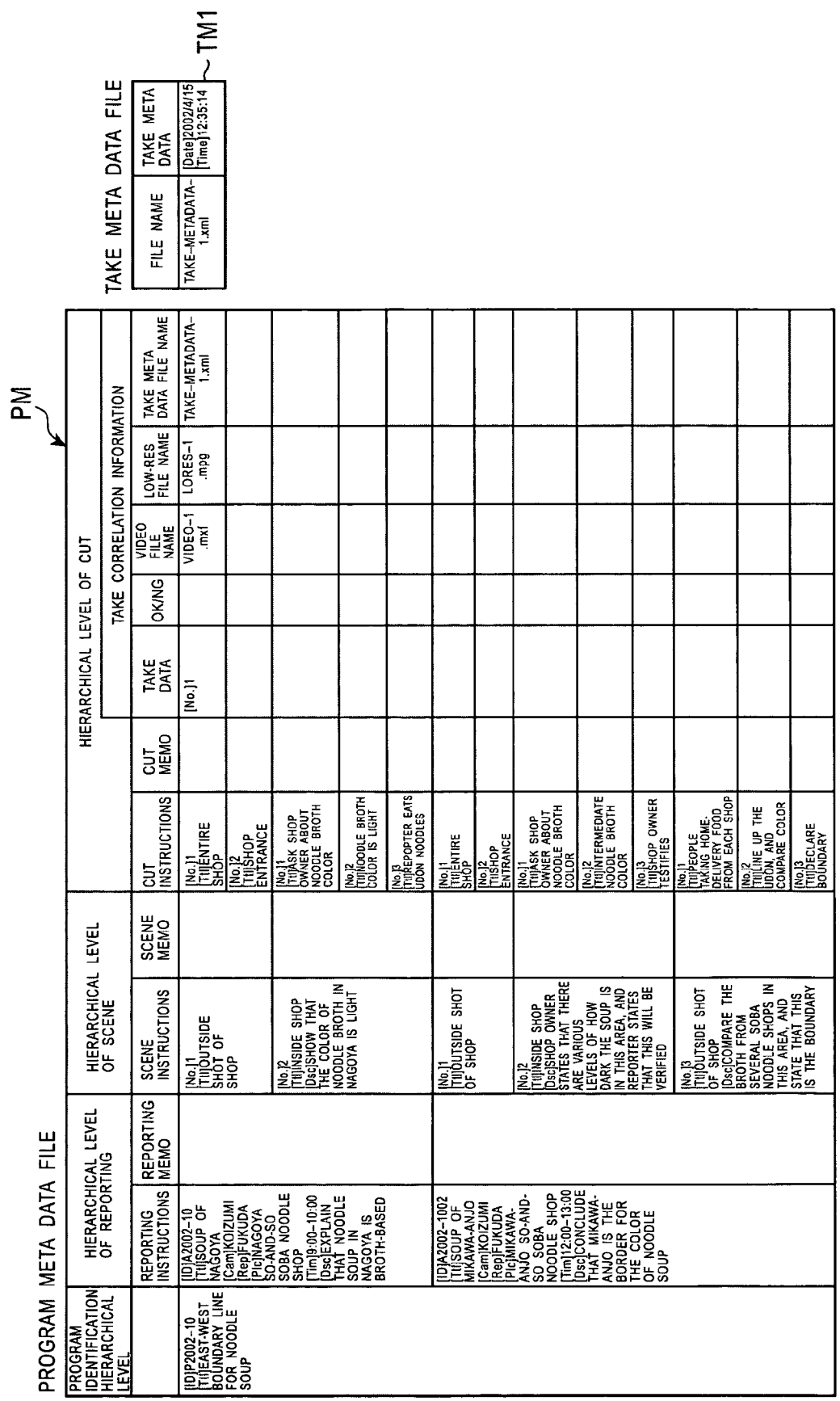
FIG. 16 is an explanatory diagram illustrating an example of a part of the configuration of the planning sheet meta data of the production flow with the picture program production assistance method according to the first embodiment, at the stage where take correlation information has been entered into the program meta data.

As shown in FIG. 16, take meta data TM1 corresponding to the above one take is created. Also, the take correlation information relating to the take is input to the space corresponding to the Cut 1 in the program meta data PM. Note that at this stage, only the OK/NG information of the take correlation information has not been input in the program meta data PM, and also, the program shooting state information such as cut memos and the like has not been filled in yet, either.

Subsequently, in step S514, the take memo is input to the take meta data TM (step S514). The shooting state information generating unit 522 of the field PC 50 generates the take shooting state information relating to the take shot in step S508, based on input by the reporting team staff. Further, the shooting state information generating unit 522 inputs the generated take shooting state information, for example, to the item "take memo contents" in the take meta data TM created in step S510. Thus, the content of the take meta data TM is not only the take shooting conditions information, but also the take shooting state information that has been thus input, as shown in FIG. 5, for example. Note that input of a take memo is not always necessary.

Next, in step S516, whether or not to end shooting of the selected cut is determined (step S516). There are cases in the picture-taking processing wherein a take regarding the same cut may be shot multiple times. Specific examples are cases wherein a second take is shot of the same situation since the first take did not go as desired, or a case wherein the same situation is shot multiple times just to make sure. In this step, the cameraman or the like judges whether or not to shoot further takes of the cut selected in step S506. In the event that judgment is made that further shooting of the take is unnecessary, and that shooting of this take is to be finished, the flow proceeds to step S518.

On the other hand, in the event that judgment is made that further shooting of the take is necessary, so shooting of the take is not to be ended yet, the flow returns to step S508, and the take regarding the same cut is shot again. This creates take meta data TM for this re-take as well, and also the take correlation information is generated for this take and input to the program meta data PM.

Further, in step S518, OK/NG information is set regarding the cut selected in the step S506 (step S518). In the event that only one take has been correlated to the cut selected in step S506, for example, the take correlation unit 44 automatically sets this take to OK, for example. That is to say, the take correlation unit 44 generates OK information, and the OK information is input to the space for this take in the cut hierarchical level in the program meta data PM.

On the other hand, in the event that multiple takes are correlated to the cut, the take correlation unit 44 sets one take as OK, for example, based on the OK/NG selecting operations of the cameraman, and sets the other takes to NG. More specifically, the cameraman can operate an OK/NG selecting button 48 such as shown in FIG. 9, for example, so as to select whether each take is OK or not. As a result, the take correlation unit 44 inputs OK information to the space for this take in the program meta data PM with regard to the one take which has been selected as being OK, for example, and on the other hand, inputs NG information to the space for this take in the program meta data PM with regard to at least one of the other takes which have been selected as being NG, for example.

Subsequently, in step S520, a cut memo is input to the program meta data PM (step S520: shooting state information generating step). The shooting state information generating unit 522 generates the program shooting state information relating to the cut regarding which shooting has been determined in step S516 to have been completed, based on the input of a reporting team staff member, for example. Further, the shooting state information generating unit 522 inputs the program shooting state information generated thus to the item of "cut memo contents" in the program meta data PM, for example. Note that input of this memo is not indispensable.

Now, an example of the planning sheet meta data at the stage that the cut memo has been input to the program meta data PM in step S520 will be described with reference to FIG. 17. Note that two takes have been shot for the first cut selected in step S506.

Figure 17:
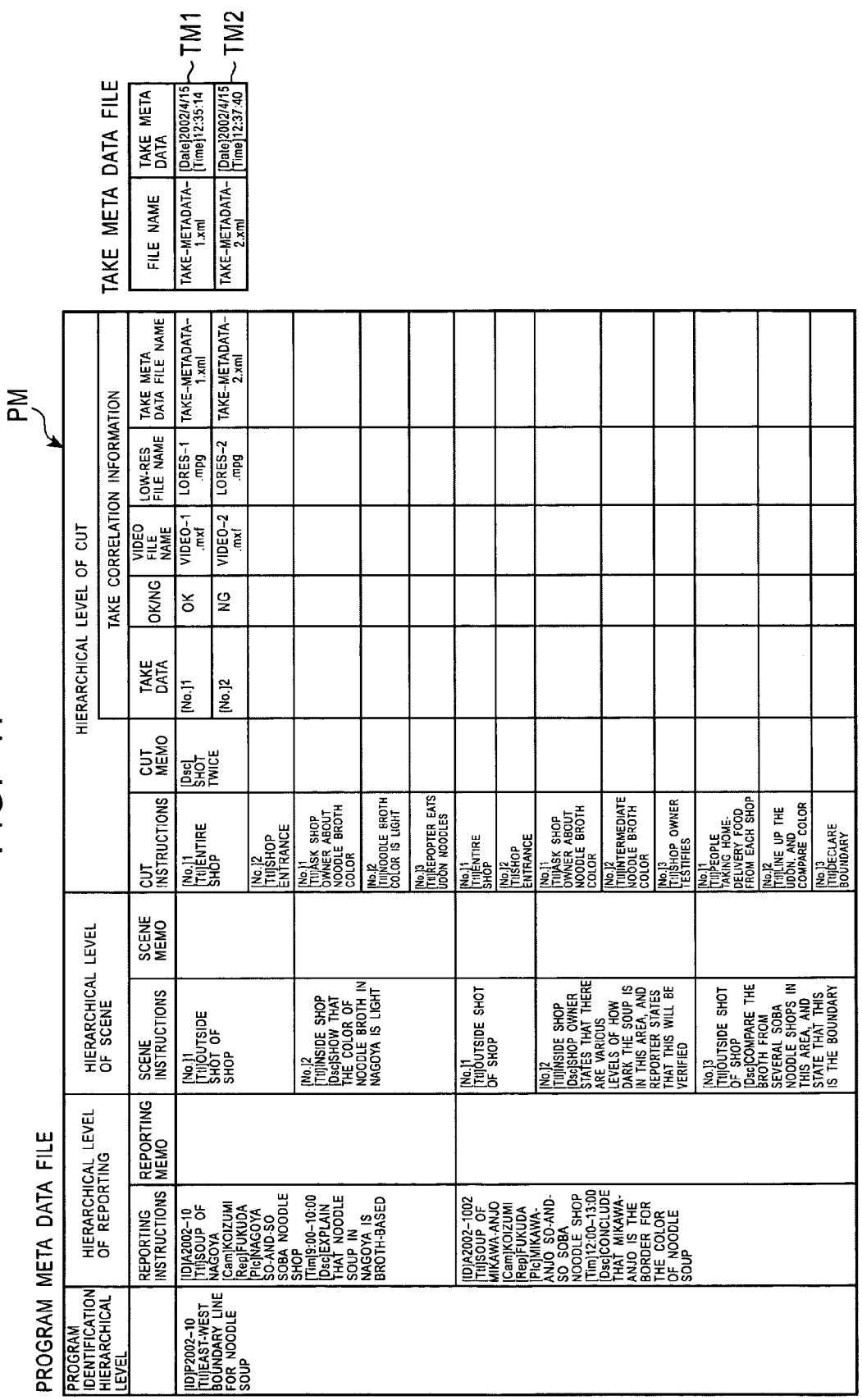
FIG. 17 is an explanatory diagram illustrating an example of a part of the configuration of the planning sheet meta data of the production flow with the picture program production assistance method according to the first embodiment, at the stage where cut memos have been entered into the program meta data.

As shown in FIG. 17, two takes have been shot, so two sets of take meta data, TM1 and TM 2, have been created. Also, in the program meta data PM, the take No. "1" is assigned to Cut 1, and the take No. "2" is assigned to Cut 1. Further, OK/NG information has been additionally input, whereby the take with the take No. "1" (hereafter referred to as "Take 1", as with the other Nos. as well) has been set to "OK", and on the other hand, the Take 2 has been set to "NG". Also, the cut-level memo of "shot twice" is input as the program shooting state information for this cut, for example, in the cut memo space for Cut 1.

Next, in step S522, determination is made regarding whether or not shooting of the selected scene is to be ended (step S522). With this step, judgement is made by the cameraman or the like regarding whether all cuts belonging to the scene selected in step S504 have been shot. As a result, in the event that judgement is made that all of the cuts belonging to this scene have been shot, the flow proceeds to step S524. On the other hand, in the event that judgement is made that not all of the cuts belonging to this scene have been shot (e.g., there are cuts remaining unshot), the flow returns to step S506. In the case of the latter, a separate cut is newly selected, and the shooting of the new cut is carried out as described above.

For example, in the stage shown in FIG. 17, while shooting of Cut 1 has been completed, of the cuts belonging to Scene 1, the shooting of Cut 2 has not been completed. Accordingly, the flow returns to step S506, where Cut 2 is selected, and the cut "Shop Entrance" is shot.

Further, in step S524, a scene memo is input to the program meta data PM (step S524: shooting state information generating step). In the event that shooting of all cuts is completed for a certain scene, a reporting team staff member enters a scene memo regarding the scene to the field PC 50, for example, whereby the shooting state information generating unit 522 of the field PC 50 generates program shooting state information regarding the scene, based on the input of the reporting team staff member. Further, the shooting state information generating unit 522 inputs the generated scene-level program shooting state information to the "scene memo contents" of the program meta data PM. Note that input of the scene memo is not indispensable.

Now, an example of the planning sheet meta data at the stage wherein the scene memo has been input to the program meta data PM in step S524 will be described, with reference to FIG. 18.

Figure 18:
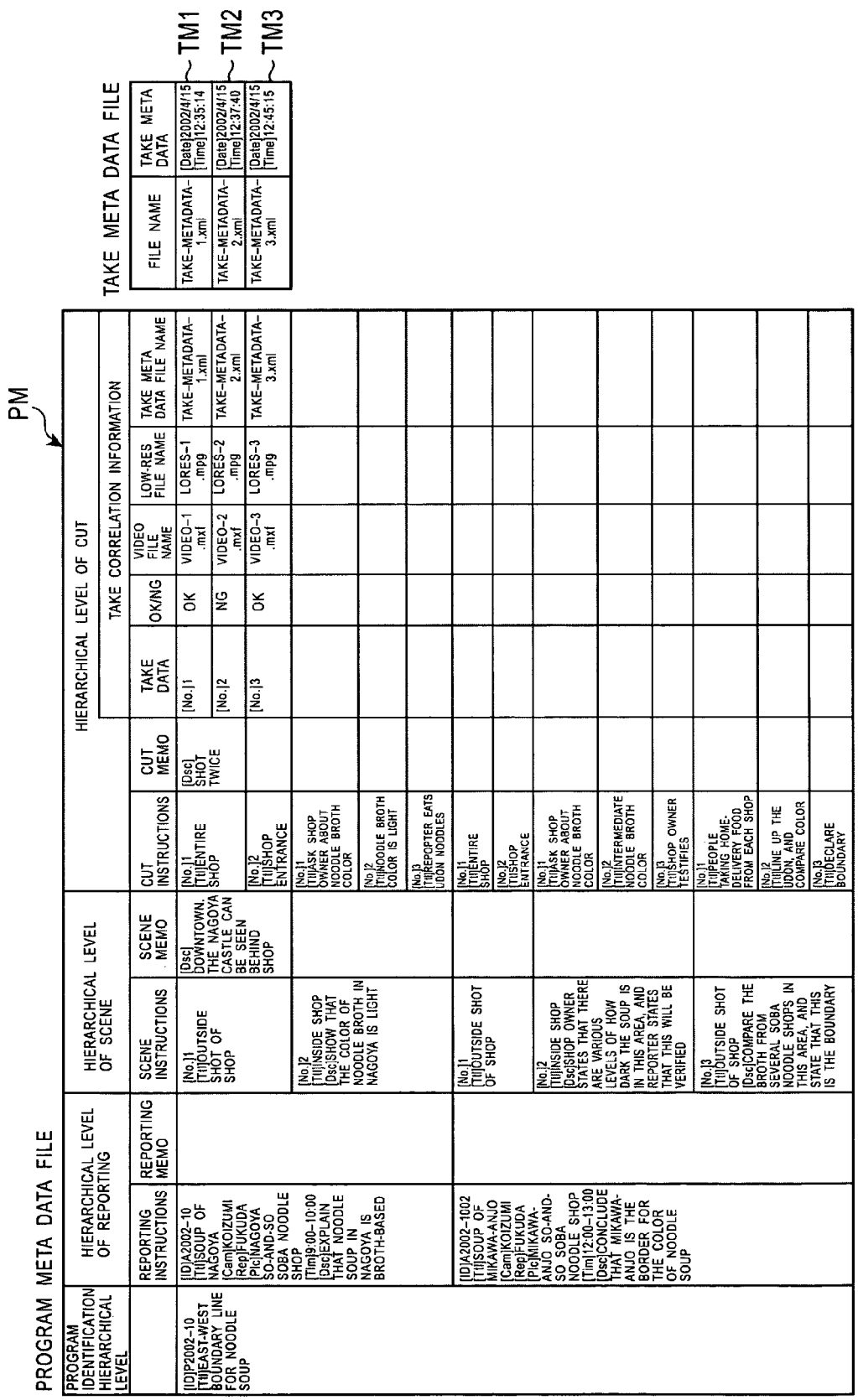
FIG. 18 is an explanatory diagram illustrating an example of a part of the configuration of the planning sheet meta data of the production flow with the picture program production assistance method according to the first embodiment, at the stage where scene memos have been entered into the program meta data.

As shown in FIG. 18, shooting has been completed for all of the cuts belonging to Scene 1 (i.e., Cut 1 and Cut 2), so three takes in all have been shot. Accordingly, the three sets of take meta data TM1 through TM3 have been created. Also, with regard to Cut 2, only, the first take (i.e., Take 3) has been shot, so this take has been automatically set to OK. Also, a memo regarding the scene-level scenery has been input in the scene memo space of Scene 1 as the program shooting state information for this scene, noting "Downtown. The Nagoya Castle can be seen behind shop".

Subsequently, in step S526, whether or not shooting of the report that has been selected has been completed, is determined (step S526). In this step, judgement is made by the cameraman or the like regarding whether all scenes belonging to the report selected in step S502 have been shot. As a result, in the event that judgement is made that all of the scenes belonging to this report have been shot, the flow proceeds to step S528. On the other hand, in the event that judgement is made that not all of the scenes belonging to this report have been shot, the flow returns to step S504. In the case of the latter, a separate scene is newly selected, and the shooting of the new scene is carried out as described above.

For example, in the stage shown in FIG. 18, while shooting of Scene 1 has been completed, of the scenes belonging to report ID "A20002-1001", the shooting of Scene 2 has not been completed. Accordingly, the flow returns to step S504, where Scene 2 is selected, and the Cut 1, "Ask shop owner about noodle broth color", belonging to Scene 2, "Inside Shop", is shot.

Further, in step S528, a report memo is input to the program meta data PM (step S528: shooting state information generating step). In the event that shooting of all cuts is completed for a certain report, a reporting team staff member enters a report memo regarding the report to the field PC 50, whereby the shooting state information generating unit 522 of the field PC 50 generates program shooting state information regarding the report, based on the input of the reporting team staff member. Further, the shooting state information generating unit 522 inputs the generated report-level program shooting state information to the "report memo contents" of the program meta data PM. Note that input of the report memo is not indispensable.

Now, an example of the planning sheet meta data at the stage wherein the report memo has been input to the program meta data PM in step S528 will be described, with reference to FIG. 19.

Figure 19:
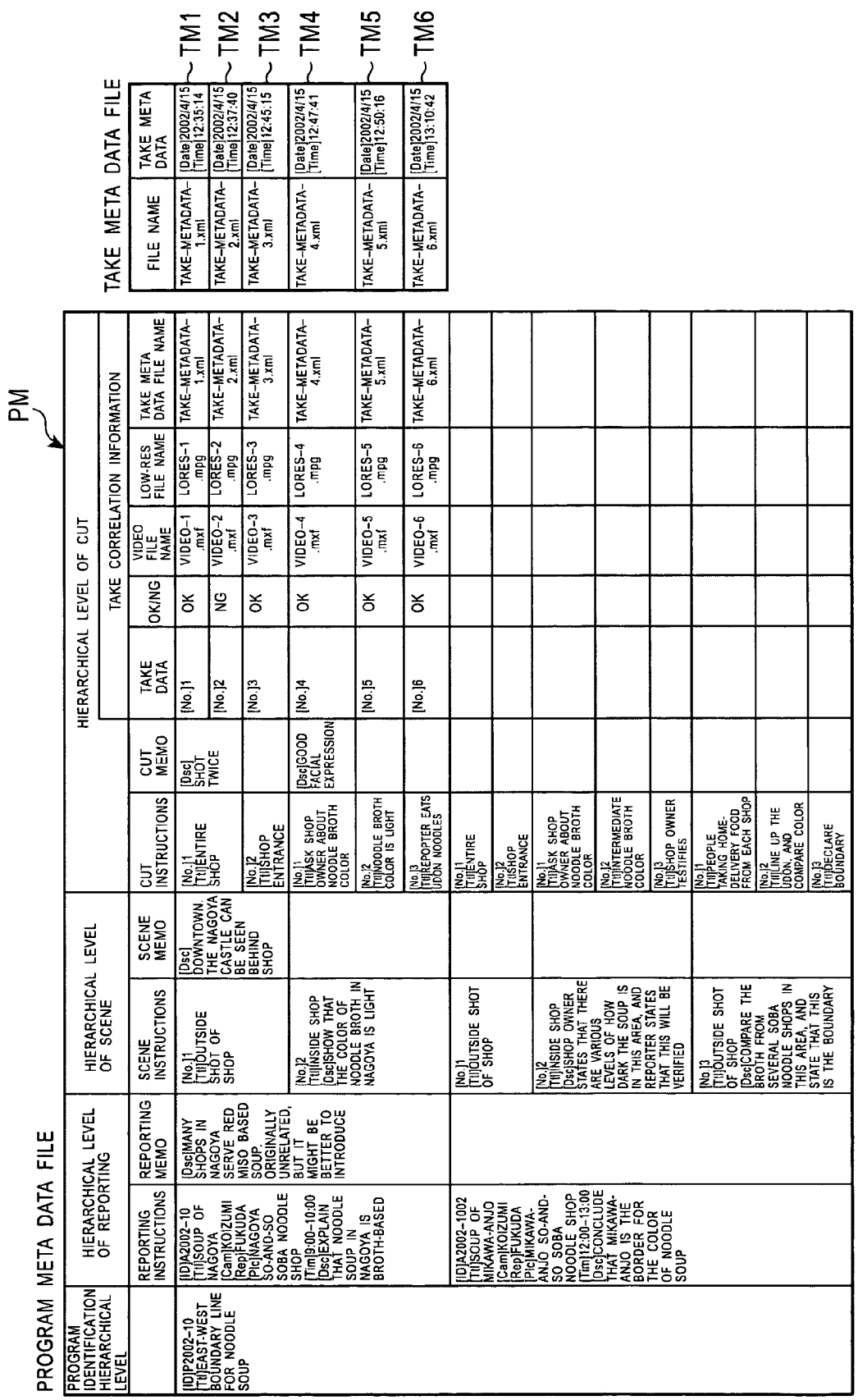
FIG. 19 is an explanatory diagram illustrating an example of a part of the configuration of the planning sheet meta data of the production flow with the picture program production assistance method according to the first embodiment, at the stage where reporting memos have been entered into the program meta data.

As shown in FIG. 19, shooting has been completed for all of the scenes belonging to the report ID "A20002-1001" (i.e., Scene 1 and Scene 2), with six takes in all having been shot. Accordingly, the six sets of take meta data TM1 through TM6 have been created. Also, a report-level proposal has been input in the report memo space of the report with the report ID "A20002-1001" as program shooting state information for this scene, noting "Many shops in Nagoya serve red miso based soup originally unrelated, but it might be better to introduce.".

Further, in step S530, whether or not to end shooting and reporting is determined (step S530). In this step, judgement is made by the cameraman or the like regarding whether all reporting belonging to the picture program has finished. As a result, in the event that judgement is made that all reporting relating to this picture program has not finished, the flow proceeds to step S540, and the location is changed. Next, the flow returns to step S502, where a new report is selected, and the shooting of all cuts of the new report is carried out as described above. On the other hand, in the event that judgment is made that all reporting relating to this picture program has ended, this means that all shooting has ended, so the flow proceeds to step S60 in FIG. 12.

Now, description will be made with regard to an example of the planning sheet meta data in the stage wherein all shooting has finished in step S530, with reference to FIG. 20.

Figure 20:
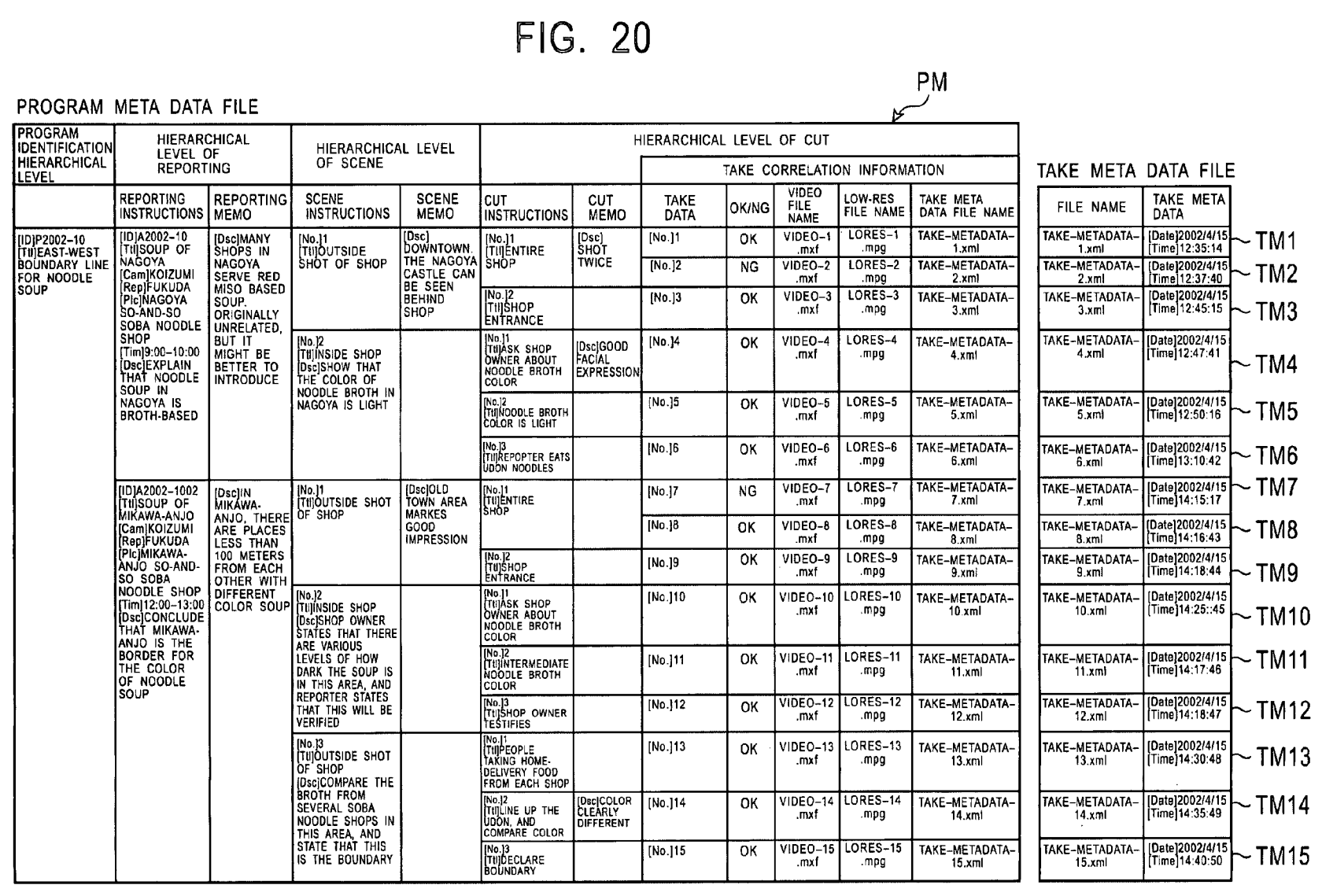

As shown in FIG. 20, the shooting processing of all cuts belonging to the picture program with the program ID "A20002-10" has finished, with a total of fifteen takes having been shot. Accordingly, with the shooting of the picture program, content data for the fifteen takes are recorded (with file names VIDEO-1 through VIDEO-15) as picture material for each take, and created. The content data of the take and the fifteen sets of take meta data TM1 through TM 15 are correlated to the thirteen cuts. Of these, Take 2 and Take 8 have NG information attached thereto, and are not used. Also, various types of shooting state information in the picture program is input to the reporting, scene, and cut memo spaces of the program meta data PM according to the hierarchical levels thereof, so the viewer can understand the shooting state of the picture program both in general and on the local level. Note that with the program meta data PM, only the take No. is input to the "take data" space in the take correlation information, and the in-point information and out-point information has not been input yet.

Following such picture-taking processes, the reporting terminal 20 transmits the low-res pictures and planning sheet meta data in step S60, as can be seen by making reference to FIG. 12 again (step S60). Specifically, the communication unit 427 of the picture-taking device 40 or the communication unit 512 of the field PC 50 transmits the low-res pictures of the content data recorded in the shooting step, to the editing terminal 30 or the like, via the network 5. Transmission of the low-res pictures may be performed simultaneously and in parallel with the shooting, or may be performed following, for example, each cut, scene, reporting, or the entire picture program, in which case multiple takes are transmitted at once. Also, the original pictures may be transmitted with the communication units 427 or 512 instead of the low-res pictures, in the event that this is feasible.

Further, the communication units 427 or 512 perform synchronization processing of the planning sheet meta data for example, and transmit the planning sheet meta data to the editing terminal 30 and the like via the network 5.

Also, the optical disk 3 storing the original pictures and the like, is transported from the reporting terminal 20 to the editing terminal 30.

The steps S40 through S60 described so far are equivalent to the reporting stage for the reporting team performing shooting and reporting of the content of the picture program using the reporting terminal 20.

Subsequently, in step S70, the editing terminal 30 obtains the low-res pictures and the planning sheet meta data (step S70). In detail, the editing terminal 30 receives the low-res pictures and the planning sheet meta data transmitted in step S60, using the communication unit 312, and records this in the recording device 316 or the like. In this way, the editing terminal 30 obtains the low-res pictures recorded by the reporting terminal 20 and the edited planning sheet meta data. Also, the editing terminal 30 obtains the original pictures recorded by the reporting terminal 20 through the optical disk 3. Note that the editing terminal 30 can obtain the edited planning sheet meta data by recording media such as the optical disk 3 or a memory card or the like.

Next, in step S80, the editing terminal 30 performs editing of the content data, based on the planning sheet meta data (step S80: content data editing step). The following is a description of the details of the content data editing step, with reference to FIG. 14.

As shown in FIG. 14, first, in step S802, the planning sheet meta data or the content data is displayed (step S802: content data display step). The meta data display control unit 322 of the editing terminal 30 effects control to first convert the program meta data PM or the take meta data TM obtained from the reporting terminal 20 into an easily-understood format, for example, and then display this on the display unit 308.

Accordingly, the editing team staff can glance over the entire picture program by viewing this program meta data PM. Thus, the editing team staff can properly understand the overview and the instructions regarding the editing work. Also, the editing team staff can understand information relating to each set of picture material independently from the scenario by viewing the take meta data TM. Accordingly, the editing team staff can speedily obtain detailed picture material information as necessary. Accordingly, the editing task of the content data performed in a later step can be carried out more efficiently.

Also, the picture display control unit 324 reproduces and displays the low-res pictures, for example, in a wide range of formats, based on the planning sheet meta data. For example, low-res pictures of multiple takes may be displayed in consecutive order of cuts following the order of the scenario for the picture program, as described above, or low-res pictures of a single take selected by the editing team staff may be displayed alone. Also, the planning sheet meta data may be superimposed on the content data, for example.

Accordingly, the editing team staff can efficiently understand the overall image of the picture program to be edited, by viewing the continuously-displayed content data. Also, the editing team staff can also speedily view the content data relating to a desired one take, for example, and also sufficiently understand the details of that one portion. Accordingly, the editing task of the content data performed in a later step can be carried out more efficiently. Note that step S802 may be omitted.

Next, in step S804, one cut to be subjected to rough editing is selected (Step S804). The editing team staff views the program meta data PM for example, and selects one cut to be subjected to the rough editing processing (which is specifying of the in point and out point, and so forth).

Further, in step S806, the content data corresponding to the cut selected in step S804 is played (step S806: content data display step). The picture display control unit 324 determines the take corresponding to the cut selected in step S804, based on the take correlation information in the program meta data PM (OK/NG information or the like), for example. Next, the picture display control unit 324 plays and displays the low-res pictures or the like of the specified take, using the disk device 318. Also, at this time, the time code, program meta data PM, take meta data TM, or the like, may be superimposed and displayed along with the content data.

Subsequently, in step S808, the in point and out point of the take are determined (step S808). The editing team staff presses the in point deciding button and the out point deciding button at a desired point in time, while viewing the pictures being played in step S806, thereby deciding the in point and out point of this take. This extracts the valid range of the content data of the take.

Next, in step S810, in point information and out point information is generated (step S810: take correlation information editing step). The take correlation information editing unit 334 extracts the time code at the timing when the in point deciding button and the out point deciding button were pressed in step S808. Thus, the take correlation information editing unit 334 generates this time code as the in point information and out point information. Further, the take correlation information editing unit 334 inputs the in point information and out point information into the items of "in point" and "out point" of the program meta data PM.

Further, in step S812, whether or not rough editing has been completed for the content data corresponding to all cuts in the program meta data PM is determined (step S812). This determination can be carried out by, for example, checking whether or not the in point information and out point information has been input for all take correlation information for all takes in the program meta data PM that have been set to OK with regard to a cut, i.e., so all cuts have been covered. Note that the processing for configuring whether or not there is in point information and out point information may be visually inspected by the editing staff, or the take correlation information editing unit 334 may perform this automatically.

In the event that rough editing of all cuts is determined to have been completed, the flow proceeds to step S814. On the other hand, in the event that rough editing of all cuts is determined to have not been completed, the flow returns to step S804, an unedited cut is selected, and the rough editing processing described above is carried out.

Subsequently, in step S814, the necessary portions of the content data corresponding to all cuts are extracted (step S814). First, the content data editing unit 340 selects the first cut within the picture program based on the program meta data PM. Next, the content data editing unit 340 determines takes corresponding to the selected cuts, based on the take correlation information. Further, the content data editing unit 340 extracts the content data determined thus, based on the in point information and the out point information. Repeating this processing for multiple cuts in the order of the scenario enables the content data making up the picture program to be completed. Thus, the editing team staff can confirm the contents of the picture program. Note that an arrangement may be wherein in this step, the content data editing unit 340 only creates an EDL.

Next, in step S816, image quality adjustment of the content data of the picture program is performed (step S816). The content data of the picture program completed in step S816 is subjected to various types of image quality adjustment, such as, for example, adjustment of brightness or tone, correction of sharpness/unsharpness, reduction or removal of picture or audio noise, correction of picture shaking, etc. Also, various types of data may be superimposed on the content data of the picture program, or sets of content data my be synthesized one with another. Also, it should be noted that the step S814 and 816 and the like are equivalent to the main editing processing of the picture program.

Now, the content data editing processing has been described with reference to FIG. 14. Note that the step S70 through S80 are equivalent to the editing stage which is the process of the editing team editing the picture program with the editing terminal 30.

Also, at the point that step S80 ends, the production flow of the picture program production assistance method shown in FIG. 12 also ends.

Now, while the shooting step S50 of the production flow of the production flow of the picture program production assistance method has been described as being carried out by sequentially shooting takes corresponding to cuts in the order of cuts in the scenario, the order of shooting cuts in the shooting step S50 is not restricted to this example, and may be shot in an arbitrary order, for example.

Figure 21:
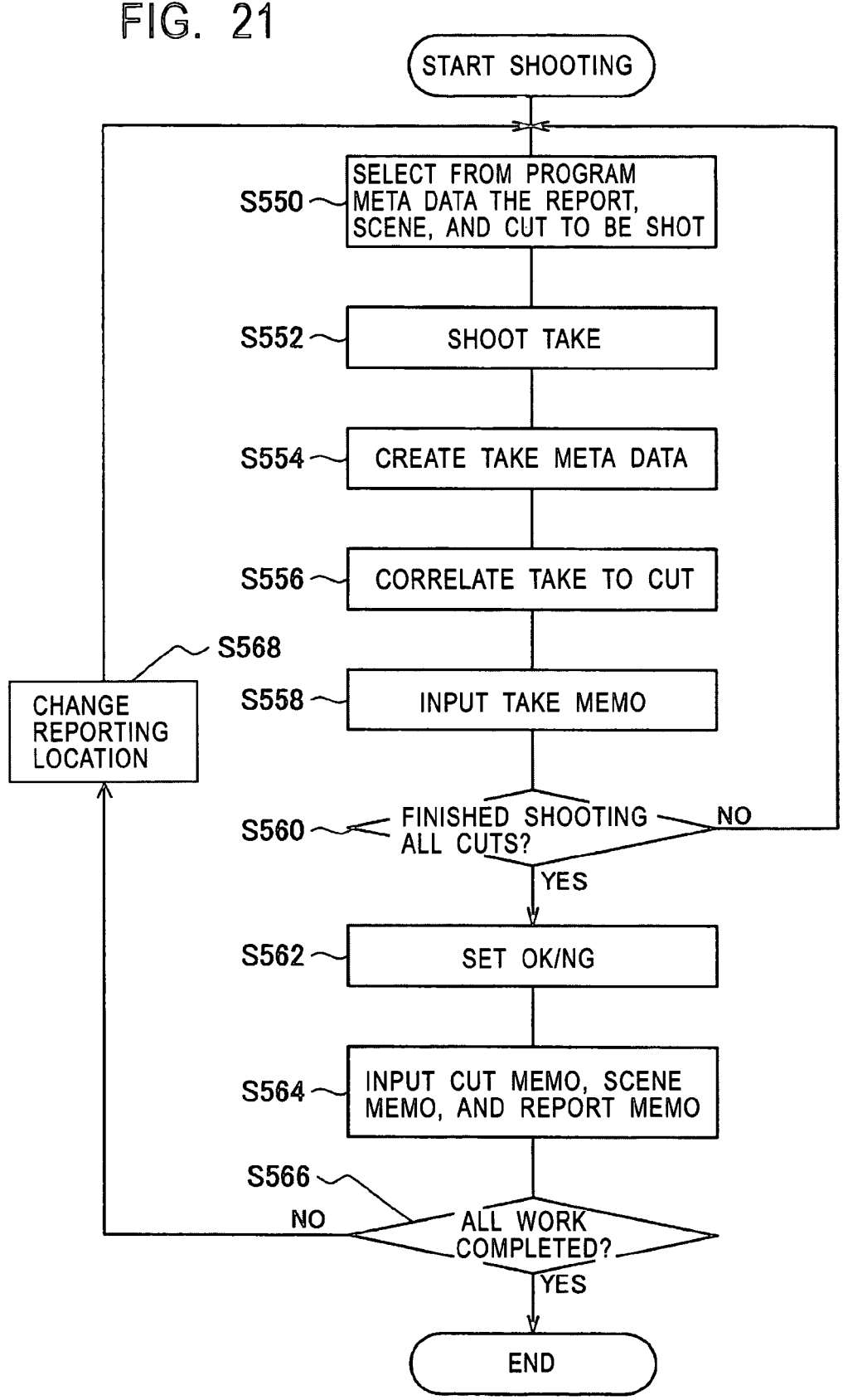
FIG. 21 is a flowchart illustrating an picture-taking flow for shooting in an arbitrary order of cuts in the picture-taking stage with the picture program production assistance method according to the first embodiment.

Accordingly, the shooting flow for shooting cuts in an arbitrary order in the shooting step S50 will be described with reference to FIG. 21. FIG. 21 is a flowchart illustrating the shooting flow for shooting cuts in an arbitrary order in the shooting step S50 according to the present embodiment.

As shown in FIG. 21, first, in step S550, the report, scene, and cut to be shot are selected from the reports in the program meta data PM (Step S550). The cameraman views the table-format program meta data PM displayed on the viewfinder 419, for example. Next, as described above, the cameraman operates the report selecting button 462, scene selecting button 464, cut selecting button 466, so as to select the report, scene, and cut to be shot.

At this time, the cameraman can select the one desired cut, unrelated to the order of cuts in the scenario, for example. For example, in the example shown in FIG. 15, even in the event that shooting of Cut 1 in Scene 1 of the report of the report ID is "A20002-1001" has not been completed yet, or not even shot at all, a cut belonging to Scene 2, for example, can be selected.

Next, the shooting of the one take assigned to the selected cut is performed (step S522), the take met data TM of this take is created (step S554), take correlation information relating to the take is generated (step S556), and a take memo is input relating to the take (step S558). The steps S552 through S558 are generally the same as the step S508 through S514 described above with reference to FIG. 13, and accordingly, detailed description thereof will be omitted.

Further, in step S560, whether or not shooting has been completed for all cuts is determined (Step S560). In this step, whether or not shooting for all cuts belonging to a certain report location has been completed is determined. That is, whether or not shooting of takes assigned to all cuts belonging to all scenes in the report has been completed is determined. Of course, in the event that multiple takes are to be shot for one cut as described above, whether or not the shooting of these multiple takes has been completed is also determined.

This judgement regarding whether or not shooting of all cuts has been completed can be easily made by the cameraman or the like viewing the program meta data PM. That is to say, all that is necessary for the cameraman or the like is to visually confirm whether or not at least one take has been correlated to each of the cuts belonging to the report in this program meta data PM (i.e., whether or not take correlation information exists for all of the cuts). Accordingly, the cameraman can easily and quickly tell whether there are any cuts or takes left to be shot.

In the event that judgment is made that shooting has been completed for all cuts belonging to this report, the flow proceeds to step S562. On the other hand, in the event that judgment is made that not all shooting has been completed, the flow returns to step S550, an arbitrary cut belonging to the report is selected again, and the same processing as above is repeated.

While an example has been described wherein whether or not shooting of all cuts belonging to a certain report is made in the determining processing of this step as described above, the present invention is by no means restricted to this example, and an arrangement may be made whether or not shooting has been completed for all cuts is determined for each scene. Further, an arrangement may be made whether or not shooting has been completed for all cuts in the picture program is determined. Such determination based on the picture program is useful in the event of, for example, shooting cuts belonging to a certain report, then shooting cuts belonging to a separate report, and further returning to the first report to shoot more cuts. Such cases conceivable are incidents wherein re-takes of the report are instructed following completing a report, or wherein there has been some sort of trouble.

Subsequently, in step S562, OK/NG information is set for all cuts regarding which shooting has been completed (step S562). This step is generally the same as step S518 described with reference to FIG. 13, so detailed description thereof will be omitted.

However, the present step is unlike the step S518 in that OK/NG information is set regarding multiple cuts of a certain report all at once. This is because setting of OK/NG information for each cut is preferably performed following shooting of all takes of that cut. That is to say, with this shooting flow, the order of shooting cuts is arbitrary, as mentioned above, and also, the same cut can be shot again afterwards. Accordingly, OK/NG information is set for all of the cuts following determining that all of the cuts belonging to the report, for example, are shot. However, the setting of the OK/NG information in this shooting flow is not restricted to that in this example, and an arrangement may be made wherein the OK/NG information is set for each individual cut upon completion of shooting thereof, for example, or at the point that shooting of all cuts making up a scene is completed, or the like. Also, setting of the OK/NG information may be performed while viewing the content data being played at the time of editing, or the like, for example.

Next, in step S564, the cut memos, scene memos, report memos, etc., are input to the program meta data PM (step S564). In this step, the cut memos, scene memos, report memos, etc., are input to the program meta data PM with similar means as with step S520, S524, and S528 described in FIG. 13, all together at the point that the reporting has ended, for example. Note that these memos do net necessarily have to be input all at once, and may be input at suitable points during the shooting flow.

Further, in step S566, whether or not to end the shooting and reporting is determined (step S566). In this step, the cameraman or the like judges whether or not all reporting relating to the picture program has been completed. In the event that judgment is made that all reporting relating to the picture program has not been completed, the flow proceeds to step S568, and the reporting location is changed. Next, the flow returns to step S550, a different report is selected anew, and shooting is performed of all cuts belonging to the newly-selected report in an arbitrary order in the same way as described above. On the other hand, in the event judgment is made that all reporting relating to the picture program has been completed, the entire shooting step S50 ends.

As described above, with the processing flow of the shooting step S50 shown in FIG. 21, multiple cuts making up a picture program can be shot in an arbitrary order unrelated to the order in the scenario, for example. Accordingly, shooting can proceed in order of cuts which can be shot or according to the most effective order of shooting, according to the environment at the shooting site, the schedule of performers, preparation of equipment, and other states and demands. For example, Cut 2 may be shot before Cut 1 in Scene 1, the order of shooting Scene 1 and Scene 2 may be reversed, or another take of a certain cut may be shot again following shooting a separate cut. Even in the event of shooting the cuts is such an arbitrary order, the cuts and takes are correlated in a sure manner by the take correlation information of the program meta data PM, so the content data of the takes can be consecutively played in the correct order following the scenario of the program meta data PM, at the time of playing the content data of the takes.

With the processing flow of the shooting step described with reference to FIGS. 13 and 21, first, a cut to be shot is selected by the cameraman, and then a take of the cut is shot, but the present invention is by no means restricted to this example. For example, a take may be shot, following which a cut to which this take should be assigned may be selected by operating the shooting cut selecting portion 46. In this case, the take correlation information is generated at the point of the cut selecting operations, and input to the selected cut in the program meta data PM, for example. In this way, the timing at which the cameraman or the like performs the operations to connect the cuts and takes may be either before or after shooting the take.

Next, a separate arrangement wherein the content data of a take and the take meta data are correlated to a cut in the program meta data PM, will be described.

With the shooting step S50 in the picture program producing flow such as described above, the cameraman performs operations for correlating cuts and takes before shooting. However, the present invention is not restricted to this example, and the operations for correlating cuts and takes can be performed all at once following shooting multiple takes, as described below.

Also, in the above-described arrangement, the take correlation unit 44 correlates the cuts and takes by inputting the video file name, low-res file name and take meta data file name, in the corresponding spaces in the cut hierarchical level of the program meta data PM as take correlation information. However, the present invention is not restricted to this example, and an arrangement may be made wherein the take correlation unit 44 inputs UMIDs to the corresponding spaces in the program meta data PM as take correlation information, thereby correlating the cuts and takes.

Figure 22:
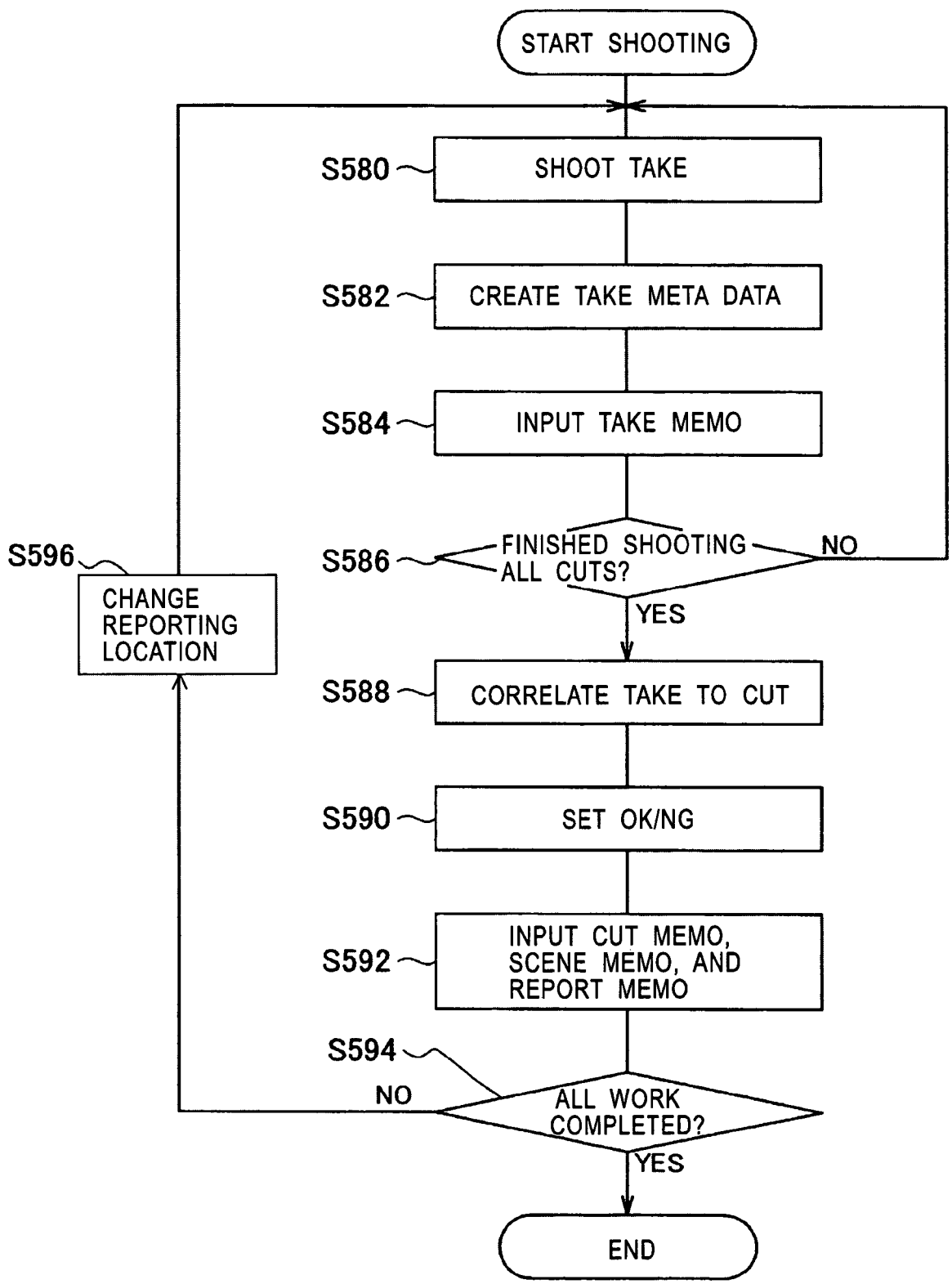
FIG. 22 is a flowchart illustrating an picture-taking flow wherein cuts and takes are correlated following shooting using UMIDs, in a picture-taking stage according to a modification of the first embodiment.

The following is a description of a shooting flow which performs processing of correlating the cuts and takes following shooting, using UMIDs, with reference to FIGS. 22 through 28. FIG. 22 is a flowchart illustrating the shooting flow for performing processing of correlating the cuts and takes following shooting, using UMIDs in the shooting step S50 according to a modification of the present embodiment. Also, FIGS. 23 through 27 are explanatory diagrams illustrating an example of the configuration of the planning sheet meta data at each stage in the shooting step S50 according to a modification of the present embodiment, and FIG. 28 is an explanatory diagram illustrating an example of program meta data PM' and the like displayed on an LCD display unit 429 of an picture-taking device 40 according to the present embodiment.

As shown in FIG. 22, first, in steps S580 to S584, one take (shooting processing) is shot for a cut arbitrarily selected by the cameraman (step S580), take meta data TM relating to this take is created (step S582), and a take memo relating to this take is input (Step S584). The steps S580, S582, and S584 are generally the same as the steps S508, S510, and S514 described with reference to FIG. 13, and accordingly, detailed description thereof will be omitted.

Consequently, as shown in FIG. 23, take meta data TM1 and a video file V1 are each created with regard to the one take. The take meta data TM1 and video file V1 thus created each contain a common UMID "AAAAAAAA". The take meta data TM1 and the video file V1 can be correlated as data relating to the same take, using this UMID. Also, the take meta data TM1 also stores the low-res file name of the content data of the corresponding take. Accordingly, the picture-taking device 40 can extract and display a representative image (thumbnail) of the content data of the take corresponding to the take meta data TM1. Accordingly, the cameraman can readily tell the contents of the take by viewing the thumbnail.

Next, in step S586, whether or not shooting of all of the cuts belonging to the same report has been completed, is determined (step S586). This step S586 is generally the same as step S560 described in FIG. 21, and accordingly, detailed description thereof will be omitted. In the event that shooting has been determined to have finished for all cuts belonging to the report, the flow proceeds to step S588. On the other hand, in the event that judgment is made that shooting for all of the cuts has not ended yet, the flow returns to step S580, and the same processing as that in steps S580 through S584 is repeated for the same cut or a different cut in this report.

Figure 24:
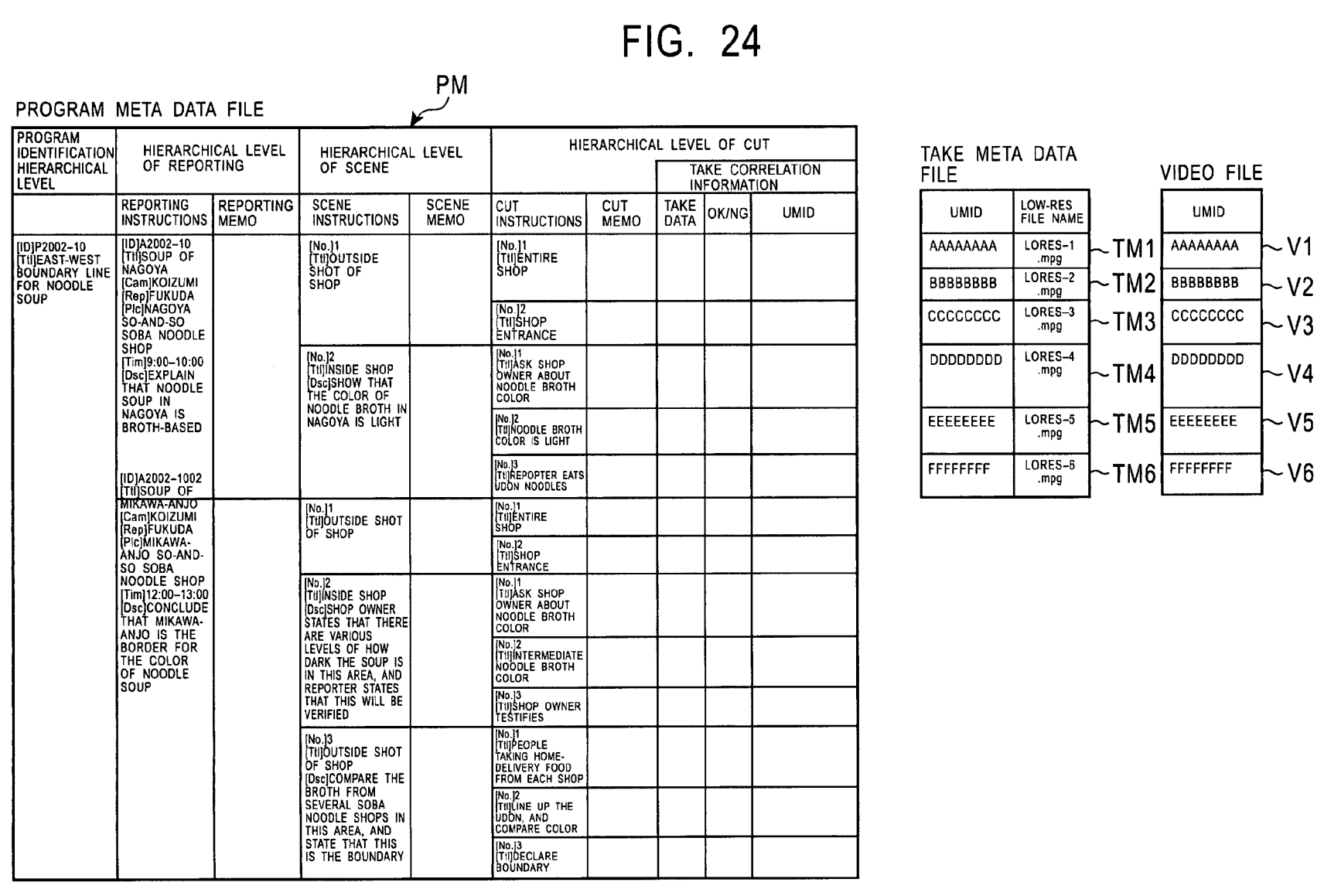

The configuration of the planning sheet meta data at the point that shooting has ended for all cuts belonging to a certain report, as described above, will be described with reference to FIG. 24. As shown in FIG. 24, six takes in all have been taken regarding the five cuts belonging to the report with the report ID "A20002-1101", and take meta data TM1 through TM6 and video files V1 through V6 are each created with regard to the six takes. The take meta data TM1 through TM6 and video files V1 through V6 each contain UMIDs unique to each take, and are mutually correlated by the UMIDs. However, at this point, the cuts and takes have not yet been correlated one with another, so the take correlation information relating the take that has been shot is not yet filled in the space for the take correlation information in the program met data PM. Also, the spaces for the report memos, scene memos, and cut memos in the program meta data PM, are also not filled in yet.

Now, an example of judging whether or not shooting of all cuts belonging to a certain report has been described with the judging processing in step S586. However, the present invention is by no means restricted to this example, and whether or not shooting of all cuts has been completed may be determined in increments of scenes or programs, for example.

Next, in step S588, multiple takes are correlated together with regard to cuts in the program meta data PM (Step S588). Specifically, first, upon the cameraman or the like instructing the picture-taking device 40 to start correlation processing, the LCD display unit 429 of the picture-taking device 40 displays the program meta data PM' wherein the items have been narrowed down, as shown in FIG. 28. The narrowed-down items are, for example, the program identification hierarchical level, reporting hierarchical level reporting instructions, scene hierarchical level scene instructions, cut hierarchical level cut instructions, and so forth. Further, a thumbnail space for the take hierarchical level is added to the program meta data PM'. This thumbnail space is a blank space provided corresponding to each cut, where a thumbnail is dropped at the time of correlation (details will be described later). Also, the thumbnails T1 through T6 of the takes which have been shot are displayed on the LCD display unit 429 as shown in FIG. 28 in order of shooting, along with the program meta data PM'. Accordingly, the cameraman or the like can easily understand the contents of the content data for each take, by viewing these thumbnails.

Next, the cameraman compares the production instruction information of the program meta data PM' displayed as shown in FIG. 28 for example, with the thumbnails of the takes, and performs the task of correlating the cuts with the takes. This correlating work is carried out by, example, the cameraman operating the operating unit 416 of the picture-taking device 40, to drag-and-drop the thumbnail of a take to a thumbnail space in the take hierarchical level of the program meta data PM'. Specifically, the cameraman drags the thumbnail T1 of the take shot first and drops it at a desired space in the thumbnail space in the take hierarchical level of the program meta data PM' (the space corresponding to Cut 2 in Scene 1 in FIG. 28). Accordingly, the take of the thumbnail T1 can be correlated to the Cut 2 in Scene 1. Further in the same way, the thumbnails T2 through T6 of other takes can be correlated to a desired cut by dragging and dropping the thumbnails. At this time, not all takes need to be correlated to cuts. Also, the same take may be correlated to multiple cuts.

In this way, upon a take being manually correlated with a cut by the cameraman or the like, the take correlation unit 44 automatically generates take correlation information made up of a UMID, and inputs this to the corresponding space in the program meta data PM. Accordingly, the take correlation unit 44 can correlate the take meta data TM and the vide file V (i.e., the content data) with the cut specified by the cameraman.

Figure 25:
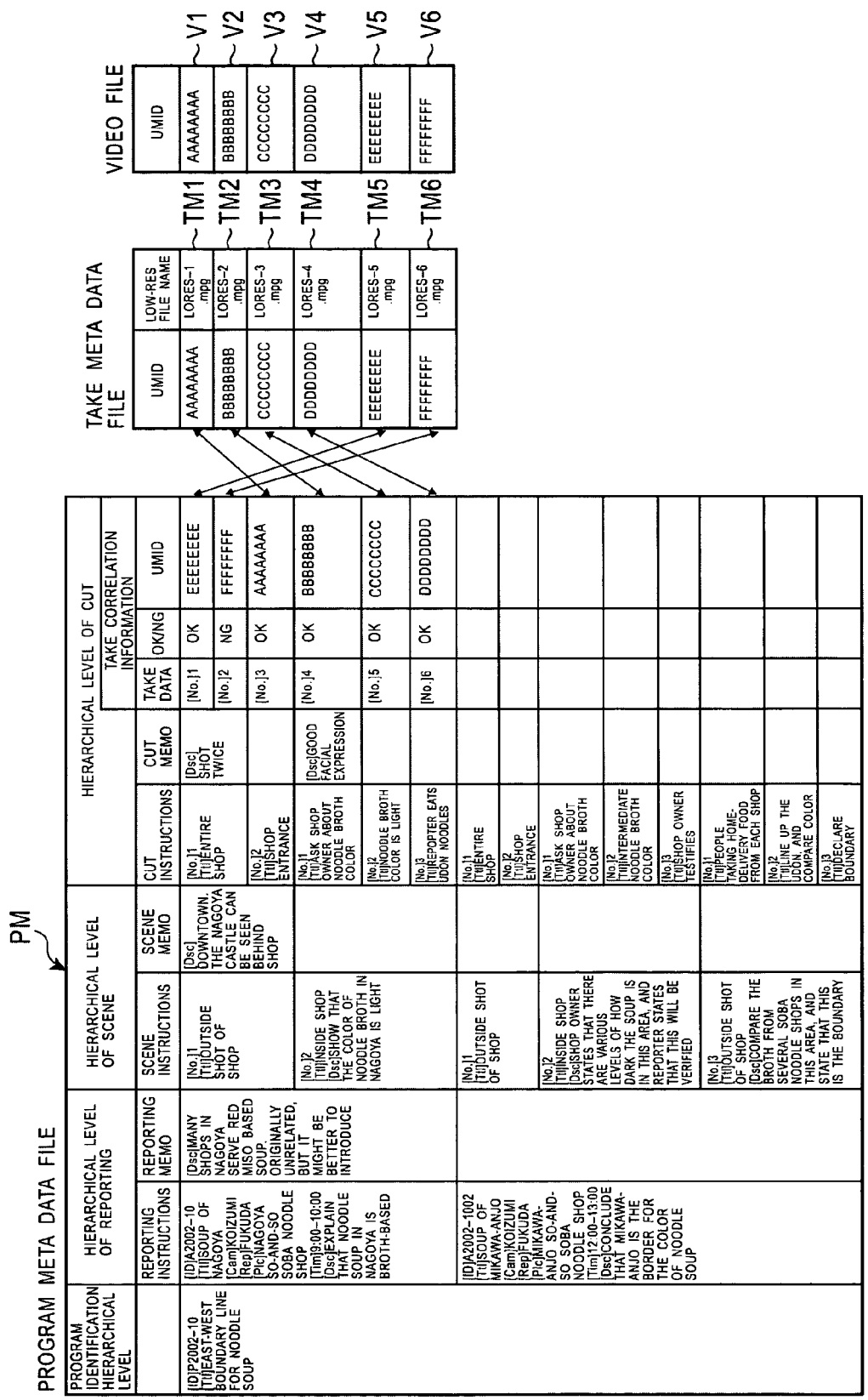
FIG. 25 is an explanatory diagram illustrating an example of the configuration of the planning sheet meta data at the stage that the takes and cuts in the first report have been correlated, and cut memos and the like have been input, in the picture-taking step according to the modification of the first embodiment.

Specifically, as shown in FIG. 25, the take correlation unit 44 reads out the UMID within the take meta data TM, and inputs this UMID into the UMID space of the program meta data PM which corresponds to the specified cut. For example, the first take has been correlated to Cut 1 of Scene 2 by the cameraman as described above, so the take correlation unit 44 inputs the UMID "AAAAAAAA" contained in the take meta data TM1 into the UMID space corresponding to Cut 1 of Scene 2. Thus, the take meta data TM1 and the video file V1 having the common UMID "AAAAAAAA" are correlated with Cut 1 of Scene 2 in the program meta data PM.

Subsequently, in step S590 and step S592, OK/NG information is set regarding all cuts of which shooting has been completed, as shown in FIG. 25 (step S590), and cut memos, scene memos, reporting memos, etc., are input to the program meta data PM (step S592). These steps S590 and S592 are generally the same as steps S562 and S564 described above with reference to FIG. 21, and accordingly, detailed description thereof will be omitted.

Figure 26:
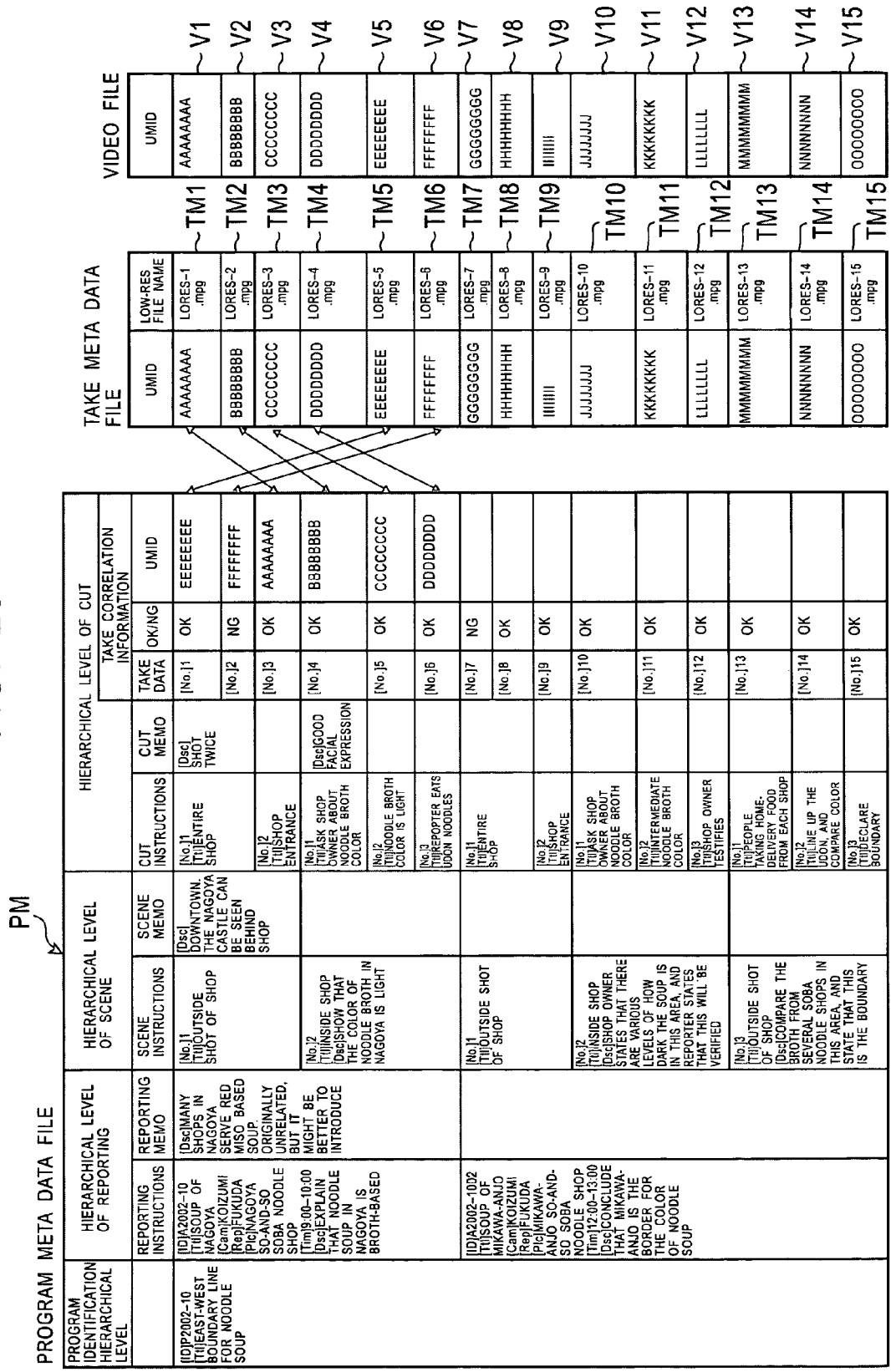
FIG. 26 is an explanatory diagram illustrating an example of the configuration of the planning sheet meta data at the stage that all cuts in the second report have been shot in the picture-taking step according to the modification of the first embodiment.
Figure 27:
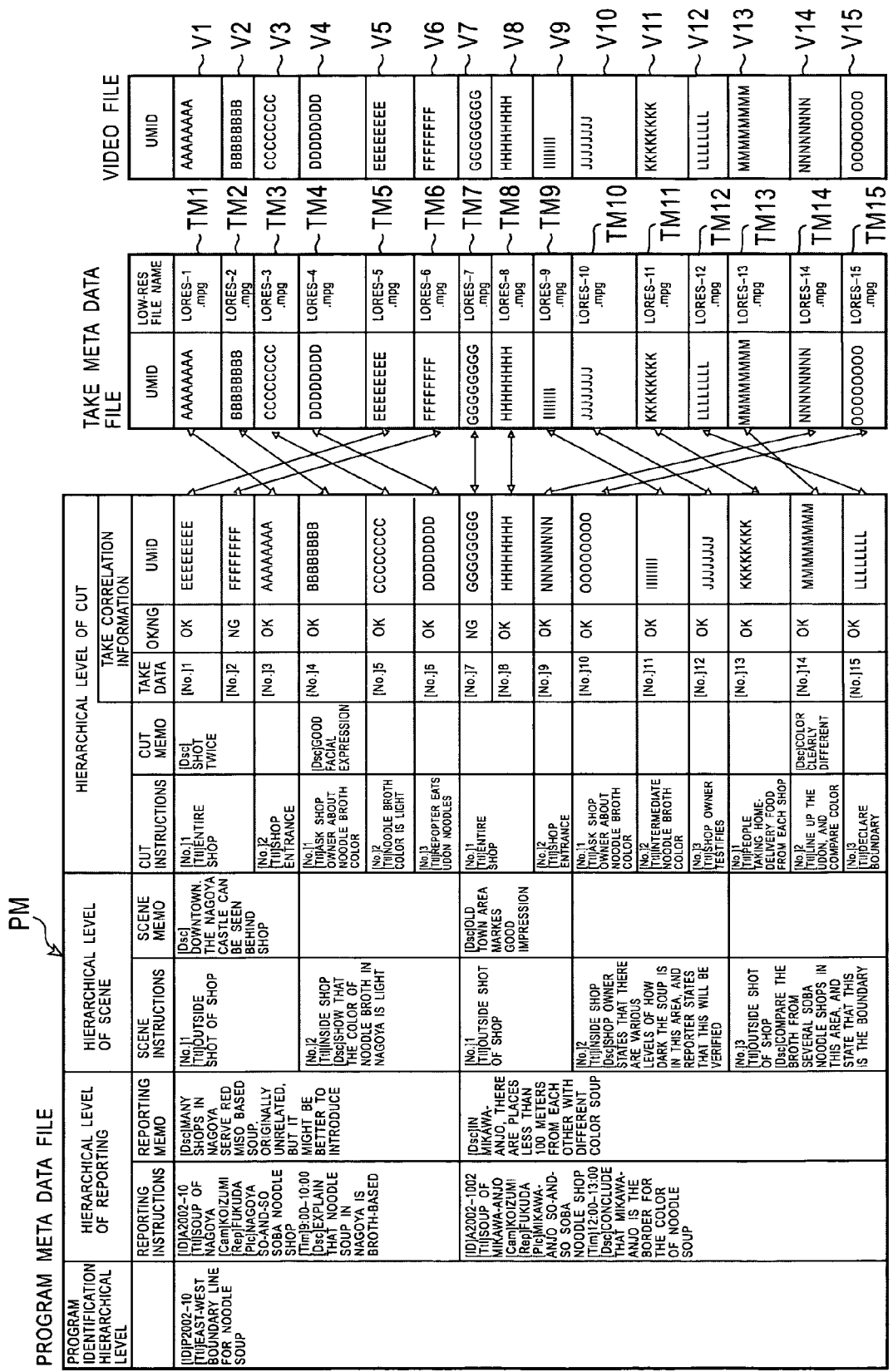
FIG. 27 is an explanatory diagram illustrating an example of the configuration of the planning sheet meta data at the stage that the takes and cuts in the second report have been correlated, and cut memos and the like have been input, in the picture-taking step according to the modification of the first embodiment.
Figure 29:
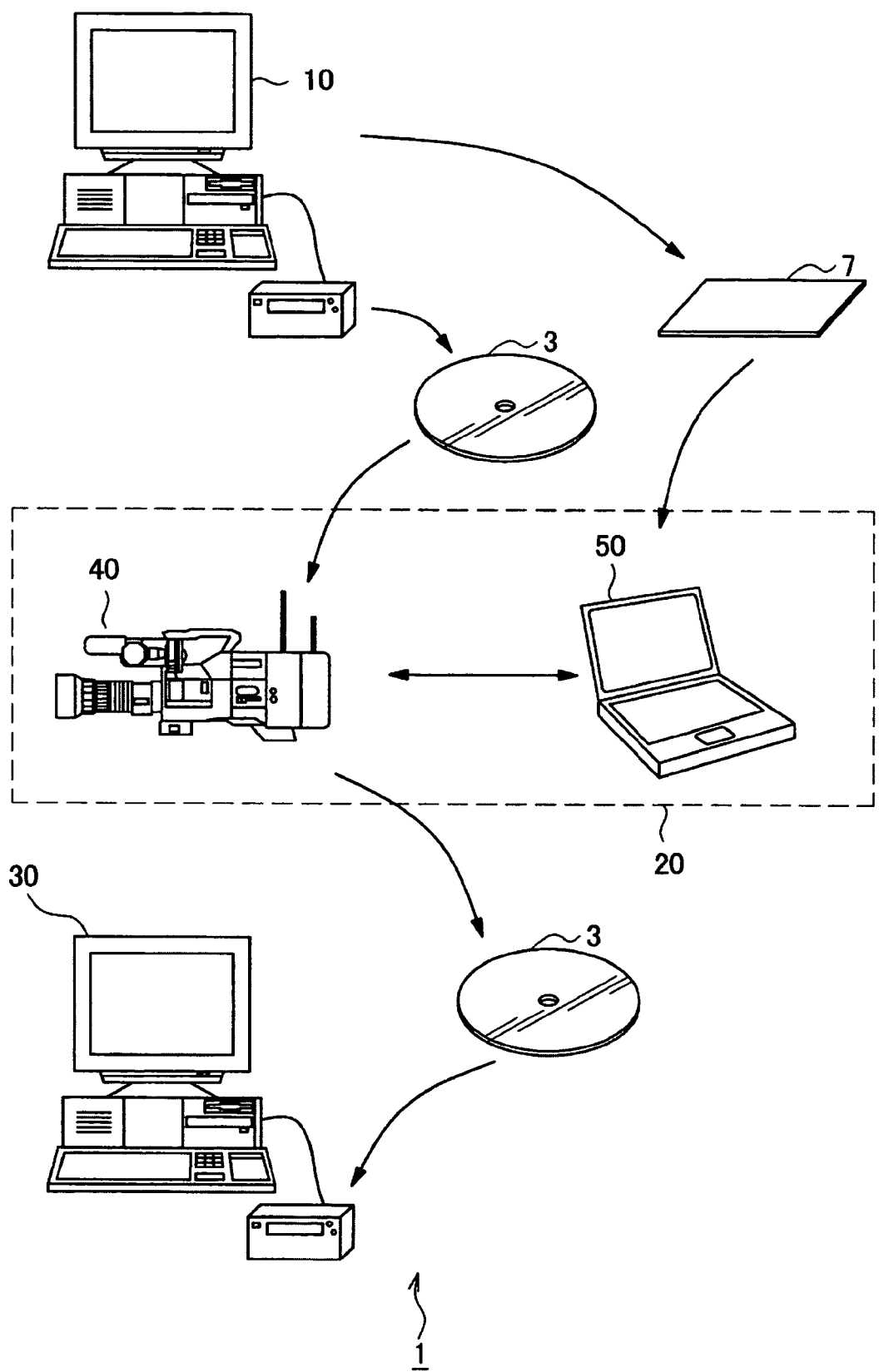
FIG. 29 is a block diagram schematically illustrating the overall configuration of a picture program production assistance system according to another embodiment.

Next, in step S594, whether or not to end the shooting and reporting is determined (step S594). In this step, the cameraman or the like judges whether or not all reporting relating to the picture program has been completed. In the event that judgment is made that all reporting relating to the picture program has not been completed, the flow proceeds to step S596, the reporting location is changed, and the flow returns to step S580. Next, a different report is selected anew (e.g., report ID "A20002-1002"), and the steps S580 through S584 are repeated for all cuts contained thereon. Consequently, the meta data TM7 through TM15 and video files V7 through V15 regarding the nine new takes are created, as shown in FIG. 26. Subsequently, the meta data TM7 through TM15 and video files V7 through V15 are correlated to the cuts of the program meta data PM in the same way as above, as shown in FIG. 27 (step S588). Further, as shown in FIG. 27, OK/NG information is input to the program data PM (step S590), and cut memos, scene memos, and report memos are input (step S592).

Then, in the event judgment is made in step S594 that all reporting relating to the picture program has been completed, the entire shooting step S50 ends.

As described above, with the processing flow of the shooting step S50 shown in FIG. 22, the task for correlating cuts and takes is performed following shooting multiple cuts. That is to say, the content data relating to the multiple takes already shot and the take meta data TM thereof is correlated with the cuts specified by the cameraman all at once. Accordingly, the staff member for the correlating task, such as the cameraman, can efficiently correlate the cuts and takes. At this time, the thumbnail T of the take is displayed on the LCD display unit 429, so the staff can visually recognize the contents of the take, and thus avoid erroneous correlation. Also, the staff can easily and speedily correlate the takes and cuts, simply by dragging and dropping the thumbnails.

Further, UMIDs are used as take correlation information correlating the takes and cuts. Accordingly, as described with reference to FIG. 3 and so forth, the amount of data of the program meta data PM can be reduced as compared with arrangements wherein correlation is performed using all of the take meta data file name, video file name, and low-res file name. Also, a UMID is globally unique, so takes can be distinguished even in the event of handling the program meta data PM of multiple picture programs. Accordingly, mix-ups of content data and take meta data TM due to the same video file name or take meta data file name or the like existing can be avoided.

The above has been a detailed description of the picture program production assistance system 1, planning sheet meta data, project-making, reporting, and editing terminals, 10, 20, and 30, the picture program production assistance method, and so forth, according to the first embodiment of the present invention.

According to the above-described embodiment, the planning sheet meta data made up of the program meta data PM and take meta data TM as described above has a practical configuration suited well for actual picture program production. Accordingly, the efficiency of the picture-taking work flow can be improved by using the planning sheet meta data as described next.

First, the electronic file format planning sheet meta data can be consistently shared between the project-making and planning team, reporting team, editing team, and so forth, handling production of the picture program. Accordingly, the contents of work performed by each team on the same picture program can be integrally managed with one set of planning sheet meta data. Further, each team can check production instructions, and obtain the results of work performed by other teams, speedily and accurately by viewing this planning sheet meta data. Accordingly, not only is the speed and accuracy of sharing information between the teams improved, but all teams can manage information in an integral manner. Accordingly, cooperation and instructions or requests between the teams can be easily realized, and also, modifications and changes to the scenario can be handled well. Consequently, the accuracy, speed, and efficiency of the overall picture program production work can be improved.

Also, the program meta data PM has meta data relating to the intent and observations of the producer of the picture program, such as production instructions regarding one picture program and information obtained while reporting, in the form of a single hierarchically-arranged data file. Accordingly, the staff of each team can easily grasp the overall contents of the picture program by simply glancing over this. Accordingly, picture-taking efficiency, editing efficiency, and so forth, can be improved.

Further, the reporting staff can easily understand what is to be shot, based on the production instruction information in the program meta data PM, while also preventing forgetting to shoot takes. Also, one picture program can be completed by shooting each cut instructed so as to fill in the spaces in the cut hierarchical level of the program meta data PM. Moreover, the order of shooting the cuts is optional, and re-takes may also be made. Accordingly, the shooting efficiency and picture-taking quality can be improved.

Also, using the planning sheet meta data of the above-described structure allows takes to be freely correlated to any cut. That is to say, the content data of the takes which are individual picture material, and take meta data TM and the like thereof, can be flexibly correlated (linked) with cuts which are the intent (scenario) of the project-making side, by generating the take correlation information in the program meta data PM. Accordingly, at the picture-taking stage, shooting can be carried out in arbitrary order, as described above. Also, one take can be correlated to multiple cuts, for example. At this time, for example, part of the content data of one take (e.g., the first half) can be assigned to one cut, and the other part of the content data (e.g., the second half) can be assigned to another cut. Moreover, the same take can be correlated to multiple cuts belonging to different picture programs, for example. Also, in the event that there has been changes in the scenario of the picture program, all that is necessary is to change the links of the takes and cuts (i.e., update the take correlation information), so project changes and the like can also be flexibly handled.

Such flexible correlation is made possible by the characteristics of the planning sheet meta data according to the present embodiment, wherein information relating to a scenario and the like is integrally managed with hierarchically-structured program meta data PM in a single file for each picture program, and wherein a file for each take is created for each set of picture material actually shot and each set of take meta data TM and the like, and managed independently from the program meta data PM. Also, managing the program meta data PM and the take meta data TM separate from one another allows the size of the program meta data PM to be reduced.

Also, adding take correlation information, made up of the file names or the like of the content data and take meta data TM of the related take, to the program meta data PM, allows pictures and meta data of the picture program to be freely called up as needed, and the contents thereof viewed.

Also, in the editing stage and the like, content data files for multiple takes making up the picture program can be played in any order, such as the scenario order, based on the program meta data PM. Accordingly, the editing staff and the like can view part or all of the picture program in a consecutive manner, thereby improving editing efficiency.

While a preferred embodiment of the present invention has been described above with reference to the drawings, it is needless to say that the present invention is by no means restricted to this example, and that anyone skilled in the art would be able to conceive various modifications and alterations thereof without departing from the spirit and scope of the present invention set forth in the appended Claims, which are understood to be encompassed by the present invention as a matter of course.

For example, with the above-described embodiment, the project-making terminal 10, reporting terminal 20, and editing terminal 30, directly communicate the planning sheet meta data and low-resolution pictures one with another via the network 5 for example, but the present invention is not restricted to this arrangement. For example, a center server (not shown) connected to the network 5 may be provided, so as to configure a database for centrally managing the planning sheet meta data, low-res pictures, original pictures, and so forth. Thus, the terminals can access the center serve via the network 5 to obtain and update various types of information.

That is to say, the project-making terminal 10 may be arranged to store the created program meta data PM in a planning sheet meta data database (note shown) which the center server has. On the other hand, the reporting terminal 20 and the editing terminal 30 may obtain the program meta data PM from the planning sheet meta data database, to be used for processing in the respective terminals. Moreover, the reporting terminal 20 and the editing terminal 30 may edit the program meta data PM according to the results of processing within the respective terminals, and overwrite the edited contents on the program meta data PM on the planning sheet meta data database. Also, the reporting terminal device 20 may store the created take meta data TM in the planning sheet meta data database. Also, the picture-taking device 40 may store the recorded content data (low-res pictures and/or original pictures) in a picture content database (not shown) which the center server has. Also, the editing terminal 30 may be arranged to obtain content data necessary for editing from the picture content database. At this time, the picture content database may be configured separately of a low-res picture database and an original picture database, for example.

Also, while the above embodiment describes the planning sheet meta data and the like being provided and obtained between the project-making terminal 10, reporting terminal 20, editing terminal 30, and so forth, by communication through the network 5, for example, but the present invention is not restricted to this example. For example, an arrangement may be made wherein, as shown in FIG. 22, the planning sheet meta data and the like is exchanged between the project-making terminal 10, reporting terminal 20, and editing terminal 30, using various types of recording media. FIG. 22 is block diagram illustrating the overall schematic configuration of a picture program production assistance system 1 according to another embodiment.

Specifically, as shown in FIG. 22, the project-making terminal 10 records the newly-created program meta data PM and the like in a recording medium such as an optical disk 3 or memory card 7 or the like. The optical disk 3 or memory card 7 or the like storing the program meta data PM is transported to the reporting terminal 20 or the like, for example.

The picture-taking device 40 obtains the program meta data PM from the project-making terminal 10 by means of the optical disk 3 or the like, for example, also, the field PC 50 obtains the program meta data PM from the project-making terminal 10 by means of a memory card 7 or the like. Further, the picture-taking device 40 performs the shooting such as described above, based on the obtained program meta data PM, and records the content data in the optical disk 3, for example. Further, the picture-taking device 40 and the field PC 50 each edit the program meta data PM based on the above shooting results, having synchronized both editing results, and write the edited program meta data PM to the optical disk 3, for example. Thus, the program meta data PM within the optical disk 3 is updated. Also, the picture-taking device 40 writes the take meta data TM created by the shooting processing, in the optical disk 3 as well. Consequently, both the content data relating to the picture program, and the planning sheet meta data (program meta data PM and take meta data TM) are recorded in the optical disk 3 or the like, for example. The optical disk 3 or the like is transported to the editing terminal 30, for example.

The editing terminal 30 obtains the content data and the planning sheet meta data from the reporting terminal 20 for example, through the optical disk 3 or the like. Further, the editing terminal 30 edits the content data described above, based on the planning sheet meta data obtained here.

Thus, exchanging the planning sheet meta data through the recording medium does away with the need for communication through a network 5 such as described in the first embodiment, so the picture program production assistance system 1 can be configured more inexpensively and more easily. This is particularly advantageous in cases of performing editing work using only the original pictures. With this case, the optical disk 3 storing the original pictures must arrive for editing to be started, anyway. In such cases, recording the planning sheet meta data in this optical disk 3 allows the original pictures and the planning sheet meta data to be handled as a set in a single optical disk, which improves ease-of-use.

Also, with the above embodiments, the reporting terminal 20 has been described as being configured of two sets of hardware, the picture-taking device 40 and the field PC 50, but the present invention is by no means restricted to this arrangement. For example, the reporting terminal 20 may be configured of a single set of hardware, as long as the functions of both the picture-taking device 40 and the field PC 50 can be had. A reporting terminal 20 configured of a single set of hardware can be realized by connecting an input device such as a keyboard to the picture-taking device 40, so as to allow the reporting staff to input the program shooting state information and take shooting conditions information thereto.

Also, the above embodiments have been described with reference to examples of the picture program production assistance system 1 comprising only the terminal devices 10, 20, and 30, corresponding to the project-making and planning team, reporting team, and editing team, but the present invention is by no means restricted to this example. The teams and departments involved in actual picture program production are far more and varied than this, including teams and departments handling office work, equipment, information, scripting, special effects such as CG/SI (computer graphics/superimposing), acting, research, data saving, and much more. Accordingly, the picture program production assistance system 1 may be arranged to comprise at least one terminal device corresponding to each of these teams and departments, so that the planning sheet meta data can be shared between an even greater number of terminal devices. Note that in this case, an arrangement may be made wherein a center server (not shown) for centrally managing the planning sheet meta data such as described above is provided on the network 5, such that the terminal devices of each of the teams and departments can access a single database over the network 5, so as to obtain and update integrated planning sheet meta data.

Also, though the above embodiments have been described with reference to an example wherein the work of correlating takes and cuts is carried out based on the program meta data PM' displayed on the viewfinder 419 of the picture-taking device 40 or the LCD display unit 429, the present invention is by no means restricted to this example. For example, the staff may perform the work of correlating takes and cuts by displaying the program meta data PM' on the display unit 508 of the field PC 50 or the display unit 308 of the editing terminal 30.

Also, though the above embodiments have been described with reference to an example wherein the program meta data PM includes production instruction information corresponding to the scenario, in order to function as an electronic file format scenario, the present invention is by no means restricted to this example. For example, the program meta data PM may include information of the picture program script itself (scenario information) planned by the project-making and planning team. This scenario information may be configured of information similar to the text data input to the items of the production instruction information described above, such as "reporting title", "reporting instructions", "scene title", "scene instructions", "cut title", and so forth. As long as this scenario information is hierarchically arranged and contained in the program meta data PM, the staff of each team can view the program meta data PM and be able to directly understand the contents of the scenario.

What is claimed is:

1. A picture program production assistance system for producing picture programs, said system comprising:
   a network;
   a picture taking device connected to said network;
   a project-making device, connected to said network, for creating program meta data in planning sheet meta data which includes:
      program meta data, which is managed in increment files for each of said picture programs, comprising:
         a program identification hierarchical level which is a highest hierarchical level made up of meta data relating to said picture program; and
         a hierarchical structure including at least a cut hierarchical level made up of meta data relating to cuts which are the smallest increment making up said picture program at the time of project-making, and
      take meta data, managed in increments of increment files for each take, comprising meta data relating to takes which are consecutive shooting processing from the start to the end of one recording; and
   a processing device, connected to said network, for obtaining said program meta data created by said project-making device, creating said take meta data for each said take, and correlating content data relating to said take and said take meta data with said cut within said program meta data,
   wherein said processing device generates, as said program meta data, take correlation information for correlating said content data relating to said take and said take meta data with said cut within said program meta data, and
   wherein said take correlation information includes a globally unique identifier for identifying content data of said take correlated with said cut; and wherein said identifier is also included in said take meta data corresponding to said content data.

2. A computer-readable storage medium encoded with a computer program causing a computer to carry out a process comprising the steps of:
   creating program meta data, which is managed in increment files for each of said picture programs, said program meta data comprising:
      a program identification hierarchical level which is a highest hierarchical level made up of meta data relating to said picture program,
      a hierarchical structure including at least a cut hierarchical level made up of meta data relating to cuts which are the smallest increment making up said picture program at the time of project-making; and
      take meta data, managed in increments of increment files for each take, comprising meta data relating to takes which are consecutive shooting processing from the start to the end of one recording;
   correlating content data relating to a plurality of takes and take meta data with one said cut; and
   generating, as said program meta data, take correlation information for correlating said content data relating to said take and said take meta data with said cut within said program meta data,
   wherein said take correlation information includes a globally unique identifier for identifying content data of said take correlated with said cut; and wherein said identifier is also included in said take meta data corresponding to said content data.

3. A picture program control method for a picture program production assistance system which produces picture programs comprising the steps of:
   creating program meta data, which is managed in increment files for each of said picture programs, said program meta data comprising:
      a program identification hierarchical level which is a highest hierarchical level made up of meta data relating to said picture program, and
      a hierarchical structure including at least a cut hierarchical level made up of meta data relating to cuts which are the smallest increment making up said picture program at the time of project-making;
      take meta data, managed in increments of increment files for each take, comprising meta data relating to takes which are consecutive shooting processing from the start to the end of one recording; and
   correlating content data relating to a plurality of takes and take meta data with one said cut;
   generating, as said program meta data, take correlation information for correlating said content data relating to said take and said take meta data with said cut within said program meta data,
   wherein said take correlation information includes a globally unique identifier for identifying content data of said take correlated with said cut; and wherein said identifier is also included in said take meta data corresponding to said content data.

4. A processing device connected through a network to a picture taking device and a project-making device supervising production of a picture program, the processing device comprising:
   a program meta data obtaining unit for obtaining program meta data which is managed in increment files for each of said picture programs and includes:
      a program identification hierarchical level which is a highest hierarchical level made up of meta data relating to said picture program; and
      a hierarchical structure including at least a cut hierarchical level made up of meta data relating to cuts which are the smallest increment making up said picture program at the time of project-making;
   a take meta data creating unit for creating take meta data for each take, managed in increments of increment files for each take, comprising meta data relating to takes which are consecutive shooting processing from the start to the end of one recording; and
   a take correlating unit for correlating content data relating to said take and said take meta data with said cut within said program meta data,
   wherein said take correlating unit can correlate content data relating to a plurality of said takes and said take meta data with one said cut,
   wherein said take correlating unit generates, as said program meta data, take correlation information for correlating said content data relating to said take and said take meta data with said cut within said program meta data,
   wherein said take correlation information includes a globally unique identifier for identifying content data of said take correlated with said cut; and wherein said identifier is also included in said take meta data corresponding to said content data.

5. A processing device according to claim 4, wherein said hierarchical structure of said program meta data further comprises a scene hierarchical level which is a hierarchical level above said cut hierarchical level and comprises meta data relating to a scene made up of at least one said cut.

6. A processing device according to claim 5, wherein said hierarchical structure of said program meta data further comprises a reporting hierarchical level which is a hierarchical level above said scene hierarchical level and comprises meta data relating to a report made up of at least one said scene.

7. A processing device according to claim 4, wherein said program meta data includes production instruction information which is meta data instructing the production contents of said picture program.

8. A processing device according to claim 4, wherein said take meta data includes picture-taking conditions information which is meta data instructing the shooting conditions of said take.

9. A processing device according to claim 4, wherein, following executing said take, said take correlating unit correlates content data relating to said take and said take meta data with said cut selected by a user before executing said take.

10. A processing device according to claim 4, wherein said take correlating unit correlates content data relating to said take and said take meta data with said cut selected by a user following executing said take.

11. A processing device according to claim 4, wherein said take correlating unit can correlate content data relating to a single take and said take meta data with a plurality of said cuts.

12. A processing device according to claim 4, wherein said take correlating unit can correlate content data relating to a single take and said take meta data with a plurality of said cuts each belonging within different said program meta data.

13. A processing device according to claim 4, wherein said take correlation information includes the field name of said content data of said take correlated with said cut, and the file name of said take meta data.

14. A processing device according to claim 4, wherein said take correlation information includes information to select one said take from said plurality of takes correlated to one said cut.

15. A processing device according to claim 4, further comprising a shooting conditions information generating unit for generating program shooting conditions information, which is meta data relating to the shooting conditions of hierarchical levels on or higher than said cut hierarchical level, as said program meta data.

16. A processing device according to claim 4, further comprising a shooting conditions information generating unit for generating take shooting conditions information, which is meta data relating to the shooting conditions of said take, as said take meta data.

17. A processing device according to claim 4, further comprising an imaging device for performing shooting processing of said cut corresponding to said program meta data, and recording said content data obtained by this shooting processing for each take.

18. A processing device according to claim 17, wherein said imaging device further comprises a meta data display control unit for displaying said program meta data on a display unit.

19. A processing device according to claim 18, wherein said meta data display control unit can selectively display a part of multiple items of said program meta data.

20. A processing device according to claim 18, wherein said imaging device further comprises a shot cut selecting unit for selecting said cut for correlation with said content data of said take and said take meta data, from said cuts within program meta data displayed on said display unit, based on user input.

21. A processing device according to claim 4, further comprising a content data editing unit for editing said content data, based on said program meta data and/or said take meta data.

22. A processing device according to claim 21, further comprising a display control unit, for displaying said content data of said take on a display unit, based on said program meta data and said take meta data.

23. A processing device according to claim 22, wherein said display control unit sequentially displays on said display unit at least a part of said content data of said take correlated with each of said plurality of cuts, in an order of cuts corresponding to said program meta data.

24. A processing device according to claim 22, wherein said display control unit displays on said display unit at least at part of said program meta data and said take meta data, along with the content data of said take.

25. A processing device according to claim 4, further comprising: a content data editing unit for editing said content data, based on said program meta data and said take meta data; and a take correlation information editing unit for editing said take correlation information, based on the editing results of said content data by said content data editing unit.

26. A processing device according to claim 25, wherein said take correlation information editing unit adds information representing the range of content data extracted in the editing performed by said content data editing unit to said take correlation information.

27. The processing device according to claim 4, further comprising:
selector for selecting one of a plurality of takes and take meta data.

28. A computer-readable storage medium encoded with a computer program comprising the steps of:
obtaining program meta data which is managed in increment files for each of said picture programs and includes:
a program identification hierarchical level which is a highest hierarchical level made up of meta data relating to said picture program; and
a hierarchical structure including at least a cut hierarchical level made up of meta data relating to cuts which are the smallest increment making up said picture program at the time of project-making;
creating take meta data for each take, managed in increments of increment files for each take, comprising meta data relating to takes which are consecutive shooting processing from the start to the end of one recording; and
correlating content data relating to said take and said take meta data with said cut within said program meta data; and
generating, as said program meta data, take correlation information for correlating said content data relating to said take and said take meta data with said cut within said program meta data,
wherein said take correlation information includes a globally unique identifier for identifying content data of said take correlated with said cut; and wherein said identifier is also included in said take meta data corresponding to said content data.

29. A picture program processing method for a picture program production assistance system which produces picture programs comprising the steps of:
obtaining program meta data which is managed in increment files for each of said picture programs and includes:
a program identification hierarchical level which is a highest hierarchical level made up of meta data relating to said picture program, and
a hierarchical structure including at least a cut hierarchical level made up of meta data relating to cuts which are the smallest increment making up said picture program at the time of project-making;
creating take meta data for each take, managed in increments of increment files for each take, comprising meta data relating to takes which are consecutive shooting processing from the start to the end of one recording;
correlating content data relating to said take and said created take meta data with said cut within said obtained program meta data; and
generating, as said program meta data, take correlation information for correlating said content data relating to said take and said take meta data with said cut within said program meta data,
wherein said take correlation information includes a globally unique identifier for identifying content data of said take correlated with said cut; and wherein said identifier is also included in said take meta data corresponding to said content data.

* * * * *

UNITED STATES PATENT AND TRADEMARK OFFICE
CERTIFICATE OF CORRECTION

PATENT NO. : 7,636,721 B2 Page 1 of 1
APPLICATION NO. : 10/718247
DATED : December 22, 2009
INVENTOR(S) : Shinkai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Ninth Day of November, 2010

David J. Kappos
*Director of the United States Patent and Trademark Office*